United States Patent
Liang et al.

(10) Patent No.: US 12,355,603 B2
(45) Date of Patent: Jul. 8, 2025

(54) METHOD AND APPARATUS FOR TRANSMITTING PHYSICAL LAYER PROTOCOL DATA UNIT

(71) Applicant: Huawei Technologies Co., Ltd., Shenzhen (CN)

(72) Inventors: Dandan Liang, Shenzhen (CN); Ming Gan, Shenzhen (CN); Zhengchun Zhou, Chengdu (CN); Xianfu Lei, Chengdu (CN); Yang Yang, Chengdu (CN); Xiaohu Tang, Chengdu (CN); Wei Lin, Shenzhen (CN); Chenchen Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 273 days.

(21) Appl. No.: 18/073,381

(22) Filed: Dec. 1, 2022

(65) Prior Publication Data

US 2023/0115766 A1 Apr. 13, 2023

Related U.S. Application Data

(63) Continuation of application No. PCT/CN2021/096105, filed on May 26, 2021.

(30) Foreign Application Priority Data

Jun. 2, 2020 (CN) .......................... 202010491814.5

(51) Int. Cl.
*H04L 5/00* (2006.01)
*H04L 1/00* (2006.01)
(Continued)

(52) U.S. Cl.
CPC ...... *H04L 27/26132* (2021.01); *H04L 1/0069* (2013.01); *H04L 5/0044* (2013.01); *H04L 69/323* (2013.01)

(58) Field of Classification Search
CPC . H04L 5/0044; H04L 1/0069; H04L 27/2621; H04L 69/323; H04L 27/262;
(Continued)

(56) References Cited

U.S. PATENT DOCUMENTS

2013/0114757 A1 5/2013 Park et al.
2016/0261452 A1 9/2016 Porat et al.
(Continued)

FOREIGN PATENT DOCUMENTS

CN 101527664 A 9/2009
CN 105120520 A 12/2015
(Continued)

OTHER PUBLICATIONS

Park, E. et al., "EHT-STF Sequences", IEEE 802.11-20/0782r0, May 20, 2020, 27 pages.
(Continued)

*Primary Examiner* — Kiet Tang
(74) *Attorney, Agent, or Firm* — Slater Matsil, LLP

(57) ABSTRACT

Embodiments of this application provide a method and an apparatus for transmitting a physical layer protocol data unit, to design a short training field sequence for a larger channel bandwidth. The short training field sequence designed in this application has a smaller peak-to-average power ratio PAPR and better performance. The method includes: generating a physical layer protocol data unit PPDU that complies with the 802.11be standard, where the PPDU includes a short training field, and a quantity of subcarriers of a frequency domain sequence of the short training field is greater than 2048; and sending the PPDU on a target channel, where a bandwidth of the target channel is greater than or equal to 160 MHz.

18 Claims, 8 Drawing Sheets

(51) Int. Cl.
  *H04L 27/26* (2006.01)
  *H04L 69/323* (2022.01)
(58) Field of Classification Search
  CPC ........... H04L 27/26132; H04L 27/2602; H04L 27/2614; Y02D 30/70; H04W 84/12
  See application file for complete search history.

(56) References Cited

U.S. PATENT DOCUMENTS

| | | | | |
|---|---|---|---|---|
| 2017/0303201 | A1* | 10/2017 | Park | ............ H04W 28/065 |
| 2018/0145811 | A1 | 5/2018 | Park et al. | |
| 2018/0183905 | A1 | 6/2018 | Azizi et al. | |
| 2019/0053240 | A1 | 2/2019 | Park et al. | |
| 2019/0116545 | A1 | 4/2019 | Verma et al. | |
| 2019/0132061 | A1* | 5/2019 | Xin | ............ H04L 27/2663 |
| 2019/0268739 | A1 | 8/2019 | Cariou et al. | |
| 2019/0288895 | A1 | 9/2019 | Chen et al. | |
| 2020/0014509 | A1* | 1/2020 | Asterjadhi | ............ H04L 5/0041 |
| 2020/0076552 | A1 | 3/2020 | Cherian et al. | |
| 2020/0275371 | A1* | 8/2020 | Park | ............ H04L 5/00 |
| 2021/0336827 | A1 | 10/2021 | Park et al. | |
| 2022/0140962 | A1 | 5/2022 | Park et al. | |
| 2022/0361170 | A1 | 11/2022 | Park et al. | |

FOREIGN PATENT DOCUMENTS

| | | |
|---|---|---|
| CN | 105162745 A | 12/2015 |
| CN | 106100791 A | 11/2016 |
| CN | 106936749 A | 7/2017 |
| CN | 107508780 A | 12/2017 |
| CN | 108040028 A | 5/2018 |
| CN | 110324268 A | 10/2019 |
| CN | 110798293 A | 2/2020 |
| CN | 110876200 A | 3/2020 |
| CN | 107409432 B | 10/2020 |
| EP | 3829124 A1 | 6/2021 |
| JP | 2017531954 A | 10/2017 |
| JP | 2023510228 A | 3/2023 |
| JP | 2023518733 A | 5/2023 |
| KR | 20160086950 A | 7/2016 |
| KR | 20170139516 A | 12/2017 |
| KR | 20210041005 A | 4/2021 |
| WO | 2013152111 A1 | 10/2013 |
| WO | 2018076144 A1 | 5/2018 |

OTHER PUBLICATIONS

IEEE Std 802.Nov. 2016, IEEE Standard for Information technology-Telecommunications and information exchange between systems Local and metropolitan area networks-Specific requirements, Part 11: Wireless LAN Medium Access Control (MAC) and Physical Layer (PHY) Specifications, Approved Dec. 7, 2016, 3534 pages.
IEEE Std 802.11ac-2013, IEEE Standard for Information technology-Telecommunications and information exchange between systems Local and metropolitan area networks-Specific requirements, Part 11: Wireless LAN Medium Access Control (MAC) and Physical Layer (PHY) Specifications, Amendment 4: Enhancements for Very High Throughput for Operation in Bands below 6 GHZ, Approved Dec. 11, 2013, 425 pages.
IEEE P802.11ax/D6.0, Nov. 2019, Draft Standard for Information technology-Telecommunications and Information exchange between systems Local and metropolitan area networks-Specific requirements, Part 11: Wireless LAN Medium Access Control (MAC) and Physical Layer (PHY) Specifications, 780 pages.
Doc.: IEEE 802.11-20/0585r0, Eunsung Park et al., Consideration on EHT-STF, Mar. 2020, total 16 pages, XP068167507.
IEEE P802.11 axT/D0.3 Draft Standard for Information technology-Tele-communications and information exchange between systems Local and metropolitan area networks-Specific requirements Part 11:Wireless LAN Medium Access Control (MAC) and Physical Layer(PHY) Specifications Amendment 6: Enhancements for High Efficiency WLAN, IEEE P802.11ax/D0.3,XP068137433, Aug. 2016, total:299 pages.
Eunsung Park et al., "Overview of PHY Features for EHT", IEEE 802.11-18/1967r1(Jan. 14, 2019), total 22 pages.
Eunsung Park et al., "HE-STF Sequences for 160/80+80MHz"IEEE 802.11-16/0335r0(Mar. 14, 2016), total 21 pages.
Eunsung Park et al., "HE-STF Sequences", IEEE 802.11-15/1323r1(Nov. 11, 2015), total 28 pages.
IEEE Computer Society et al., "Part 11: Wireless LAN Medium Access Control (MAC) and Physical Layer (PHY) specifications", IEEE Std 802.11g-2003, Jun. 27, 2003, total:78pages.
IEEE Standard for Information technology-Telecommunications and information exchange between systems-Local and metropolitan area networks Specific requirements, "Part 11: Wireless LAN Medium Access Control (MAC) and Physical Layer (PHY) Specifications", IEEE Std 802.11-2007, Jun. 12, 2007, total:1232pages.
HTC et al., "UE radio access capability for WLAN", 3GPP TSG-RAN2#91bis meeting, Malmo, Sweden, Tdoc R2-154369, Oct. 5-9, 2015, total:7pages.
IEEE Computer Society et al., "Part 11:Wireless LAN Medium Access Control (MAC) and Physical Layer(PHY) Specifications", IEEE Std 802.11 n-2009, Oct. 29, 2009, total:536pages.
IEEE Computer Society et al., "Part 11: Wireless LAN Medium Access Control (MAC) and Physical Layer (PHY) Specifications", IEEE Std 802.11ac-2013, Dec. 11, 2013, total:425pges.
Doc.: IEEE 802.11-16/0903r1, Yujin Noh et al., Gamma Phase Rotation for HE PPDU, Jul. 2016, total 26 pages. XP068158320.
Yuanwen Li et al., "Research on Channel Propagation Cha.R. Acteristic and Acquisition Technology of Millimeter Wave MIMO Systems", May 30, 2016, total: 94pages.
Eunsung Park (LG Electronics), "EHT-STF Sequences", IEEE Draft, doc.: IEEE 802.11-20/0782-r1-00BE-EHT-STF-Sequences, IEEE-Samentor, Piscataway, NJ USA, vol. 802.11 EHT; 802.11be, No. 1, May 29, 2020 (May 29, 2020), pp. 1-28, XP068168119.
Eunsung Park et al: "EHT-STF Sequences", May 2020, IEEE 802.11-20/0782r2, total 29 pages.

* cited by examiner (1)

(2)

METHOD AND APPARATUS FOR TRANSMITTING PHYSICAL LAYER PROTOCOL DATA UNIT

CROSS-REFERENCE TO RELATED APPLICATION

This application is a continuation of International Application No. PCT/CN2021/096105, filed on May 26, 2021, which claims priority to Chinese Patent Application No. 202010491814.5, filed on Jun. 2, 2020. The disclosure of the aforementioned applications are hereby incorporated by reference in their entireties.

TECHNICAL FIELD

Embodiments of this application relate to the communication field, and in particular, to a method and an apparatus for transmitting a physical layer protocol data unit.

BACKGROUND

With development of the mobile Internet and popularization of intelligent terminals, data traffic grows rapidly, and users impose increasingly high requirements on communication service quality. The Institute of Electrical and Electronics Engineers (IEEE) 802.11ax standard can no longer meet user requirements for a high throughput, a low jitter, a low delay, and the like. Therefore, it is urgent to develop a next-generation wireless local area network (WLAN) technology, namely, the IEEE 802.11be standard.

Different from the IEEE 802.11ax, the IEEE 802.11be uses ultra-large bandwidths, such as 240 MHz and 320 MHz, to achieve ultra-high transmission rates and support scenarios with an ultra-high user density. In addition, in an ultra-large bandwidth case, scenarios of puncturing and combining a plurality of RUs are further considered. How to design a short training field (STF) sequence for a larger channel bandwidth is a problem worth concern.

SUMMARY

This application provides a method and an apparatus for transmitting a physical layer protocol data unit, to design a short training field sequence for a larger channel bandwidth.

According to a first aspect, a method for transmitting a physical layer protocol data unit is provided. The method includes: generating a physical layer protocol data unit PPDU that complies with the 802.11be standard, where the PPDU includes a short training field, and a quantity of subcarriers of a frequency domain sequence of the short training field is greater than 2048; and sending the PPDU on a target channel, where a bandwidth of the target channel is greater than or equal to 160 MHz. The method in this embodiment of this application can determine a short training sequence or a frequency domain sequence corresponding to a larger channel bandwidth, and support a receive end to perform automatic gain control on data transmitted on a channel with a larger bandwidth. The short training sequence may be obtained based on a short training sequence of an existing channel bandwidth, and a short training sequence with better performance may be obtained through simulation calculation, for example, through parameter adjustment. A short training field may be obtained based on the short training sequence. This embodiment of this application can meet a larger channel bandwidth during actual implementation, implement backward compatibility, verify, through exhaustive simulation on parameters, that the short training sequence provided in this embodiment of this application has a smaller peak-to-average power ratio PAPR and better performance, improve estimation effect of an automatic gain control circuit at the receive end, and achieve a lower receiving bit error rate.

With reference to the first aspect, in some implementations of the first aspect, the bandwidth of the target channel is 240 MHz, and the frequency domain sequence of the short training field is any one of the following:

$\{HES_{-112:16:112},-1,-HES_{-112:16:112},0,$
$HES_{-112:16:112},-1,-HES_{-112:16:112},0,$
$-HES_{-112:16:112},-1,HES_{-112:16:112},0,$
$HES_{-112:16:112},1,-HES_{-112:16:112},0,$
$-HES_{-112:16:112},1,-HES_{-112:16:112},0,$
$-HES_{-112:16:112},1,-HES_{-112:16:112}\};$ $\{HES_{-112:16:112},1,-HES_{-112:16:112},0,HES_{-112:16:112},$
$-1,HES_{-112:16:112},0,HES_{-112:16:112},1,$
$HES_{-112:16:112},0,-HES_{-112:16:112},1,$
$HES_{-112:16:112},0,-HES_{-112:16:112},-1,$
$-HES_{-112:16:112},0,-HES_{-112:16:112},1,$
$HES_{-112:16:112}\};$ $\{HES_{-112:16:112},-1,HES_{-112:16:112},0,HES_{-112:16:112},-$
$1,HES_{-112:16:112},0,HES_{-112:16:112},-1,$
$-HES_{-112:16:112},0,-HES_{-112:16:112},1,$
$HES_{-112:16:112},0,HES_{-112:16:112},1,$
$-HES_{-112:16:112},0,HES_{-112:16:112},1,$
$-HES_{-112:16:112}\};$ or $\{HES_{-112:16:112},1,-HES_{-112:16:112},0,$
$HES_{-112:16:112},-1,HES_{-112:16:112},0,$
$HES_{-112:16:112},1,HES_{-112:16:112},0,$
$-HES_{-112:16:112},1,HES_{-12:16:112},0,$
$-HES_{-12:16:112},-1,-HES_{-12:16:112},0,$
$-HES_{-112:16:112},1,HES_{-12:16:112}\},$ where $HES_{-112:16:112}=\{M\}\cdot(1+j)/\sqrt{2}$, and $M=\{-1,-1,-,1,1,1,-,1,1,1,-1,1,1,-1,1\}$.

With reference to the first aspect, in some implementations of the first aspect, the bandwidth of the target channel is 240 MHz, and the frequency domain sequence of the short training field is any one of the following:

$\{HES_{-496:16:496},0,-HES_{-496:16:496},0,$
$-HES_{-496:16:496}\};$ or $\{HES_{-496:16:496},0,HES_{-496:16:496},0,-HES_{-496:16:496}\},$ where $HES_{-496:16:496}=\{M,1,-M,0,-M,1,-M\}\cdot(1+j)/\sqrt{2}$, and $M=\{-1,-1,-1,1,1,1,-1,1,1,1,-1,1,1,-1,1\}.$ With reference to the first aspect, in some implementations of the first aspect, the bandwidth of the target channel is 240 MHz, and the frequency domain sequence of the short training field is any one of the following:

$\{HES_{-1008:16:1008},0,HES_{-496:16:496}\};$ or $\{HES_{-1008:16:1008},0,-HES_{-496:16:496}\},$ where $HES_{-1008:16:1008}=\{M,1,-M,0,-M,1,-M,0,-M,-1,M,$
$0,-M,1,-M\}\cdot(1+j)/\sqrt{2},HES_{-496:16:496}=$
$\{M,1,-M,0,-M,1,-M\}\cdot(1+j)/\sqrt{2}$, and $M=\{-1,-1,-1,1,1,-1,1,1,1,-1,1,1,-1,1\}.$ With reference to the first aspect, in some implementations of the first aspect, the bandwidth of the target channel is 240 MHz, and the frequency domain sequence of the short training field is any one of the following:

$\{HES_{-1008:16:1008},0,-HES_{-112:16:112},-1,$
$HES_{-112:16:112},0,-HES_{-112:16:112},1,$
$HES_{-112:16:112}\};$ $\{HES_{-1008:16:1008},0,HES_{-112:16:112},-1,HES_{-112:16:112},$
$0,HES_{-112:16:112},-1,-HES_{-112:16:112}\};$ or

{HES$_{-1008:16:1008}$,0,HES$_{-112:16:112}$,−1,
−HES$_{-112:16:112}$,0,−HES$_{-112:16:112}$,1,
−HES$_{-112:16:112}$}, where HES$_{-1008:16:1008}$={M,1,−M,0,−M,1,−M,0,−M,−1,M,
0,−M,1,−M}·(1+j)/√2,HES$_{-112:16:112}$={M}·(1+j)/√2, and M={−1,−1,−1,1,
1,1,−1,1,1,1,−1,1,1,−1,1}.

With reference to the first aspect, in some implementations of the first aspect, the bandwidth of the target channel is 240 MHz, and the frequency domain sequence of the short training field is any one of the following:

{HES$_{-1008:16:1008}$,0,−HES$_{-240:16:240}$,0,
−HES$_{-240:16:240}$};

{HES$_{-1008:16:1008}$,0,−HES$_{-240:16:240}$,0,
HES$_{-240:16:240}$}; or

{HES$_{-1008:16:1008}$,0,HES$_{-240:16:240}$,0,
−HES$_{-240:16:240}$}, where

HES$_{-1008:16:1008}$={M,1,−M,0,−M,1,−M,0,−M,−1,M,
0,−M,1,−M}·(1+j)/√2,HES$_{-240:16:240}$={M,0,−M}·(1+j)/√2, and M={−1,−1,−1,1,1,1,−1,1,1,1,−1,1,1,−1,1}.

With reference to the first aspect, in some implementations of the first aspect, the bandwidth of the target channel is 240 MHz, and the frequency domain sequence of the short training field is any one of the following:

{HES$_{-120:8:120}$,1,HES$_{-120:8:120}$,0,−HES$_{-120:8:120}$,1,−
HES$_{-120:8:120}$,0,HES$_{-120:8:120}$,1,−HES$_{-120:8:120}$,
0,HES$_{-120:8:120}$,1,−HES$_{-120:8:120}$,0,
HES$_{-120:8:120}$,1,HES$_{-120:8:120}$,0,−HES$_{-120:8:120}$,
1,−HES$_{-120:8:120}$};

{HES$_{-120:8:120}$,HES$_{-120:8:120}$,0,HES$_{-120:8:120}$,1,−
HES$_{-120:8:120}$,0,HES$_{-120:8:120}$,−HES$_{-120:8:120}$,
0,−HES$_{-120:8:120}$,1,HES$_{-120:8:120}$,0,
−HES$_{-120:8:120}$,1,HES$_{-120:8:120}$,0,
HES$_{-120:8:120}$,−1,HES$_{-120:8:120}$};

{HES$_{-120:8:120}$,1,−HES$_{-120:8:120}$,0,HES$_{-120:8:120}$,1,−
HES$_{-120:8:120}$,0,HES$_{-120:8:120}$,1,−HES$_{-120:8:120}$,
0,−HES$_{-120:8:120}$,HES$_{-120:8:120}$,0,HES$_{-120:8:120}$,
1,−HES$_{-120:8:120}$,0,−HES$_{-120:8:120}$,−1,
HES$_{-120:8:120}$};

{HES$_{-120:8:120}$,1,HES$_{-120:8:120}$,0,−HES$_{-120:8:120}$,1,−
HES$_{-120:8:120}$,0,−HES$_{-120:8:120}$,−1,
HES$_{-120:8:120}$,0,−HES$_{-120:8:120}$,−1,
HES$_{-120:8:120}$,0,HES$_{-120:8:120}$,1,−HES$_{-120:8:120}$,
0,HES$_{-120:8:120}$,1,−HES$_{-120:8:120}$}; or

{HES$_{-120:8:120}$,1,−HES$_{-120:8:120}$,0,−HES$_{-120:8:120}$,1,
HES$_{-120:8:120}$,0,−HES$_{-120:8:120}$,−1,
HES$_{-120:8:120}$,0,−HES$_{-120:8:120}$,−1,
HES$_{-120:8:120}$,0,HES$_{-120:8:120}$,1,−HES$_{-120:8:120}$,
0,−HES$_{-120:8:120}$,−1,HES$_{-120:8:120}$}, where HES$_{-120:8:120}$={M,0,−M}·(1+j)/√2, and M={−1,−1,−
1,1,1,1,−1,1,1,1,−1,1,1,−1,1}.

With reference to the first aspect, in some implementations of the first aspect, the bandwidth of the target channel is 240 MHz, and the frequency domain sequence of the short training field is any one of the following:

{HES$_{-504:8:504}$,0,HES$_{-504:8:504}$,0,−HES$_{-504:8:504}$}; or

{HES$_{-504:8:504}$,0,−HES$_{-504:8:504}$,0,−HES$_{-504:8:504}$},
where

HES$_{-504:8:504}$={M,−1,M,−1,−M,−1,M,0,−M,1,M,1,−
M,1,−M}·(1+j)/√2, and M={−1−1,−1,1,1,1,−1,1,1,
1,1,−1,1,1,−1,1}.

With reference to the first aspect, in some implementations of the first aspect, the bandwidth of the target channel is 240 MHz, and the frequency domain sequence of the short training field is any one of the following:

{HES$_{-1016:8:1016}$,0,HES$_{-504:8:504}$}; or

{HES$_{-1016:8:1016}$,0,−HES$_{-504:8:504}$}, where

HES$_{-1016:8:1016}$={M,−1,M,−M,−1,M,0,−M,1,M,1,−M,
1,−M,0,−M,1,−M,1,M,1,−M,0,−M,1,M,1,−M,1,−
M}·(1+j)/√2,HES$_{-504:8:504}$={M,−1,M,−1,
−M,−1,M,0,−M,1,M,1,−M,1,−M}·(1+j)/√2, and
M={−1,−1,−1,1,1,1,−1,1,1,1,−1,1,1,−1,1}.

With reference to the first aspect, in some implementations of the first aspect, the bandwidth of the target channel is 240 MHz, and the frequency domain sequence of the short training field is any one of the following:

{HES$_{-1016:8:1016}$,0,HES$_{-120:8:120}$,−1,−HES$_{-120:8:120}$,
0,HES$_{-120:8:120}$,1,HES$_{-120:8:120}$};

{HES$_{-1016:8:1016}$,0,−HES$_{-120:8:120}$,1,−HES$_{-120:8:120}$,
0,−HES$_{-120:8:120}$,1,−HES$_{-120:8:120}$};

{HES$_{-1016:8:1016}$,0,HES$_{-120:8:120}$,1,−HES$_{-120:8:120}$,
0,−HES$_{-120:8:120}$,1,HES$_{-120:8:120}$};

{HES$_{-1016:8:1016}$,0,−HES$_{-120:8:120}$,−1,HES$_{-120:8:120}$,
0,HES$_{-120:8:120}$,1,−HES$_{-120:8:120}$};

{HES$_{-1016:8:1016}$,0,−HES$_{-120:8:120}$,−1,−HES$_{-120:8:120}$,
0,HES$_{-120:8:120}$,1,HES$_{-120:8:120}$};

{HES$_{-1016:8:1016}$,0,HES$_{-120:8:120}$,1,HES$_{-120:8:120}$,0,
HES$_{-120:8:120}$,1,−HES$_{-120:8:120}$};

{HES$_{-1016:8:1016}$,0,HES$_{-120:8:120}$,1,−HES$_{-120:8:120}$,
0,−HES$_{-120:8:120}$,1,HES$_{-120:8:120}$}; or

{HES$_{-1016:8:1016}$,0,−HES$_{-120:8:120}$,−1,HES$_{-120:8:120}$,
0,HES$_{-120:8:120}$,1,−HES$_{-120:8:120}$}, where HES$_{-1016:8:1016}$={M,−1,M,−M,−1,M,0,−M,1,M,1,−M,
1,−M,0,−M,1,−M,1,M,1,−M,0,−M,1,M,1,−M,1,−
M}·(1+j)/√2,HES$_{-120:8:120}$={M,0,−M}·(1+j)/√2,
and M={−1,−1,−1,1,1,1,−1,1,1,1,−1,1,1,−1,1}.

With reference to the first aspect, in some implementations of the first aspect, the bandwidth of the target channel is 240 MHz, and the frequency domain sequence of the short training field is any one of the following:

{HES$_{-1016:8:1016}$,0,−HES$_{-248:8:248}$,0,HES$_{-248:8:248}$};

{HES$_{-1016:8:1016}$,0,−HES$_{-248:8:248}$,0,−HES$_{-248:8:248}$};
or

{HES$_{-1016:8:1016}$,0,HES$_{-248:8:248}$,0,HES$_{-248:8:248}$},
where

HES$_{-1016:8:101}$={M,−1,M,−M,−1,M,0,−M,1,M,1,−M,
1,−M,0,−M,1,−M,1,M,1,−M,0,−M,1,M,1,−M,1,−
M}·(1+j)/√2,HES$_{-248:8:248}$={M,−1,−M,
0,M,−1,M}·(1+j)/√2, and M{=−1,−1,−1,1,1,1,−1,
1,1,1,−1,1,1,−1,1}.

With reference to the first aspect, in some implementations of the first aspect, the bandwidth of the target channel is 320 MHz, and the frequency domain sequence of the short training field is any one of the following:

{HES$_{-496:16:496}$,0,HES$_{-496:16:496}$,0,HES$_{-496:16:496}$,0,−
HES$_{-496:16:496}$}; or

{$HES_{-496:16:496}, 0, HES_{-496:16:496}, 0, -HES_{-496:16:496}, 0, -HES_{-496:16:496}$}, where $HES_{-496:16:496} = \{M, 1, -M, 0, -M, 1, -M\} \cdot (1+j)/\sqrt{2}$, and $M = \{-1, -1, -1, 1, 1, 1, -1, 1, 1, 1, -1, 1, 1, -1, 1\}$.

With reference to the first aspect, in some implementations of the first aspect, the bandwidth of the target channel is 320 MHz, and the frequency domain sequence of the short training field is any one of the following:

{$HES_{-1008:16:1008}, 0, HES_{-1008:16:1008}$}; or

{$HES_{-1008:16:1008}, 0, -HES_{-1008:16:1008}$}, where $HES_{-1008:16:1008} = \{M, 1, -M, 0, -M, 1, -M, 0, -M, -1, M, 0, -M, 1, -M\} \cdot (1+j)/\sqrt{2}$, and $M = \{-1, -1, -1, 1, 1, 1, -1, 1, 1, 1, 1, -1, 1, 1, -1, 1\}$.

With reference to the first aspect, in some implementations of the first aspect, the bandwidth of the target channel is 320 MHz, and the frequency domain sequence of the short training field is any one of the following:

{$HES_{-1008:16:1008}, 0, -HES_{-112:16:112}, 1, -HES_{-112:16:112}, 0, HES_{-112:16:112}, -1, -HES_{-112:16:112}, 0, HES_{-112:16:112}, -1, HES_{-112:16:112}, 0, HES_{-112:16:112}, -1, -HES_{-112:16:112}$};

{$HES_{-1008:16:1008}, 0, -HES_{-112:16:112}, -1, HES_{-112:16:112}, 0, HES_{-112:16:112}, -1, -HES_{-112:16:112}, 0, HES_{-112:16:112}, -1, -HES_{-112:16:112}, 0, -HES_{-112:16:112}, 1, -HES_{-112:16:112}$}; or

{$HES_{-1008:16:1008}, 0, -HES_{-112:16:112}, 1, HES_{-112:16:112}, 0, -HES_{-112:16:112}, -1, HES_{-112:16:112}, 0, HES_{-112:16:112}, -1, HES_{-112:16:112}, 0, HES_{-112:16:112}, -1, -HES_{-112:16:112}$}, where $HES_{-1008:16:1008} = \{M, 1, -M, 0, -M, 1, -M, 0, -M, -1, M, 0, -M, 1, -M\} \cdot (1+j)/\sqrt{2}$, $HES_{-112:16:112} = \{M\} \cdot (1+j)/\sqrt{2}$, and $M = \{-1, -1, -, 1, 1, 1, -1, 1, 1, 1, -1, 1, 1, -1, 1\}$.

With reference to the first aspect, in some implementations of the first aspect, the bandwidth of the target channel is 320 MHz, and the frequency domain sequence of the short training field is any one of the following:

{$HES_{-1008:16:1008}, 0, -HES_{-240:16:240}, 0, HES_{-240:16:240}, 0, -HES_{-240:16:240}, 0, HES_{-240:16:240}$}; or

{$HES_{-1008:16:1008}, 0, -HES_{-240:16:240}, 0, HES_{-240:16:240}, 0, HES_{-240:16:240}, 0, -HES_{-240:16:240}$}, where $HES_{-1008:16:1008} = \{M, 1, -M, 0, -M, 1, -M, 0, -M, -1, M, 0, -M, 1, -M\} \cdot (1+j)/\sqrt{2}$, $HES_{-240:16:240} = \{M, 0, -M\} \cdot (1+j)/\sqrt{2}$, and $M = \{-1, -1, -1, 1, 1, 1, -1, 1, 1, 1, -1, 1, 1, -1, 1\}$.

With reference to the first aspect, in some implementations of the first aspect, the bandwidth of the target channel is 320 MHz, and the frequency domain sequence of the short training field is any one of the following:

{$HES_{-504:8:504}, 0, HES_{-504:8:504}, 0, -HES_{-504:8:504}, 0, -HES_{-504:8:504}$}; or

{$HES_{-504:8:504}, 0, HES_{-504:8:504}, 0, HES_{-504:8:504}, 0, -HES_{-504:8:504}$}, where $HES_{-504:8:504} = \{M, -1, M, -1, -M, -1, M, 0, -M, 1, M, 1, -M, 1, -M\} \cdot (1+j)/\sqrt{2}$, and $M = \{-1 -1, -1, 1, 1, 1, -1, 1, 1, -1, 1, 1, -1, 1\}$.

With reference to the first aspect, in some implementations of the first aspect, the bandwidth of the target channel is 320 MHz, and the frequency domain sequence of the short training field is any one of the following:

{$HES_{-1016:8:1016}, 0, HES_{-1016:8:1016}$}; or

{$HES_{-1016:8:1016}, 0, -HES_{-1016:8:1016}$}, where $HES_{-1016:8:1016} = \{M, -1, M, -M, -1, M, 0, -M, 1, M, 1, -M, 1, -M, 0, -M, 1, -M, 1, M, 1, -M, 0, -M, 1, M, 1, -M, 1, -M\} \cdot (1+j)/\sqrt{2}$, and $M = \{-1, -1, -1, 1, 1, 1, -1, 1, 1, 1, 1, 1, 1, -1, 1\}$.

With reference to the first aspect, in some implementations of the first aspect, the bandwidth of the target channel is 320 MHz, and the frequency domain sequence of the short training field is any one of the following:

{$HES_{-1016:8:1016}, 0, HES_{-120:8:120}, 1, HES_{-120:8:120}, 0, -HES_{-120:8:120}, 1, -HES_{-120:8:120}, 0, HES_{-120:8:120}, 1, -HES_{-120:8:120}, 0, HES_{-120:8:120}, 1, -HES_{-120:8:120}$};

{$HES_{-1016:8:1016}, 0, -HES_{-120:8:120}, 1, HES_{-120:8:120}, 0, HES_{-120:8:120}, 1, -HES_{-120:8:120}, 0, -HES_{-120:8:120}, -1, -HES_{-120:8:120}, 0, HES_{-120:8:120}, 1, -HES_{-120:8:120}$};

{$HES_{-1016:8:1016}, 0, -HES_{-120:8:120}, 1, HES_{-120:8:120}, 0, HES_{-120:8:120}, 1, -HES_{-120:8:120}, 0, HES_{-120:8:120}, 1, -HES_{-120:8:120}, 0, -HES_{-120:8:120}, 1, -HES_{-120:8:120}$};

{$HES_{-1016:8:1016}, 0, HES_{-120:8:120}, 1, -HES_{-120:8:120}, 0, -HES_{-120:8:120}, 1, HES_{-120:8:120}, 0, HES_{-120:8:120}, 1, -HES_{-120:8:120}, 0, HES_{-120:8:120}, 1, -HES_{-120:8:120}$};

{$HES_{-1016:8:1016}, 0, -HES_{-120:8:120}, 1, HES_{-120:8:120}, 0, HES_{-120:8:120}, -1, -HES_{-120:8:120}, 0, -HES_{-120:8:120}, -1, -HES_{-120:8:120}, 0, HES_{-120:8:120}, -1, -HES_{-120:8:120}$};

{$HES_{-1016:8:1016}, 0, HES_{-120:8:120}, 1, -HES_{-120:8:120}, 0, -HES_{-120:8:120}, 1, HES_{-120:8:120}, 0, HES_{-120:8:120}, 1, -HES_{-120:8:120}, 0, HES_{-120:8:120}, 1, -HES_{-120:8:120}$}; or

{$HES_{-1016:8:1016}, 0, -HES_{-120:8:120}, -1, HES_{-120:8:120}, 0, HES_{-120:8:120}, 1, -HES_{-120:8:120}, 0, HES_{-120:8:120}, -1, HES_{-120:8:120}, 0, -HES_{-120:8:120}, -1, -HES_{-120:8:120}$}, where $HES_{-1016:8:1016} = \{M, -1, M, -M, -1, M, 0, -M, 1, M, 1, -M, 1, -M, 0, -M, 1, -M, 1, M, 1, -M, 0, -M, 1, M, 1, -M, 1, -M\} \cdot (1+j)/\sqrt{2}$, $HES_{-120:8:120} = \{M, 0, -M\} \cdot (1+j)/\sqrt{2}$, and $M = \{-1, -1, -1, 1, 1, 1, -1, 1, 1, 1, 1, -1, 1, 1, -1, 1\}$.

With reference to the first aspect, in some implementations of the first aspect, the bandwidth of the target channel is 320 MHz, and the frequency domain sequence of the short training field is any one of the following:

{$HES_{-1016:8:1016}, 0, HES_{-504:8:504}, 0, HES_{-504:8:504}$};

{$HES_{-1016:8:1016}, 0, -HES_{-504:8:504}, 0, HES_{-504:8:504}$}; or

{$HES_{-1016:8:1016}, 0, -HES_{-504:8:504}, 0, -HES_{-504:8:504}$}, where $HES_{-1016:8:1016} = \{M, -1, M, -M, -1, M, 0, -M, 1, M, 1, -M, 1, -M, 0, -M, 1, -M, 1, M, 1, -M, 0, -M, 1, M, 1, -M, 1, -M\} \cdot (1+j)/\sqrt{2}$, $HES_{-504:8:504} = \{M, -1, M, -1, -M, -1, M, 0, -M, 1, M, 1, -M, 1, -M\} \cdot (1+j)/\sqrt{2}$, and $M = \{-1, -1, -1, 1, 1, 1, -1, 1, 1, 1, -1, 1, 1, -1, 1\}$.

With reference to the first aspect, in some implementations of the first aspect, the bandwidth of the target channel is 320 MHz, and the frequency domain sequence of the short training field is any one of the following:

{HES$_{-1016:8:1016}$,0,HES$_{-248:8:248}$,0,HES$_{-248:8:248}$,0,-
HES$_{-248:8:248}$,0,-HES$_{-248:8:248}$}; or

{HES$_{-1016:8:1016}$,0,HES$_{-248:8:248}$,0,HES$_{-248:8:248}$,0,
HES$_{-248:8:248}$,0,HES$_{-248:8:248}$}, where HES$_{-1016:8:1016}$={$M$,-1,$M$,-$M$,-1,$M$,0,-$M$,1,$M$,1,-$M$,
1,-$M$,0,-$M$,1,-$M$,1,$M$,1,-$M$,0,-$M$,1,$M$,1,-$M$,1,-
$M$}·(1+$j$)/
$\sqrt{2}$,HES$_{-248:8:248}$={$M$,-1,-$M$,0,$M$,-1,$M$}·(1+$j$)/
$\sqrt{2}$, and $M$={-1,-1,-1,1,1,1,-1,1,1,1,-1,1,1,-1,
1}.

According to a second aspect, another method for transmitting a physical layer protocol data unit is provided. The method includes: receiving a physical layer protocol data unit PPDU that complies with the 802.11be standard on a target channel, where the PPDU includes a short training field, a quantity of subcarriers of a frequency domain sequence of the short training field is greater than 2048, and a bandwidth of the target channel is greater than or equal to 160 MHz; and parsing the PPDU.

With reference to the second aspect, in some implementations of the second aspect, the bandwidth of the target channel is 240 MHz, and the frequency domain sequence of the short training field is any one of the following:

{HES$_{-112:16:112}$,-1,-HES$_{-112:16:112}$,0,
HES$_{-112:16:112}$,-1,-HES$_{-112:16:112}$,0,
-HES$_{-112:16:112}$,-1,HES$_{-112:16:112}$,0,
HES$_{-112:16:112}$,1,-HES$_{-112:16:112}$,0,
-HES$_{-112:16:112}$,1,-HES$_{-112:16:112}$,0,
-HES$_{-112:16:112}$,1,-HES$_{-112:16:112}$};

{HES$_{-112:16:112}$,1,-HES$_{-112:16:112}$,0,HES$_{-112:16:112}$,-
1,HES$_{-112:16:112}$,0,HES$_{-112:16:112}$,1,
HES$_{-112:16:112}$,0,-HES$_{-112:16:112}$,1,
HES$_{-112:16:112}$,0,-HES$_{-112:16:112}$,-1,
-HES$_{-112:16:112}$,0,-HES$_{-112:16:112}$,1,
HES$_{-112:16:112}$};

{HES$_{-112:16:112}$,-1,HES$_{-112:16:112}$,0,HES$_{-112:16:112}$,-
1,HES$_{-112:16:112}$,0,HES$_{-112:16:112}$,-1,
-HES$_{-112:16:112}$,0,-HES$_{-112:16:112}$,1,
HES$_{-112:16:112}$,0,HES$_{-112:16:112}$,1,
-HES$_{-112:16:112}$,0,HES$_{-112:16:112}$,1,
-HES$_{-112:16:112}$}; or

{HES$_{-112:16:112}$,1,-HES$_{-112:16:112}$,0,HES$_{-112:16:112}$,-
1,HES$_{-112:16:112}$,0,HES$_{-112:16:112}$,1,
HES$_{-112:16:112}$,0,-HES$_{-112:16:112}$,1,
HES$_{-112:16:112}$,0,-HES$_{-112:16:112}$,-1,
-HES$_{-112:16:112}$,0,-HES$_{-112:16:112}$,1,
HES$_{-112:16:112}$}, where HES$_{-112:16:112}$={$M$}·(1+$j$)/$\sqrt{2}$, and $M$={-1,-1,-,1,1,
1,-,1,1,1,-1,1,1,-1,1}.

With reference to the second aspect, in some implementations of the second aspect, the bandwidth of the target channel is 240 MHz, and the frequency domain sequence of the short training field is any one of the following:

{HES$_{-496:16:496}$,0,-HES$_{-496:16:496}$,0,
-HES$_{-496:16:496}$}; or

{HES$_{-496:16:496}$,0,HES$_{-496:16:496}$,0,-HES$_{-496:16:496}$},
where

HES$_{-496:16:496}$={$M$,1,-$M$,0,-$M$,1,-$M$}·(1+$j$)/$\sqrt{2}$, and
$M$={-1,-1,-1,1,1,1,-,1,1,1,-1,1,1,-1,1}.

With reference to the second aspect, in some implementations of the second aspect, the bandwidth of the target channel is 240 MHz, and the frequency domain sequence of the short training field is any one of the following:

{HES$_{-1008:16:1008}$,0,HES$_{-496:16:496}$}; or

{HES$_{-1008:16:1008}$,0,-HES$_{-496:16:496}$}, where

HES$_{-1008:16:1008}$={$M$,1,-$M$,0,-$M$,1,-$M$,0,-$M$,-1,$M$,
0,-$M$,1,-$M$}·(1+$j$)/
$\sqrt{2}$,HES$_{-496:16:496}$={$M$,1,-$M$,0,-$M$,1,-$M$}·(1+$j$)/
$\sqrt{2}$, and $M$={-1,-,-,,1,1,1,-,1,1,1,-,1,1,-1,1}.

With reference to the second aspect, in some implementations of the second aspect, the bandwidth of the target channel is 240 MHz, and the frequency domain sequence of the short training field is any one of the following:

{HES$_{-1008:16:1008}$,0,-HES$_{-112:16:112}$,-1,
HES$_{-112:16:112}$,0,-HES$_{-112:16:112}$,1,
HES$_{-112:16:112}$};

{HES$_{-1008:16:1008}$,0,HES$_{-112:16:112}$,-1,HES$_{-112:16:112}$,
0,HES$_{-112:16:112}$,-1,-HES$_{-112:16:112}$}; or

{HES$_{-1008:16:1008}$,0,HES$_{-112:16:112}$,-1,
-HES$_{-112:16:112}$,0,-HES$_{-112:16:112}$,1,
-HES$_{-112:16:112}$}, where HES$_{-1008:16:1008}$={$M$,1,-$M$,0,-$M$,1,-$M$,0,-$M$,-1,$M$,
0,-$M$,1,-$M$}·(1+$j$)/$\sqrt{2}$,HES$_{-112:16:112}$={$M$}·(1+$j$)/
$\sqrt{2}$, and $M$={-1,-1,-1,1,1,1,-1,1,1,1,-1,1,1,-1,
1}.

With reference to the second aspect, in some implementations of the second aspect, the bandwidth of the target channel is 240 MHz, and the frequency domain sequence of the short training field is any one of the following:

{HES$_{-1008:16:1008}$,0,-HES$_{-240:16:240}$,0,
-HES$_{-240:16:240}$};

{HES$_{-1008:16:1008}$,0,-HES$_{-240:16:240}$,0,
HES$_{-240:16:240}$}; or

{HES$_{-1008:16:1008}$,0,HES$_{-240:16:240}$,0,
-HES$_{-240:16:240}$}, where

HES_1008:16:1008={$M$,1,-$M$,0,-$M$,1,-$M$,0,-$M$,-1,
$M$,0,-$M$,1,-$M$}·(1+$j$)/
$\sqrt{2}$,HES$_{-240:16:240}$={$M$,0,-$M$}·(1+$j$)/$\sqrt{2}$, and
$M$={-1,-1,-1,1,1,1,-1,1,1,1,-1,1,1,-1,1}.

With reference to the second aspect, in some implementations of the second aspect, the bandwidth of the target channel is 240 MHz, and the frequency domain sequence of the short training field is any one of the following:

{HES$_{-120:8:120}$,1,HES$_{-120:8:120}$,0,-HES$_{-120:8:120}$,1,-
HES$_{-120:8:120}$,0,HES$_{-120:8:120}$,1,-HES$_{-120:8:120}$,
0,HES$_{-120:8:120}$,1,-HES$_{-120:8:120}$,0,
HES$_{-120:8:120}$,1,HES$_{-120:8:120}$,0,-HES$_{-120:8:120}$,
1,-HES$_{-120:8:120}$};

{HES$_{-120:8:120}$,HES$_{-120:8:120}$,0,HES$_{-120:8:120}$,1,-
HES$_{-120:8:120}$,0,HES$_{-120:8:120}$,-HES$_{-120:8:120}$,
0,-HES$_{-120:8:120}$,1,HES$_{-120:8:120}$,0,
-HES$_{-120:8:120}$,1,HES$_{-120:8:120}$,0,
HES$_{-120:8:120}$,-1,HES$_{-120:8:120}$};

{HES$_{-120:8:120}$,1,-HES$_{-120:8:120}$,0,HES$_{-120:8:120}$,1,-
HES$_{-120:8:120}$,0,HES$_{-120:8:120}$,1,-HES$_{-120:8:120}$,
0,-HES$_{-120:8:120}$,1,HES$_{-120:8:120}$,0,
HES$_{-120:8:120}$,1,-HES$_{-120:8:120}$,0,
-HES$_{-120:8:120}$,-1,HES$_{-120:8:120}$};

{HES$_{-120:8:120}$,1,HES$_{-120:8:120}$,0,-HES$_{-120:8:120}$,1,-
HES$_{-120:8:120}$,0,-HES$_{-120:8:120}$,-1,
HES$_{-120:8:120}$,0,-HES$_{-120:8:120}$,-1,
HES$_{-120:8:120}$,0,HES$_{-120:8:120}$,1,-HES$_{-120:8:120}$,
0,HES$_{-120:8:120}$,1,-HES$_{-120:8:120}$}; or

{HES$_{-120:8:120}$,1,-HES$_{-120:8:120}$,0,-HES$_{-120:8:120}$,1,
HES$_{-120:8:120}$,0,-HES$_{-120:8:120}$,-1,
HES$_{-120:8:120}$,0,-HES$_{-120:8:120}$,-1,
HES$_{-120:8:120}$,0,HES$_{-120:8:120}$,1,-HES$_{-120:8:120}$,
0,-HES$_{-120:8:120}$,-1,HES$_{-120:8:120}$}, where HES$_{-120:8:120}$={$M$,0,-$M$}·(1+$j$)/$\sqrt{2}$, and $M$={-1,-1,-
1,1,1,1,-1,1,1,1,-1,1,1,-1,1}.

With reference to the second aspect, in some implementations of the second aspect, the bandwidth of the target channel is 240 MHz, and the frequency domain sequence of the short training field is any one of the following:

{HES$_{-504:8:504}$,0,HES$_{-504:8:504}$,0,−HES$_{-504:8:504}$}; or

{HES$_{-504:8:504}$,0,−HES$_{-504:8:504}$,0,−HES$_{-504:8:504}$}, where

HES$_{-504:8:504}$={M,−1,M,−1,−M,−1,M,0,−M,1,M,1,−M,1,−M}·(1+j)/√2, and M={−1−1,−1,1,1,1,−1,1,1,−1,1,1,−1,1}.

With reference to the second aspect, in some implementations of the second aspect, the bandwidth of the target channel is 240 MHz, and the frequency domain sequence of the short training field is any one of the following:

{HES$_{-1016:8:1016}$,0,HES$_{-504:8:504}$}; or

{HES$_{-1016:8:1016}$,0,−HES$_{-504:8:504}$}, where

HES$_{-1016:8:1016}$={M,−1,M,−M,−1,M,0,−M,1,M,1,−M,1,−M,0,−M,1,−M,1,M,1,−M,0,−M,1,M,1,−M,1,−M}·(1+j)/√2, HES$_{-504:8:504}$={M,−1,M,−1,−M,−1,M,0,−M,1,M,1,−M,1,−M}·(1+j)/√2, and M={−1,−1,−1,1,1,1,1,−1,1,1,1,−1,1,1,−1,1}.

With reference to the second aspect, in some implementations of the second aspect, the bandwidth of the target channel is 240 MHz, and the frequency domain sequence of the short training field is any one of the following:

{HES$_{-1016:8:1016}$,0,HES$_{-120:8:120}$,−1,−HES$_{-120:8:120}$,0,HES$_{-120:8:120}$,1,HES$_{-120:8:120}$};

{HES$_{-1016:8:1016}$,0,−HES$_{-120:8:120}$,1,−HES$_{-120:8:120}$,0,−HES$_{-120:8:120}$,1,−HES$_{-120:8:120}$};

{HES$_{-1016:8:1016}$,0,HES$_{-120:8:120}$,1,−HES$_{-120:8:120}$,0,−HES$_{-120:8:120}$,1,HES$_{-120:8:120}$};

{HES$_{-1016:8:1016}$,0,−HES$_{-120:8:120}$,−1,HES$_{-120:8:120}$,0,HES$_{-120:8:120}$,1,−HES$_{-120:8:120}$};

{HES$_{-1016:8:1016}$,0,−HES$_{-120:8:120}$,−1,−HES$_{-120:8:120}$,0,HES$_{-120:8:120}$,1,HES$_{-120:8:120}$};

{HES$_{-1016:8:1016}$,0,−HES$_{-120:8:120}$,1,HES$_{-120:8:120}$,0,HES$_{-120:8:120}$,1,−HES$_{-120:8:120}$};

{HES$_{-1016:8:1016}$,0,HES$_{-120:8:120}$,1,−HES$_{-120:8:120}$,0,−HES$_{-120:8:120}$,1,HES$_{-120:8:120}$}; or

{HES$_{-1016:8:1016}$,0,−HES$_{-120:8:120}$,−1,HES$_{-120:8:120}$,0,HES$_{-120:8:120}$,1,−HES$_{-120:8:120}$}, where HES$_{-1016:8:1016}$={M,−1,M,−M,−1,M,0,−M,1,M,1,−M,1,−M,0,−M,1,−M,1,M,1,−M,0,−M,1,M,1,−M,1,−M}·(1+j)/√2, HES$_{-120:8:120}$={M,0,−M}·(1+j)/√2, and M={−1,−1,−1,1,1,1,−1,1,1,1,−1,1,1,−1,1}.

With reference to the second aspect, in some implementations of the second aspect, the bandwidth of the target channel is 240 MHz, and the frequency domain sequence of the short training field is any one of the following:

{HES$_{-1016:8:1016}$,0,−HES$_{-248:8:248}$,0,HES$_{-248:8:248}$};

{HES$_{-1016:8:1016}$,0,−HES$_{-248:8:248}$,0,−HES$_{-248:8:248}$}; or

{HES$_{-1016:8:1016}$,0,HES$_{-248:8:248}$,0,HES$_{-248:8:248}$}, where

HES$_{-1016:8:101}$={M,−1,M,−M,−1,M,0,−M,1,M,1,−M,1,−M,0,−M,1,−M,1,M,1,−M,0,−M,1,M,1,−M,1,−M}·(1+j)/√2, HES$_{-248:8:248}$={M,−1,−M,0,M,−1,M}·(1+j)/√2, and M={−1,−1,−1,1,1,1,1,−1,1,1,1,1,−1,1,1,−1,1}.

With reference to the second aspect, in some implementations of the second aspect, the bandwidth of the target channel is 320 MHz, and the frequency domain sequence of the short training field is any one of the following:

{HES$_{-496:16:496}$,0,HES$_{-496:16:496}$,0,HES$_{-496:16:496}$,0,−HES$_{-496:16:496}$}; or

{HES$_{-496:16:496}$,0,HES$_{-496:16:496}$,0,−HES$_{-496:16:496}$,0,−HES$_{-496:16:496}$}, where HES$_{-496:16:496}$={M,1,−M,0,−M,1,−M}·(1+j)/√2, and M={−1,−1,−1,1,1,1,1,−1,1,1,1,−1,1,1,−1,1}.

With reference to the second aspect, in some implementations of the second aspect, the bandwidth of the target channel is 320 MHz, and the frequency domain sequence of the short training field is any one of the following:

{HES$_{-1008:16:1008}$,0,HES$_{-1008:16:1008}$}; or

{HES$_{-1008:16:1008}$,0,−HES$_{-1008:16:1008}$}, where

HES$_{-1008:16:1008}$={M,1,−M,0,−M,1,−M,0,−M,−1,M,0,−M,1,−M}(1+j)/√2, and M={−1,−1,−1,1,1,1,−1,1,1,1,1,1,−1,1,1,−1,1}.

With reference to the second aspect, in some implementations of the second aspect, the bandwidth of the target channel is 320 MHz, and the frequency domain sequence of the short training field is any one of the following:

{HES$_{-1008:16:1008}$,0,−HES$_{-112:16:112}$,1,−HES$_{-112:16:112}$,0,HES$_{-112:16:112}$,−1,−HES$_{-112:16:112}$,0,HES$_{-112:16:112}$,−1,HES$_{-112:16:112}$,0,HES$_{-112:16:112}$,−1,−HES$_{-112:16:112}$};

{HES$_{-1008:16:1008}$,0,−HES$_{-112:16:112}$,−1,HES$_{-112:16:112}$,0,HES$_{-112:16:112}$,−1,−HES$_{-112:16:112}$,0,HES$_{-112:16:112}$,−1,−HES$_{-112:16:112}$,0,−HES$_{-112:16:112}$,1,−HES$_{-112:16:112}$}; or

{HES$_{-1008:16:1008}$,0,−HES$_{-112:16:112}$,1,HES$_{-112:16:112}$,0,−HES$_{-112:16:112}$,−1,HES$_{-112:16:112}$,0,HES$_{-112:16:112}$,−1,HES$_{-112:16:112}$,0,HES$_{-112:16:112}$,−1,−HES$_{-112:16:112}$}, where HES$_{-1008:16:1008}$={M,1,−M,0,−M,1,−M,0,−M,−1,M,0,−M,1,−M}·(1+j)/√2, HES$_{-112:16:112}$={M}·(1+j)/√2, and M={−1,−1,1,1,1,1,−1,1,1,1,−1,1,1,−1,1}.

With reference to the second aspect, in some implementations of the second aspect, the bandwidth of the target channel is 320 MHz, and the frequency domain sequence of the short training field is any one of the following:

{HES$_{-1008:16:1008}$,0,−HES$_{-240:16:240}$,0,HES$_{-240:16:240}$,0,−HES$_{-240:16:240}$,0,HES$_{-240:16:240}$}; or

{HES$_{-1008:16:1008}$,0,−HES$_{-240:16:240}$,0,HES$_{-240:16:240}$,0,HES$_{-240:16:240}$,0,−HES$_{-240:16:240}$}, where HES$_{-1008:16:1008}$={M,1,−M,0,−M,1,−M,0,−M,−1,M,0,−M,1,−M}·(1+j)/√2, HES$_{-240:16:240}$={M,0,−M}·(1+j)/√2, and M={−1,−1,−1,1,1,1,−1,1,1,1,−1,1,1,−1,1}.

With reference to the second aspect, in some implementations of the second aspect, the bandwidth of the target channel is 320 MHz, and the frequency domain sequence of the short training field is any one of the following:

{HES$_{-504:8:504}$,0,HES$_{-504:8:504}$,0,−HES$_{-504:8:504}$,0,−HES$_{-504:8:504}$}; or

{HES$_{-504:8:504}$,0,HES$_{-504:8:504}$,0,HES$_{-504:8:504}$,0,-HES$_{-504:8:504}$}, where HES$_{-504:8:504}$={$M$,-1,$M$,-1,-$M$,-1,$M$,0,-$M$,1,$M$,1,-$M$,1,-$M$}·(1+$j$)/$\sqrt{2}$, and $M$={-1-1,-1,1,1,1,-1,1,1,1,-1,1,1,-1,1}.

With reference to the second aspect, in some implementations of the second aspect, the bandwidth of the target channel is 320 MHz, and the frequency domain sequence of the short training field is any one of the following:

{HES$_{-1016:8:1016}$,0,HES$_{-1016:8:1016}$}; or

{HES$_{-1016:8:1016}$,0,-HES$_{-1016:8:1016}$}, where

HES_1016:8:1016={$M$,-1,$M$,-$M$,-1,$M$,0,-$M$,1,$M$,1,-$M$,1,-$M$,0,-$M$,1,-$M$,1,$M$,1,-$M$,0,-$M$,1,$M$,1,-$M$,1,-$M$}·(1+$j$)/$\sqrt{2}$, and $M$={-1,-1,-1,1,1,1,1,-1,1,1,1,-1,1,1,-1,1}.

With reference to the second aspect, in some implementations of the second aspect, the bandwidth of the target channel is 320 MHz, and the frequency domain sequence of the short training field is any one of the following:

{HES$_{-1016:8:1016}$,0,HES$_{-120:8:120}$,1,HES$_{-120:8:120}$,0,-HES$_{-120:8:120}$,1,-HES$_{-120:8:120}$,0,HES$_{-120:8:120}$,1,-HES$_{-120:8:120}$,0,HES$_{-120:8:120}$,1,-HES$_{-120:8:120}$};

{HES$_{-1016:8:1016}$,0,-HES$_{-120:8:120}$,1,HES$_{-120:8:120}$,0,HES$_{-120:8:120}$,1,-HES$_{-120:8:120}$,0,-HES$_{-120:8:120}$,-1,-HES$_{-120:8:120}$,0,HES$_{-120:8:120}$,1,-HES$_{-120:8:120}$};

{HES$_{-1016:8:1016}$,0,-HES$_{-120:8:120}$,1,HES$_{-120:8:120}$,0,HES$_{-120:8:120}$,1,-HES$_{-120:8:120}$,0,HES$_{-120:8:120}$,1,-HES$_{-120:8:120}$,0,-HES$_{-120:8:120}$,1,-HES$_{-120:8:120}$};

{HES$_{-1016:8:1016}$,0,HES$_{-120:8:120}$,1,-HES$_{-120:8:120}$,0,-HES$_{-120:8:120}$,1,HES$_{-120:8:120}$,0,HES$_{-120:8:120}$,1,-HES$_{-120:8:120}$,0,HES$_{-120:8:120}$,1,-HES$_{-120:8:120}$};

{HES$_{-1016:8:1016}$,0,-HES$_{-120:8:120}$,1,HES$_{-120:8:120}$,0,HES$_{-120:8:120}$,-1,-HES$_{-120:8:120}$,0,-HES$_{-120:8:120}$,-1,-HES$_{-120:8:120}$,0,HES$_{-120:8:120}$,-1,-HES$_{-120:8:120}$};

{HES$_{-1016:8:1016}$,0,HES$_{-120:8:120}$,1,-HES$_{-120:8:120}$,0,-HES$_{-120:8:120}$,1,HES$_{-120:8:120}$,0,HES$_{-120:8:120}$,1,-HES$_{-120:8:120}$,0,HES$_{-120:8:120}$,1,-HES$_{-120:8:120}$}; or

{HES$_{-1016:8:1016}$,0,-HES$_{-120:8:120}$,-1,HES$_{-120:8:120}$,0,HES$_{-120:8:120}$,1,-HES$_{-120:8:120}$,0,HES$_{-120:8:120}$,-1,HES$_{-120:8:120}$,0,-HES$_{-120:8:120}$,-1,-HES$_{-120:8:120}$}, where HES$_{-1016:8:1016}$={$M$,-1,$M$,-$M$,-1,$M$,0,-$M$,1,$M$,1,-$M$,1,-$M$,0,-$M$,1,-$M$,1,$M$,1,-$M$,0,-$M$,1,$M$,1,-$M$,1,-$M$}·(1+$j$)/$\sqrt{2}$,HES$_{-120:8:120}$={$M$,0,-$M$}·(1+$j$)/$\sqrt{2}$, and $M$={-1,-1,-1,1,1,1,-1,1,1,1,-1,1,1,-1,1,1}.

With reference to the second aspect, in some implementations of the second aspect, the bandwidth of the target channel is 320 MHz, and the frequency domain sequence of the short training field is any one of the following:

{HES$_{-1016:8:1016}$,0,HES$_{-504:8:504}$,0,HES$_{-504:8:504}$};

{HES$_{-1016:8:1016}$,0,-HES$_{-504:8:504}$,0,HES$_{-504:8:504}$}; or

{HES$_{-1016:8:1016}$,0,-HES$_{-504:8:504}$,0,-HES$_{-504:8:504}$}, where

HES$_{-1016:8:1016}$={$M$,-1,$M$,-$M$,-1,$M$,0,-$M$,1,$M$,1,-$M$,1,-$M$,0,-$M$,1,-$M$,1,$M$,1,-$M$,0,-$M$,1,$M$,1,-$M$,1,-$M$}·(1+$j$)/$\sqrt{2}$,HES$_{-504:8:504}$={$M$,-1,$M$,-1,-$M$,-1,$M$,0,-$M$,1,$M$,1,-$M$,1,-$M$}·(1+$j$)/$\sqrt{2}$, and $M$={-1,-1,-1,1,1,1,-1,1,1,1,1,-1,1,1,-1,1}.

With reference to the second aspect, in some implementations of the second aspect, the bandwidth of the target channel is 320 MHz, and the frequency domain sequence of the short training field is any one of the following:

{HES$_{-1016:8:1016}$,0,HES$_{-248:8:248}$,0,HES$_{-248:8:248}$,0,-HES$_{-248:8:248}$,0,-HES$_{-248:8:248}$}; or

{HES$_{-1016:8:1016}$,0,HES$_{-248:8:248}$,0,HES$_{-248:8:248}$,0,HES$_{-248:8:248}$,0,HES$_{-248:8:248}$}, where HES$_{-1016:8:1016}$={$M$,-1,$M$,-$M$,-1,$M$,0,-$M$,1,$M$,1,$M$,0,$M$,1,-$M$,1,$M$,1,-$M$,0,-$M$,1,$M$,1,-$M$,1,-$M$}·(1+$j$)/$\sqrt{2}$,HES$_{-248:8:248}$={$M$,-1,-$M$,0,$M$,-1,$M$}·(1+$j$)/$\sqrt{2}$, and $M$={-1,-1,-1,1,1,1,-1,1,1,1,-1,1,1,-1,1}.

According to a third aspect, an apparatus for transmitting a physical layer protocol data unit is provided. The apparatus is configured to perform the method provided in the first aspect. Specifically, the apparatus may include a module configured to perform any one of the first aspect or the possible implementations of the first aspect.

According to a fourth aspect, an apparatus for transmitting a physical layer protocol data unit is provided. The apparatus is configured to perform the method provided in the second aspect. Specifically, the apparatus may include a module configured to perform any one of the second aspect or the possible implementations of the second aspect.

According to a fifth aspect, an apparatus for transmitting a physical layer protocol data unit is provided. The apparatus includes a processor. The processor is coupled to a memory, and may be configured to execute instructions in the memory, to implement the method in any one of the first aspect and the possible implementations of the first aspect. Optionally, the apparatus further includes the memory. Optionally, the apparatus further includes a communication interface, and the processor is coupled to the communication interface.

In an implementation, the apparatus is an access point. When the apparatus is an access point, the communication interface may be a transceiver, or an input/output interface.

In another implementation, the apparatus is a chip configured in an access point. When the apparatus is a chip configured in an access point, the communication interface may be an input/output interface.

In an implementation, the apparatus is a station. When the apparatus is a station, the communication interface may be a transceiver, or an input/output interface.

In another implementation, the apparatus is a chip configured in a station. When the apparatus is a chip configured in a station, the communication interface may be an input/output interface.

In another implementation, the apparatus is a chip or a chip system.

Optionally, the transceiver may be a transceiver circuit. Optionally, the input/output interface may be an input/output circuit.

According to a sixth aspect, an apparatus for transmitting a physical layer protocol data unit is provided. The apparatus includes a processor. The processor is coupled to a memory, and may be configured to execute instructions in the memory, to implement the method in any one of the second aspect or the possible implementations of the second aspect. Optionally, the apparatus further includes the memory. Optionally, the apparatus further includes a communication interface, and the processor is coupled to the communication interface.

In an implementation, the apparatus is an access point. When the apparatus is an access point, the communication interface may be a transceiver, or an input/output interface.

In another implementation, the apparatus is a chip configured in an access point. When the apparatus is a chip configured in an access point, the communication interface may be an input/output interface.

In an implementation, the apparatus is a station. When the apparatus is a station, the communication interface may be a transceiver, or an input/output interface.

In another implementation, the apparatus is a chip configured in a station. When the apparatus is a chip configured in a station, the communication interface may be an input/output interface.

In another implementation, the apparatus is a chip or a chip system.

Optionally, the transceiver may be a transceiver circuit. Optionally, the input/output interface may be an input/output circuit.

According to a seventh aspect, a computer-readable storage medium is provided. The computer-readable storage medium stores a computer program, and when the computer program is executed by an apparatus, the apparatus is enabled to implement the method according to any one of the first aspect or the possible implementations of the first aspect.

According to an eighth aspect, a computer-readable storage medium is provided. The computer-readable storage medium stores a computer program, and when the computer program is executed by an apparatus, the apparatus is enabled to implement the method according to any one of the second aspect or the possible implementations of the second aspect.

According to a ninth aspect, a computer program product including instructions is provided. When the instructions are executed by a computer, an apparatus is enabled to implement the method provided in any one of the first aspect or the possible implementations of the first aspect.

According to a tenth aspect, a computer program product including instructions is provided. When the instructions are executed by a computer, an apparatus is enabled to implement the method provided in any one of the second aspect or the possible implementations of the second aspect.

According to an eleventh aspect, a communication system is provided. The communication system includes a transmit end and the receive end described above.

BRIEF DESCRIPTION OF DRAWINGS

To describe technical solutions in embodiments of this application more clearly, the following briefly introduces accompanying drawings for describing embodiments of this application. It is clear that the accompanying drawings in the following description show merely some embodiments of this application, and persons of ordinary skill in the art may still derive other drawings from these accompanying drawings without creative efforts.

DESCRIPTION OF EMBODIMENTS

Figure 1:
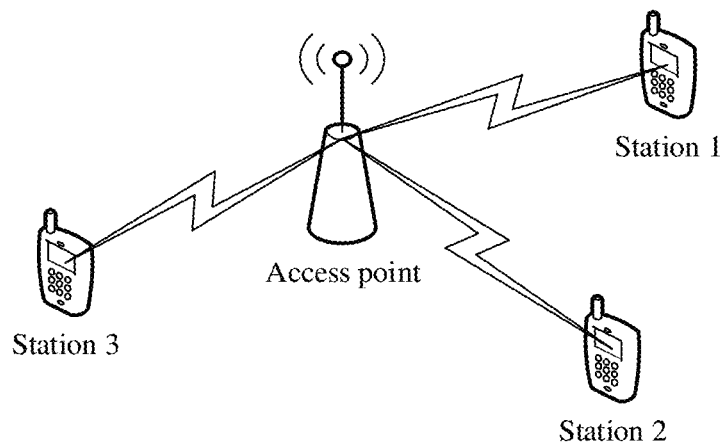
FIG. 1 is a schematic diagram of a communication system of a method applicable to an embodiment of this application.

The following clearly and completely describes technical solutions in embodiments of this application with reference to the accompanying drawings in embodiments of this application. It is clear that the described embodiments are some but not all of embodiments of this application. All other embodiments obtained by a person of ordinary skill in the art based on embodiments of this application without creative efforts shall fall within the protection scope of this application.

A term "and/or" describes an association relationship between associated objects and represents that three relationships may exist. For example, A and/or B may represent the following three cases: Only A exists, both A and B exist, and only B exists.

In the specification and claims in embodiments of this application, the terms "first", "second", and so on are intended to distinguish between different objects but do not indicate a particular order of the objects. For example, a first target object, a second target object, and the like are intended to distinguish between different target objects but do not indicate a particular order of the target objects.

In embodiments of this application, the word "example", "for example", or the like is used to represent giving an example, an illustration, or a description. Any embodiment or design scheme described as an "example" or with "for example" in embodiments of this application should not be explained as being more preferred or having more advantages than another embodiment or design scheme. Exactly, use of the word "example", "for example", or the like is intended to present a relative concept in a specific manner.

In the description of embodiments of this application, unless otherwise specified, "a plurality of" means two or more than two. For example, a plurality of processing units are two or more processing units. A plurality of systems are two or more systems.

The following describes technical solutions of this application with reference to the accompanying drawings.

The technical solutions in embodiments of this application may be applied to various communication systems, for example, a wireless local area network (WLAN) communication system, a global system for mobile communication (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunication system (UMTS), a worldwide interoperability for microwave access (WiMAX) communication system, a future 5th generation (5G) system, or a new radio (NR) system.

For example, the following describes an application scenario in embodiments of this application and a method in embodiments of this application by using a WLAN system as an example.

Specifically, embodiments of this application may be applied to a wireless local area network (WLAN), and embodiments of this application are applicable to any one of the 802.11 series protocols of the Institute of Electrical and Electronics Engineers (IEEE) currently used in the WLAN, for example, the IEEE 802.11be (also referred to as the Wi-Fi 7 protocol). The WLAN may include one or more basic service sets (BSS). A network node in the basic service set includes an access point (AP) and a station (STA).

Specifically, a transmit end or a receive end in embodiments of this application may be a user station (STA) in the WLAN, or a chip or a processing system in a user station. The user station may also be referred to as a system, a subscriber unit, an access terminal, a mobile station, a mobile console, a remote station, a remote terminal, a mobile device, a user terminal, a terminal, a wireless communication device, a user agent, a user apparatus, or user equipment (UE). The STA may be a cellular phone, a cordless phone, a session initiation protocol (SIP) phone, a wireless local loop (WLL) station, a personal digital assistant (PDA), a handheld device having a wireless local area network (for example, Wi-Fi) communication function, a wearable device, a computing device, or another processing device connected to a wireless modem.

In addition, the transmit end or the receive end in embodiments of this application may alternatively be an AP in the WLAN, or a chip or a processing system in an AP. The AP may be configured to: communicate with an access terminal through the wireless local area network, and transmit data of the access terminal to a network side, or transmit data from a network side to an access terminal.

For ease of understanding embodiments of this application, a communication system shown in FIG. 1 is first used as an example to describe in detail a communication system applicable to embodiments of this application. A scenario system shown in FIG. 1 may be a WLAN system. The WLAN system in FIG. 1 may include one or more APs and one or more STAs. In FIG. 1, one AP and three STAs are used as an example. Wireless communication may be performed between the AP and the STA according to various standards. For example, wireless communication between the AP and the STA may be performed by using a single-user multiple-input multiple-output (SU-MIMO) technology or a multi-user multiple-input multiple-output (MU-MIMO) technology.

Figure 2:
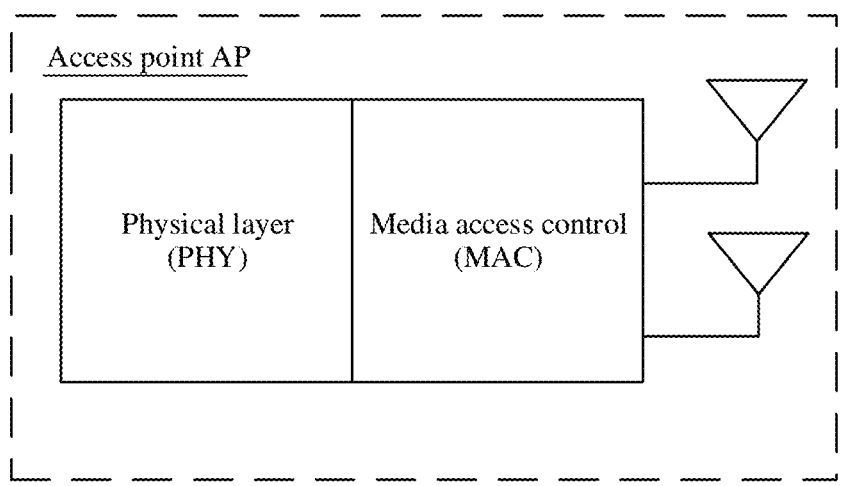
FIG. 2 is a diagram of an internal structure of an access point applicable to an embodiment of this application.

The AP is also referred to as a wireless access point, a hotspot, or the like. The AP is an access point for a mobile user to access a wired network, and is mainly deployed in a home, a building, and a campus, or is deployed outdoors. The AP is equivalent to a bridge that connects the wired network and a wireless network. A main function of the AP is to connect wireless network clients together, and then connect the wireless network to the Ethernet. Specifically, the AP may be a terminal device or a network device with a wireless fidelity (Wi-Fi) chip. Optionally, the AP may be a device that supports a plurality of WLAN standards such as 802.11. FIG. 2 shows a diagram of an internal structure of an AP product. The AP may have a plurality of antennas or may have a single antenna. In FIG. 2, the AP includes a physical layer (PHY) processing circuit and a media access control (MAC) processing circuit. The physical layer processing circuit may be configured to process a physical layer signal, and the MAC layer processing circuit may be configured to process a MAC layer signal. The 802.11 standard focuses on a PHY and MAC, and embodiments of this application focus on protocol design on the MAC and the PHY.

Figure 3:
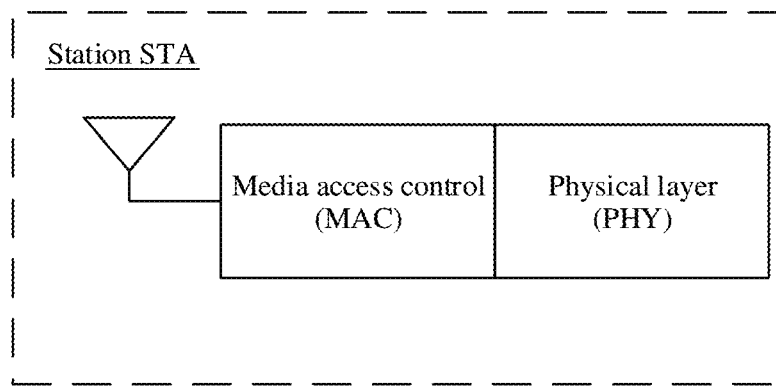
FIG. 3 is a diagram of an internal structure of a station applicable to an embodiment of this application.

An STA product is usually a terminal product, for example, a mobile phone, or a notebook computer, that supports the 802.11 series standards. FIG. 3 shows a diagram of a structure of an STA with a single antenna. In an actual scenario, the STA may alternatively have a plurality of antennas, and may be a device with more than two antennas. In FIG. 3, the STA may include a physical layer (PHY) processing circuit and a media access control (MAC) processing circuit. The physical layer processing circuit may be configured to process a physical layer signal, and the MAC layer processing circuit may be configured to process a MAC layer signal.

The WLAN system can provide high-speed and low-latency transmission. With continuous evolution of WLAN application scenarios, the WLAN system is to be applied to more scenarios or industries, for example, the internet of things industry, the internet of vehicles industry, the banking industry, enterprise offices, exhibition halls of stadiums, concert halls, hotel rooms, dormitories, wards, classrooms, supermarkets, squares, streets, production workshops and warehousing. Certainly, a device (such as an access point or a station) that supports WLAN communication may be a sensor node (for example, a smart water meter, a smart electricity meter, or a smart air detection node) in a smart city, a smart device (for example, a smart camera, a projector, a display, a television, a stereo, a refrigerator, or a washing machine) in a smart home, a node in the internet of things, an entertainment terminal (for example, an AR, a VR, or another wearable device), a smart device (for example, a printer, a projector, a loudspeaker, or a stereo) in smart office, an internet of vehicle device in the internet of vehicle, an infrastructure (for example, a vending machine, a self-service navigation station of a supermarket, a self-service cash register device, or a self-service ordering machine) in daily life scenarios, a device in a large sports or music venue, and the like. Specific forms of the STA and the AP are not specifically limited in embodiments of this application, and are merely examples for description herein.

To greatly improve a service transmission rate of a WLAN system, the IEEE 802.11ax standard further uses an orthogonal frequency division multiple access (OFDMA) technology based on an existing orthogonal frequency division multiplexing (OFDM) technology. The OFDMA technology supports a plurality of nodes in sending and receiving data simultaneously. This achieves multi-station diversity gains.

From 802.11a, 802.11g, 802.11n, and 802.11ac to 802.11ax, available frequency bands include 2.4 gigahertzes (GHz) and 5 GHz. With increasingly more available frequency bands, a maximum channel bandwidth supported by 802.11 is expanded from 20 megahertzes (MHz) to 40 MHz and then to 160 MHz. In 2017, the federal communications commission (FCC) opened up a new unlicensed frequency band of 6 GHz (5925 MHz to 7125 MHz). Drafters of the 802.11ax standard expanded an operating range of 802.11ax devices from 2.4 GHz and 5 GHz to 2.4 GHz, 5 GHz and 6 GHz in the 802.11ax project authorization request (PAR). Because an available bandwidth of the newly opened 6 GHz frequency band is larger, it can be predicted that a channel bandwidth greater than 160 MHz will be supported in a next-generation standard (for example, 802.11be or Wi-Fi 7) after 802.11ax.

Each generation of mainstream 802.11 protocols is compatible with legacy stations. For example, an 802.11a frame structure of an earliest generation of mainstream Wi-Fi starts with a preamble, and includes a legacy-short training field (L-STF), a legacy-long training field (L-LTF), and a legacy-signal field (L-SIG). To be compatible with a legacy station, a frame structure of subsequent 802.11 and 802.11ax starts with a legacy preamble. Fields after the legacy preamble are a signal field, a short training field, and a long training field that are newly defined for each generation. The short training field (STF) after the legacy preamble is referred to as an extremely high throughput-short training field (EHT-STF) for short, to be distinguished from the L-STF. When a channel bandwidth for transmission is greater than 20 MHz, the L-STF is replicated and transmitted on every 20 MHz channel bandwidth, and the EHT-STF introduced after 802.11a is defined as a new sequence for the channel bandwidth greater than 20 MHz. For example, an STF defined in the 802.11ac, namely, a very high throughput-short training field (VHT-STF) is separately defined as sequences for 20 MHz, 40 MHz, 80 MHz, and 160 MHz. Similarly, a high efficiency-short training field (HE-STF) defined in the 802.11ax also supports a maximum channel bandwidth of 160 MHz. It should be noted that in an embodiment in this application, the field may also be referred to as a field. For example, the short training field is also referred to as a short training field.

It is specified in the protocol that a time domain waveform of the HE-STF includes five repetition periods, and is mainly used to enhance estimation of automatic gain control (AGC) in multiple-input multiple-output (MIMO) transmission. Therefore, a smaller peak-to-average power ratio (PAPR) of a sequence is required.

As described above, in evolution of a next-generation standard (for example, the IEEE 802.11be) after 802.11ax, a channel bandwidth greater than 160 MHz is supported, for example, 240 MHz and 320 MHz, to implement an ultra-high transmission rate and support a scenario with an ultra-high user density. In the 802.11be, new features of puncturing and combining a plurality of RUs are further added. Therefore, a new short training field sequence needs to be designed for a larger channel bandwidth and the new features of puncturing and combining a plurality of RUs. In view of this, embodiments of this application provide a method and an apparatus for transmitting a physical layer protocol data unit, to design a short training field sequence for a larger channel bandwidth and the new features of puncturing and combining a plurality of RUs.

For ease of understanding embodiments of this application, the following first briefly describes several nouns or terms used in this application.

1. Subcarrier

Bandwidths of wireless communication signals are limited. A bandwidth may be divided, by using the OFDM technology, into a plurality of frequency components within a channel bandwidth at a specific frequency spacing. These components are referred to as subcarriers or tones. Subscripts of subcarriers are consecutive integers. A subcarrier whose subscript is 0 corresponds to a direct current component, a subcarrier whose subscript is a negative number corresponds to a frequency component lower than the direct current component, and a subcarrier whose subscript is a positive number corresponds to a frequency component higher than the direct current component.

2. Short Training Sequence

A short training sequence is mainly used for signal detection, automatic gain control (AGC), symbol timing, coarse frequency offset estimation, and the like. Different sequences may be defined for different maximum channel bandwidths. For example, the HE-STF defined in the 802.11ax supports the maximum channel bandwidth of 160 MHz. In this application, a channel bandwidth is greater than 160 MHz. Certainly, a bandwidth of 160 MHz may also be supported. The short training sequence may be applied to a wireless local area network that supports the 802.11be protocol. Therefore, for differentiation, the short training sequence is referred to as an EHT-STF in embodiments of this application. It should be understood that the EHT-STF indicates a short training field or a short training field that is used in the 802.11be, and a specific name of the short training field constitutes no limitation on the protection scope of embodiments of this application. Optionally, the EHT-STF may be used to improve automatic gain control estimation in MIMO transmission.

The short training sequence may be constructed based on an M sequence. For example, it can be learned according to the standard 802.11ax that a high efficiency sequence (HES) of the HE-STF is constructed based on the M sequence through multiplexing, phase rotation, and concatenation. The M sequence is a most basic pseudo-noise sequence (PN sequence) used in a current CDMA system. The M sequence is short for a longest linear feedback shift register sequence. The M sequence is defined as $M=\{-1,-1,-1,1,1,1,-,1,1,1,-1,1,1,-1,1\}$ in the 802.11ax standard.

It should be understood that when the M sequence defined in a subsequent standard has another form, the M sequence is also applicable to this application.

It should be noted that a specific name of the M sequence constitutes no limitation on the protection scope of embodiments of this application. For example, the M sequence may also be referred to as a frequency domain sequence.

First, a design of a short training sequence $HES_{a:b:c}$ of the HE-STF in the 802.11ax is briefly described, where a:b:c indicates that there are b subcarriers between a subcarrier a and a subcarrier c.

Figure 4:
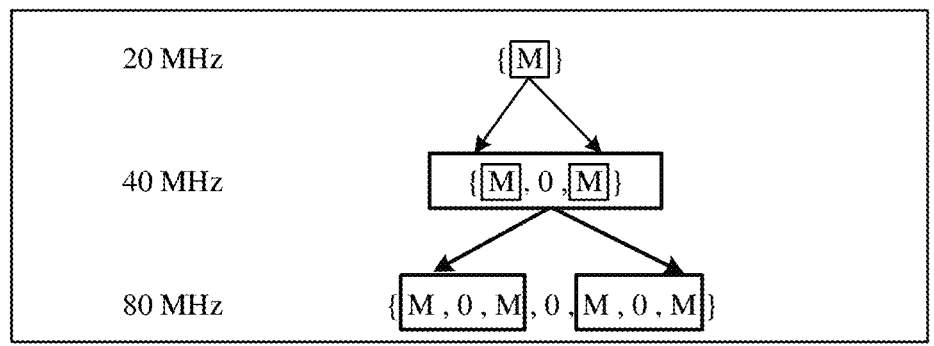
FIG. 4 is a schematic diagram of an HE-STF constructed based on an M sequence.
Figure 4:
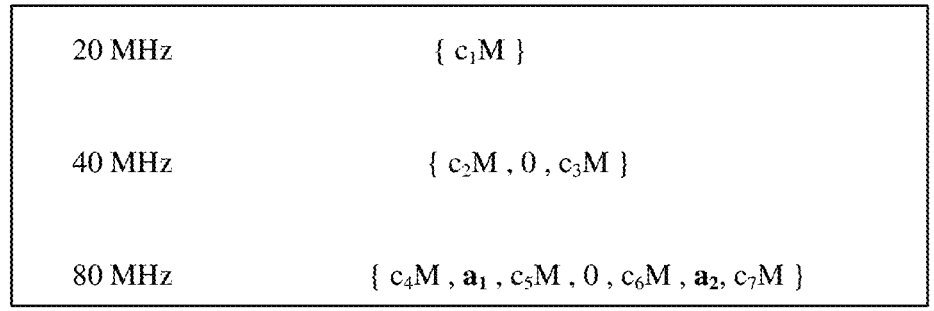

FIG. 4 is a schematic diagram of an HE-STF constructed based on an M sequence. (1) in FIG. 4 is a repeated structure. Specifically, a 20 MHz HE-STF includes one M sequence. A 40 MHz HE-STF is obtained by concatenating two 20 MHz HE-STFs (namely, two M sequences). Similarly, an 80 MHz HE-STF is obtained by concatenating four 20 MHz HE-STFs. To ensure that the HE-STF includes five repetition periods in time domain, and that a PAPR of the HE-STF is minimized, an additional parameter value and a rotation factor may be used to adjust and optimize the HE-STF, as shown in (2) in FIG. 4. Specifically, the 20 MHz HE-STF includes one M sequence. The 40 MHz HE-STF is obtained by concatenating two 20 MHz HE-STFs (namely, two M sequences) multiplied by the rotation factor C. Similarly, the 80 MHz HE-STF is obtained by concatenating four 20 MHz HE-STFs multiplied by the rotation factor. In addition, a parameter value A needs to be inserted between every two M sequences, to ensure that the HE-STF includes the five repetition periods in time domain. An exception is that an OFDM modulation scheme requires that a direct current subcarrier needs to be 0. Therefore, the PAPR of the HE-STF can be minimized by optimizing A and C. In (2) in FIG. 4, the rotation factor C includes $\{c_1, c_2, c_3, c_4, \ldots\}$, and the parameter value A includes $\{a_1, a_2, a_3, a_4, \ldots\}$. In this specification, these rotation factors and parameter values are collectively referred to as a "parameter set".

802.11ax defines four frame structures, including: a high efficiency single-user physical layer protocol data unit (HE SU PPDU), a high efficiency multi-user physical layer protocol data unit (HE MU PPDU), a high efficiency extended range single-user physical layer protocol data unit (HE ER SU PPDU), and a high efficiency trigger based physical layer protocol data unit (HE TB PPDU). Specifically, the foregoing frame structures may be further classified into two types: a non-HE TB PPDU and an HE TB PPDU. 802.11ax defines, based on different frame structures, HE-STFs with two period lengths: 0.8 μs and 1.6 μs. An HE-STF used for a non-HE TB PPDU has a period length of 0.8 μs, and is populated at a spacing of 16 subcarriers. An HE-STF used for an HE TB PPDU has a period length of 1.6 μs, and is populated at a spacing of eight subcarriers. In addition, 802.11ax supports four channel bandwidths: 20 MHz, 40 MHz, 80 MHz, and 160 MHz. Each bandwidth and each length correspond to one HE-STF. Therefore, there are a total of eight frequency domain values $HES_{a:b:c}$ of the HE-STF.

The following separately describes optimized frequency domain sequences of different channel bandwidths in two cases in which lengths are 0.8 μs and 1.6 μs respectively.
Case 1: A Frequency Domain Sequence in a 0.8 μs HE-STF (1) A 0.8 μs HE-STF whose channel bandwidth is 20 MHz, also referred to as STF1×20 MHz, has a total of 256 subcarriers whose subscripts (or indexes) range from −127 to 128. A subcarrier whose subscript is 0 corresponds to a direct current component, and subcarriers whose subscripts are a negative number and a positive number respectively correspond to a frequency component lower than the direct current component and a frequency component higher than the direct current component respectively.

STF1×20 MHz may be represented by using the following formula:

$$HES_{-112:16:112} = \{M\} \cdot (1+j)/\sqrt{2}, \text{ where}$$

$HES_{-112:16:112}$ indicates a frequency domain sequence in the 20 MHz HE-STF, and specifically, values in frequency domain of subcarriers whose subscripts are −112, −96, −80, −64, −48, −32, −16, 0, 16, 32, 48, 64, 80, 96, and 112. $HES_0=0$, and values in frequency domain of other subcarriers are all 0. The other subcarriers indicate subcarriers whose subscripts range from −127 to 128 other than the subcarriers whose subscripts are −112, −96, −80, −64, −48, −32, −16, 0, 16, 32, 48, 64, 80, 96, and 112.

The foregoing formula is specifically as follows:

$$HES_{-112:16:112} = \{-(1+j)/\sqrt{2}, -(1+j)/\sqrt{2}, -(1+j)/\sqrt{2}, (1+j)/\sqrt{2}, (1+j)/\sqrt{2}, -(1+j)/\sqrt{2}, -(1+j)/\sqrt{2}, (1+j)/\sqrt{2}, (1+j)/\sqrt{2}, (1+j)/\sqrt{2}, \sqrt{2}, -(1+j)/\sqrt{2}, (1+j)/\sqrt{2}, (1+j)/\sqrt{2}, -(1+j)/\sqrt{2}, (1+j)/\sqrt{2}\}.$$

Therefore, the values in frequency domain of the subcarriers whose subscripts are −112, −96, −80, −64, −48, −32, −16, 0, 16, 32, 48, 64, 80, 96, and 112 are respectively:

$$-(1+j)/\sqrt{2}, -(1+j)/\sqrt{2}, -(1+j)/\sqrt{2}, (1+j)/\sqrt{2}, (1+j)/\sqrt{2}, \sqrt{2}, -(1+j)/\sqrt{2}, (1+j)/\sqrt{2}, (1+j)/\sqrt{2}, (1+j)/\sqrt{2}, -(1+j)/\sqrt{2}, \sqrt{2}, (1+j)/\sqrt{2}, (1+j)/\sqrt{2}, -(1+j)/\sqrt{2}, \text{ and } (1+j)/\sqrt{2}.$$

It should be noted that, in this specification, expressions similar to $HES_{-112:16:112}$ in a formula have similar meanings. For brevity, details are not described again.

It should be further noted that, in this specification, in subsequent formula description, if not explicitly noted, values in frequency domain of other subcarriers are all 0. For brevity, details are not described again.

It should be noted that a subscript may also be referred to as a subcarrier index. For example, a subcarrier whose subscript is 0 may also be referred to as a subcarrier whose index is 0.

(2) A 0.8 μs HE-STF whose channel bandwidth is 40 MHz, also referred to as STF1×40 MHz, has a total of 512 subcarriers whose subscripts range from −255 to 256.

STF1×40 MHz may be represented by using the following formula:

$$HES_{-240:16:240} = \{M, 0, -M\} \cdot (1+j)/\sqrt{2}, \text{ where}$$

$HES_{-240:16:240}$ indicates a frequency domain sequence in the 40 MHz HE-STF.

(3) A 0.8 μs HE-STF whose channel bandwidth is 80 MHz, also referred to as STF1×80 MHz, has a total of 1024 subcarriers whose subscripts range from −511 to 512.

STF1×80 MHz may be represented by using the following formula:

$$HES_{-496:16:496} = \{M, 1, -M, 0, -M, 1, -M\} \cdot (1+j)/\sqrt{2},$$
where $HES_{-496:16:496}$ indicates a frequency domain sequence in the 80 MHz HE-STF.

(4) A 0.8 μs HE-STF whose channel bandwidth is 160 MHz, also referred to as STF1×160 MHz, has a total of 2048 subcarriers whose subscripts range from −1023 to 1024.

STF1×160 MHz may be represented by using the following formula:

$$HES_{-1008:16:1008} = \{M, 1, -M, 0, -M, 1, -M, 0, -M, -1, M, 0, -M, 1, -M\} \cdot (1+j)/\sqrt{2}, \text{ where}$$

$HES_{-1008:16:1008}$ indicates a frequency domain sequence in the 160 MHz HE-STF.
Case 2: A Frequency Domain Sequence in a 1.6 μs HE-STF (1) A 1.6 μs HE-STF whose channel bandwidth is 20 MHz, also referred to as STF2×20 MHz, has a total of 256 subcarriers whose subscripts range from −127 to 128.

STF2×20 MHz may be represented by using the following formula:

$$HES_{-120:8:120} = \{M, 0, -M\} \cdot (1+j)/\sqrt{2}, HES_0 = 0, \text{ and values in frequency domain of other subcarriers are all 0.}$$

(2) A 1.6 μs HE-STF whose channel bandwidth is 40 MHz, also referred to as STF2×40 MHz, has a total of 512 subcarriers whose subscripts range from −255 to 256.

STF2×40 MHz may be represented by using the following formula:

$$HES_{-248:8:248} = \{M, -1, -M, 0, M, -1, M\} \cdot (1+j)/\sqrt{2}, \text{ and}$$
$$HES_{\pm 248} = 0, \text{ where}$$

$HES_{-248:8:248}$ indicates a frequency domain sequence in the 40 MHz HE-STF.

(3) A 1.6 μs HE-STF whose channel bandwidth is 80 MHz, also referred to as STF2×80 MHz, has a total of 1024 subcarriers whose subscripts range from −511 to 512.

STF2×80 MHz may be represented by using the following formula:

$$HES_{-504:8:504} = \{M, -1, M, -1, -M, -1, M, 0, -M, 1, M, 1, -M, 1, -M\} \cdot (1+j)/\sqrt{2}, \text{ and}$$

$HES_{\pm 504} = 0$, where
$HES_{-504:8:504}$ indicates a frequency domain sequence in the 80 MHz HE-STF.

(4) A 1.6 μs HE-STF whose channel bandwidth is 160 MHz, also referred to as STF2×160 MHz, has a total of 2048 subcarriers whose subscripts range from −1023 to 1024.

STF2×160 MHz may be represented by using the following formula:

$HES_{-1016:8:1016} = \{M,-1,M,-M,-1,M,0,-M,1,M,1,-M, 1,-M,0,-M,1,-M,1,M,1,-M,0,-M,1,M,1,-M,1,-M\}\cdot(1+j)/-\sqrt{2}$, and $HES_{\pm 8}=0$, and $HES_{\pm 1016}=0$, where $HES_{-1016:8:1016}$ indicates a frequency domain sequence in the 160 MHz HE-STF.

In the foregoing formulas, a geometric meaning of $(1+j)/\sqrt{2}$ on a complex plane is to rotate a value by 45° counterclockwise and keep energy normalized. In a similar way, $-(1+j)/\sqrt{2}$ is to rotate a value by 225° counterclockwise. This obtains, based on the M sequence, HE-STFs with different channel bandwidths while ensuring that optimized PAPRs are obtained.

3. Peak-to-Average Power Ratio

A peak-to-average power ratio (PAPR) may be a ratio, in a symbol, of an instantaneous power peak of continuous signals to an average value of signal power. The ratio may be represented as follows:

$$PAPR = 10 \cdot \log_{10}\left(\frac{\max(X_i^2)}{\text{mean}(X_i^2)}\right),$$

$X_i$ indicates time domain discrete values of a group of sequences, $\max(X_i^2)$ indicates a maximum value of squares of the time domain discrete values, and $\text{mean}(X_i^2)$ indicates an average value of the squares of the time domain discrete values.

The OFDM system has a disadvantage of a high PAPR. Especially in a large bandwidth, more subcarriers cause a higher PAPR, and a high PAPR causes non-linear distortion of a signal and reduces system performance. Therefore, during sequence design, a lower PAPR of a sequence is required.

4. Channel Puncturing

Channel bandwidths become increasingly large. For example, a maximum bandwidth of 160 MHz is supported in the 802.11ax standard. However, in actual deployment, because some channels are interfered or occupied by another device, or due to another reason, some channels of the 160 MHz channel may be unavailable. In actual transmission, it is difficult to fully use a 160 MHz channel for communication. Therefore, 802.11ax proposes a puncturing pattern. To be specific, a channel puncturing technology with a granularity of a 20 MHz channel bandwidth is used to alleviate this problem. This can use an available channel in the 160 MHz channel for communication, and improve channel utilization.

The following describes a possible channel puncturing pattern in the 802.11be or any future-generation WLAN standard (for example, Wi-Fi 8) by using an example. It should be noted that in the following example, one "1" indicates a 20 MHz channel bandwidth that is not punctured, corresponding to 256 subcarriers that are not punctured, and one "o" indicates a 20 MHz channel that is punctured. An opened 20 MHz channel may be referred to as a punctured channel, or may be understood as an occupied channel.

(1) In a channel puncturing pattern of a 240 MHz channel bandwidth, a 240 MHz channel includes twelve 20 MHz channels, and values of twelve "0s" or "1s" sequentially correspond to the twelve 20 MHz channels. Optionally, frequencies of the twelve 20 MHz channels sequentially correspond to twelve "0s" or "1s" from left to right in ascending order.

Pattern 1: [1 1 1 1 1 1 1 1 1 1 1 1], corresponding to a channel bandwidth of 240 MHz and 3072 subcarriers.

Pattern 2: [0 0 1 1 1 1 1 1 1 1 1 1], corresponding to an available channel bandwidth of 200 MHz. It may also be understood that a remaining channel bandwidth is 200 MHz.

Pattern 3: [1 1 0 0 1 1 1 1 1 1 1 1], corresponding to an available channel bandwidth of 200 MHz.

Pattern 4: [1 1 1 1 0 0 1 1 1 1 1 1], corresponding to an available channel bandwidth of 200 MHz.

Pattern 5: [1 1 1 1 1 1 0 0 1 1 1 1], corresponding to an available channel bandwidth of 200 MHz.

Pattern 6: [1 1 1 1 1 1 1 1 0 0 1 1], corresponding to an available channel bandwidth of 200 MHz.

Pattern 7: [1 1 1 1 1 1 1 1 1 1 0 0], corresponding to an available channel bandwidth of 200 MHz.

Pattern 8: [0 0 0 0 1 1 1 1 1 1 1 1], corresponding to an available channel bandwidth of 160 MHz.

Pattern 9: [1 1 1 1 0 0 0 0 1 1 1 1], corresponding to an available channel bandwidth of 160 MHz.

Pattern 10: [11 1 1 1 1 1 1 0 0 0 0], corresponding to an available channel bandwidth of 160 MHz.

(2) In a channel puncturing pattern of a 320 MHz channel bandwidth, a 320 MHz channel includes sixteen 20 MHz channels, and values of sixteen "0s" or "1s" sequentially correspond to the sixteen 20 MHz channels. Optionally, frequencies of the sixteen 20 MHz channels sequentially correspond to sixteen "0s" or "1s" from left to right in ascending order.

Specifically, channel puncturing patterns of the 320 MHz channel bandwidth may be classified into two types: a channel puncturing pattern compatible with 240 MHz, and a channel puncturing pattern incompatible with 240 MHz. "Compatible" means that after a 240 MHz channel is formed through channel puncturing of the 320 MHz channel bandwidth, puncturing is further performed based on an available channel bandwidth. In other words, the 240 MHz channel formed after puncturing is further punctured.

A. The puncturing pattern that is of the 320 MHz channel bandwidth and that is compatible with a 240 MHz channel.

Pattern 1: [1 1 1 1 1 1 1 1 1 1 1 1 1 1 1 1], corresponding to a channel bandwidth of 320 MHz and 4096 subcarriers.

Pattern 2: [0 0 1 1 1 1 1 1 1 1 1 1 1 1 1 1], corresponding to an available channel bandwidth of 280 MHz.

Pattern 3: [1 1 0 0 1 1 1 1 1 1 1 1 1 1 1 1], corresponding to an available channel bandwidth of 280 MHz.

Pattern 4: [1 1 1 1 0 0 1 1 1 1 1 1 1 1 1 1], corresponding to an available channel bandwidth of 280 MHz.

Pattern 5: [1 1 1 1 1 1 0 0 1 1 1 1 1 1 1 1], corresponding to an available channel bandwidth of 280 MHz.

Pattern 6: [1 1 1 1 1 1 1 1 0 0 1 1 1 1 1 1], corresponding to an available channel bandwidth of 280 MHz.

Pattern 7: [1 1 1 1 1 1 1 1 1 1 0 0 1 1 1 1], corresponding to an available channel bandwidth of 280 MHz.

Pattern 8: [1 1 1 1 1 1 1 1 1 1 1 1 0 0 1 1], corresponding to an available channel bandwidth of 280 MHz.

Pattern 9: [1 1 1 1 1 1 1 1 1 1 1 1 1 1 0 0], corresponding to an available channel bandwidth of 280 MHz.

Pattern 10: [1 1 1 1 0 0 0 0 1 1 1 1 1 1 1 1], corresponding to an available channel bandwidth of 240 MHz.

Pattern 11: [1 1 1 1 1 1 1 1 0 0 0 0 1 1 1 1], corresponding to an available channel bandwidth of 240 MHz.

Pattern 12: [1 1 1 1 1 1 1 1 1 1 1 1 0 0 0 0], corresponding to an available channel bandwidth of 240 MHz.

Pattern 13: [0 0 0 0 1 1 1 1 1 1 1 1 1 1 1 1], corresponding to an available channel bandwidth of 240 MHz.

Puncturing is further performed based on the available channel bandwidth of 240 MHz formed in pattern 10 to obtain pattern 14 to pattern 22.

Pattern 14: [0 0 1 1 0 0 0 0 1 1 1 1 1 1 1 1], corresponding to an available channel bandwidth of 200 MHz.

Pattern 15: [1 1 0 0 0 0 0 0 1 1 1 1 1 1 1 1], corresponding to an available channel bandwidth of 200 MHz.

Pattern 16: [1 1 1 1 0 0 0 0 0 0 1 1 1 1 1 1], corresponding to an available channel bandwidth of 200 MHz.

Pattern 17: [1 1 1 1 0 0 0 0 1 1 0 0 1 1 1 1], corresponding to an available channel bandwidth of 200 MHz.

Pattern 18: [1 1 1 1 0 0 0 0 1 1 1 1 0 0 1 1], corresponding to an available channel bandwidth of 200 MHz.

Pattern 19: [1 1 1 1 0 0 0 0 1 1 1 1 1 1 0 0], corresponding to an available channel bandwidth of 200 MHz.

Pattern 20: [0 0 0 0 0 0 0 0 1 1 1 1 1 1 1 1], corresponding to an available channel bandwidth of 160 MHz.

Pattern 21: [1 1 1 1 0 0 0 0 0 0 0 0 1 1 1 1], corresponding to an available channel bandwidth of 160 MHz.

Pattern 22: [1 1 1 1 0 0 0 0 1 1 1 1 0 0 0 0], corresponding to an available channel bandwidth of 160 MHz.

Puncturing is further performed based on the available channel bandwidth of 240 MHz formed in pattern 11 to obtain pattern 23 to pattern 31.

Pattern 23: [0 0 1 1 1 1 1 1 0 0 0 0 1 1 1 1], corresponding to an available channel bandwidth of 200 MHz.

Pattern 24: [1 1 0 0 1 1 1 1 0 0 0 0 1 1 1 1], corresponding to an available channel bandwidth of 200 MHz.

Pattern 25: [1 1 1 1 0 0 1 1 0 0 0 0 1 1 1 1], corresponding to an available channel bandwidth of 200 MHz.

Pattern 26: [1 1 1 1 1 1 0 0 0 0 0 0 1 1 1 1], corresponding to an available channel bandwidth of 200 MHz.

Pattern 27: [1 1 1 1 1 1 1 1 0 0 0 0 0 0 1 1], corresponding to an available channel bandwidth of 200 MHz.

Pattern 28: [1 1 1 1 1 1 1 1 0 0 0 0 1 1 0 0], corresponding to an available channel bandwidth of 200 MHz.

Pattern 29: [0 0 0 0 1 1 1 1 0 0 0 0 1 1 1 1], corresponding to an available channel bandwidth of 160 MHz.

Pattern 30: [1 1 1 1 0 0 0 0 0 0 0 0 1 1 1 1], corresponding to an available channel bandwidth of 160 MHz.

Pattern 31: [1 1 1 1 1 1 1 1 0 0 0 0 0 0 0 0], corresponding to an available channel bandwidth of 160 MHz.

Puncturing is further performed based on the available channel bandwidth of 240 MHz formed in pattern 12 to obtain pattern 32 to pattern 40.

Pattern 32: [0 0 1 1 1 1 1 1 1 1 1 1 0 0 0 0], corresponding to an available channel bandwidth of 200 MHz.

Pattern 33: [1 1 0 0 1 1 1 1 1 1 1 1 0 0 0 0], corresponding to an available channel bandwidth of 200 MHz.

Pattern 34: [1 1 1 1 0 0 1 1 1 1 1 1 0 0 0 0], corresponding to an available channel bandwidth of 200 MHz.

Pattern 35: [1 1 1 1 1 1 0 0 1 1 1 1 0 0 0 0], corresponding to an available channel bandwidth of 200 MHz.

Pattern 36: [1 1 1 1 1 1 1 1 0 0 1 1 0 0 0 0], corresponding to an available channel bandwidth of 200 MHz.

Pattern 37: [1 1 1 1 1 1 1 1 1 1 0 0 0 0 0 0], corresponding to an available channel bandwidth of 200 MHz.

Pattern 38: [0 0 0 0 1 1 1 1 1 1 1 1 0 0 0 0], corresponding to an available channel bandwidth of 160 MHz.

Pattern 39: [1 1 1 1 0 0 0 0 1 1 1 1 0 0 0 0], corresponding to an available channel bandwidth of 160 MHz.

Pattern 40: [1 1 1 1 1 1 1 1 0 0 0 0 0 0 0 0], corresponding to an available channel bandwidth of 160 MHz.

Puncturing is further performed based on the available channel bandwidth of 240 MHz formed in pattern 13 to obtain pattern 32 to pattern 40.

Pattern 41: [0 0 0 0 0 0 1 1 1 1 1 1 1 1 1 1], corresponding to an available channel bandwidth of 200 MHz.

Pattern 42: [0 0 0 0 1 1 0 0 1 1 1 1 1 1 1 1], corresponding to an available channel bandwidth of 200 MHz.

Pattern 43: [0 0 0 0 1 1 1 1 0 0 1 1 1 1 1 1], corresponding to an available channel bandwidth of 200 MHz.

Pattern 44: [0 0 0 0 1 1 1 1 1 1 0 0 1 1 1 1], corresponding to an available channel bandwidth of 200 MHz.

Pattern 45: [0 0 0 0 1 1 1 1 1 1 1 1 0 0 1 1], corresponding to an available channel bandwidth of 200 MHz.

Pattern 46: [0 0 0 0 1 1 1 1 1 1 1 1 1 1 0 0], corresponding to an available channel bandwidth of 200 MHz.

Pattern 47: [0 0 0 0 0 0 0 0 1 1 1 1 1 1 1 1], corresponding to an available channel bandwidth of 160 MHz.

Pattern 48: [0 0 0 0 1 1 1 1 0 0 0 0 1 1 1 1], corresponding to an available channel bandwidth of 160 MHz.

Pattern 49: [0 0 0 0 1 1 1 1 1 1 1 1 0 0 0 0], corresponding to an available channel bandwidth of 160 MHz.

B. The puncturing pattern that is of the 320 MHz channel bandwidth and that is incompatible with a 240 MHz channel.

Pattern 1: 320 MHz [1 1 1 1 1 1 1 1 1 1 1 1 1 1 1 1], corresponding to a channel bandwidth of 320 MHz and 4096 subcarriers.

Pattern 2: 280 MHz [0 0 1 1 1 1 1 1 1 1 1 1 1 1 1 1], corresponding to an available channel bandwidth of 280 MHz.

Pattern 3: 280 MHz [1 1 0 0 1 1 1 1 1 1 1 1 1 1 1 1], corresponding to an available channel bandwidth of 280 MHz.

Pattern 4: 280 MHz [1 1 1 1 0 0 1 1 1 1 1 1 1 1 1 1], corresponding to an available channel bandwidth of 280 MHz.

Pattern 5: 280 MHz [1 1 1 1 1 1 0 0 1 1 1 1 1 1 1 1], corresponding to an available channel bandwidth of 280 MHz.

Pattern 6: 280 MHz [1 1 1 1 1 1 1 1 0 0 1 1 1 1 1 1], corresponding to an available channel bandwidth of 280 MHz.

Pattern 7: 280 MHz [1 1 1 1 1 1 1 1 1 1 0 0 1 1 1 1], corresponding to an available channel bandwidth of 280 MHz.

Pattern 8: 280 MHz [1 1 1 1 1 1 1 1 1 1 1 1 0 0 1 1], corresponding to an available channel bandwidth of 280 MHz.

Pattern 9: 280 MHz [1 1 1 1 1 1 1 1 1 1 1 1 1 1 0 0], corresponding to an available channel bandwidth of 280 MHz.

Pattern 10: 240 MHz [1 1 1 1 0 0 0 0 1 1 1 1 1 1 1 1], corresponding to an available channel bandwidth of 240 MHz.

Pattern 11: 240 MHz [1 1 1 1 1 1 1 1 0 0 0 0 1 1 1 1], corresponding to an available channel bandwidth of 240 MHz.

Pattern 12: 240 MHz [1 1 1 1 1 1 1 1 1 1 1 1 0 0 0 0], corresponding to an available channel bandwidth of 240 MHz.

Pattern 13: 240 MHz [0 0 0 0 1 1 1 1 1 1 1 1 1 1 1 1], corresponding to an available channel bandwidth of 240 MHz.

It should be noted that the puncturing patterns described in this application are merely examples of currently available puncturing patterns. This application does not exhaust all puncturing patterns. The technical solutions of this application are also applicable to other puncturing patterns that are not described in this application.

5. Resource Unit Allocation (RU Allocation)

The resource unit allocation may also be understood as subcarrier allocation (tone plan) in a channel bandwidth. Different channel bandwidths may correspond to different tone plans. When OFDMA and multiple-user multiple-input multiple-output (MU-MIMO) technologies are applied, the IEEE 802.11ax protocol stipulates that subcarriers in a channel bandwidth are divided into several resource units (RU). According to the IEEE 802.11ax protocol, 20 MHz, 40 MHz, 80 MHz, and 160 MHz channel bandwidths are divided into a plurality of types of resource units, including a 26-tone resource unit, a 52-tone resource unit, a 106-tone resource unit, a 242-tone resource unit (the largest resource unit in the 20 MHz bandwidth), a 484-tone resource unit (the largest resource unit in the 40 MHz bandwidth), a 996-tone resource unit (the largest resource unit in the 80 MHz bandwidth), and a 1992-tone resource unit (the largest resource unit in the 160 MHz bandwidth). Each RU includes consecutive subcarriers. For example, the 26-tone RU is an RU including 26 consecutive subcarriers. It should be noted that different total bandwidths can support different types and quantities of RUs. However, in a same bandwidth, hybrid-type resource units may be supported.

Figure 5A:
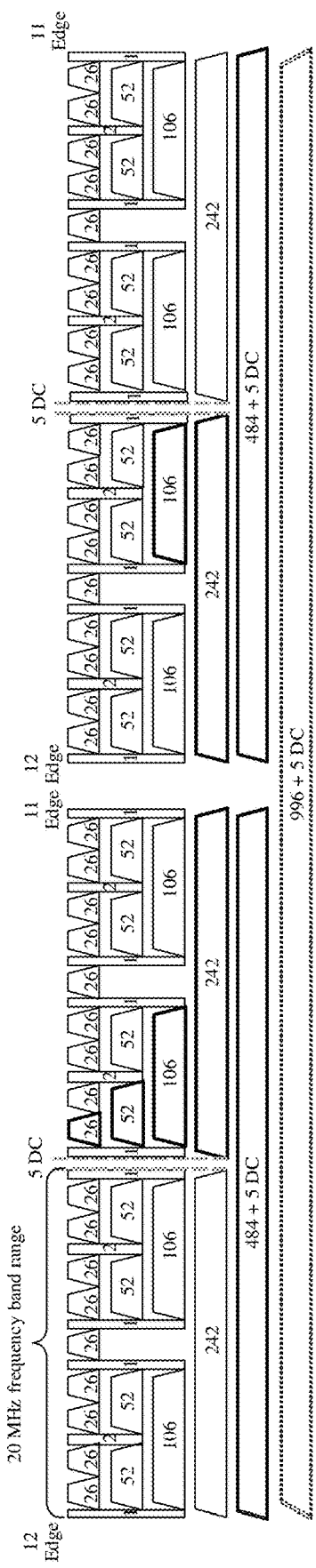
FIG. 5a to FIG. 5g are a schematic diagram of OFDMA resource unit allocation for a bandwidth of 80 MHz.

FIG. 5a is a schematic diagram of an example of a tone plan for a bandwidth of 80 MHz in the 802.11be. A left-sideband subcarrier and a right-sideband subcarrier are separately located at an edge of a transmission frequency band, and are used as guard subcarriers, to reduce impact of transmission filtering on data and pilot subcarriers. Subcarriers in each bandwidth include a data subcarrier, a pilot subcarrier, and an unused subcarrier. The unused subcarrier is neither used to transmit data nor used to transmit a pilot signal. The unused subcarrier includes a direct current subcarrier (DC subcarrier), a guard subcarrier, and a null subcarrier. The guard subcarrier may further include a left-sideband subcarrier and a right-sideband subcarrier. A direct current subcarrier is a subcarrier with empty content (namely, a subcarrier carrying no data or information), and is used by a mobile device to locate a center of an OFDM frequency band. A left-sideband subcarrier, a right-sideband subcarrier, a direct current subcarrier, and a null subcarrier may further be collectively referred to as leftover subcarriers (leftover tone) between RUs. A quantity of subcarriers in a large RU equals to a sum of a quantity of subcarriers in a plurality of small RUs included in the large RU and a quantity of leftover subcarriers between the small RUs.

In an OFDMA system, an RU may include but is not limited to:
(1) an RU including 26 consecutive subcarriers: 24 data subcarriers and 2 pilot subcarriers;
(2) an RU including 52 consecutive subcarriers: 48 data subcarriers and 4 pilot subcarriers;
(3) an RU including 106 consecutive subcarriers: 102 data subcarriers and 4 pilot subcarriers;
(4) an RU including 242 consecutive subcarriers: 234 data subcarriers and 8 pilot subcarriers;
(5) an RU including 484 consecutive subcarriers: 468 data subcarriers and 16 pilot subcarriers; and
(6) an RU including 996 consecutive subcarriers: 980 data subcarriers and 16 pilot subcarriers.

Figure 5B:
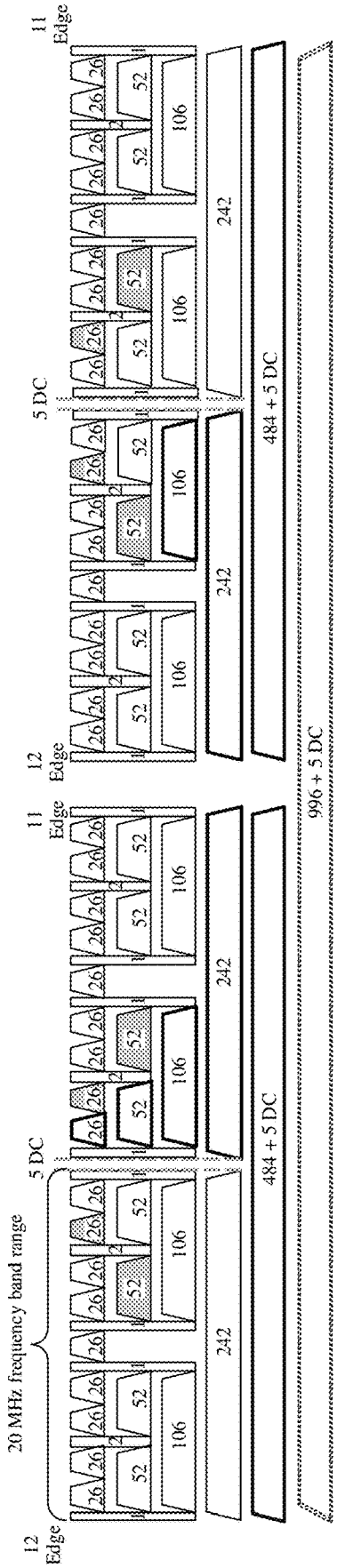

For example, in the 802.11ax, one RU of (1) to (6) may be allocated to one user, and a multi-RU mode is supported in the 802.11be or a future standard. In other words, multiple resource units (MRU) may be allocated to one user. An MRU mode includes but is not limited to the following types:

(7) RU52+RU26: This allocation manner may be understood as allocating an RU (denoted as a 26-tone RU) including 26 consecutive subcarriers and an RU (denoted as a 52-tone RU) including 52 consecutive subcarriers to a user. FIG. 5b is a schematic diagram of a tone plan of the RU52+RU26 (where a shaded part is an RU allocated to the user). Optionally, the 52-tone RU and the 26-tone RU in the RU52+RU26 are located on a same 20 MHz channel. For example, in the first 20 MHz channel from left to right shown in FIG. 5b, the third 52-tone RU and the eighth 26-tone RU in the first row are combined into an MRU and allocated to one user.

Figure 5C:
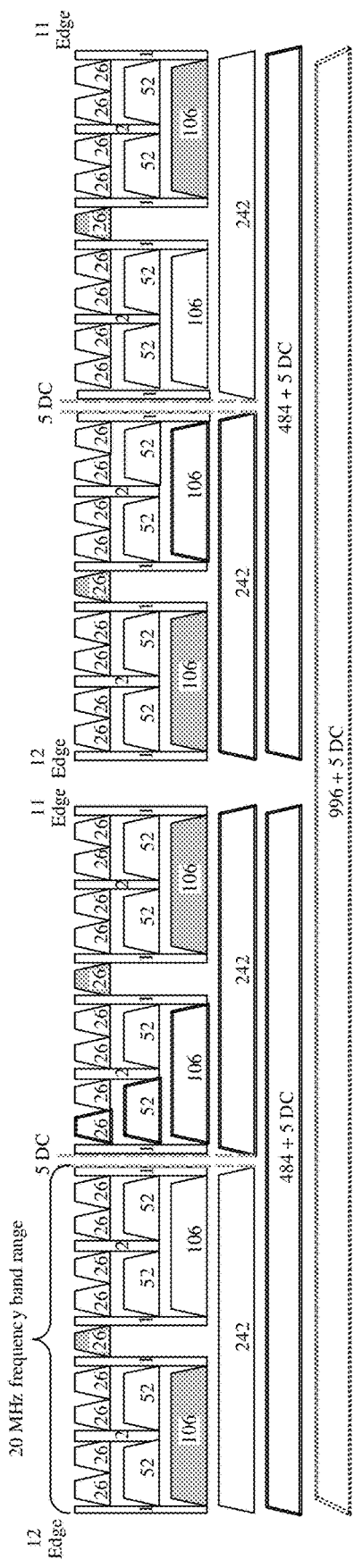
Figure 5D:
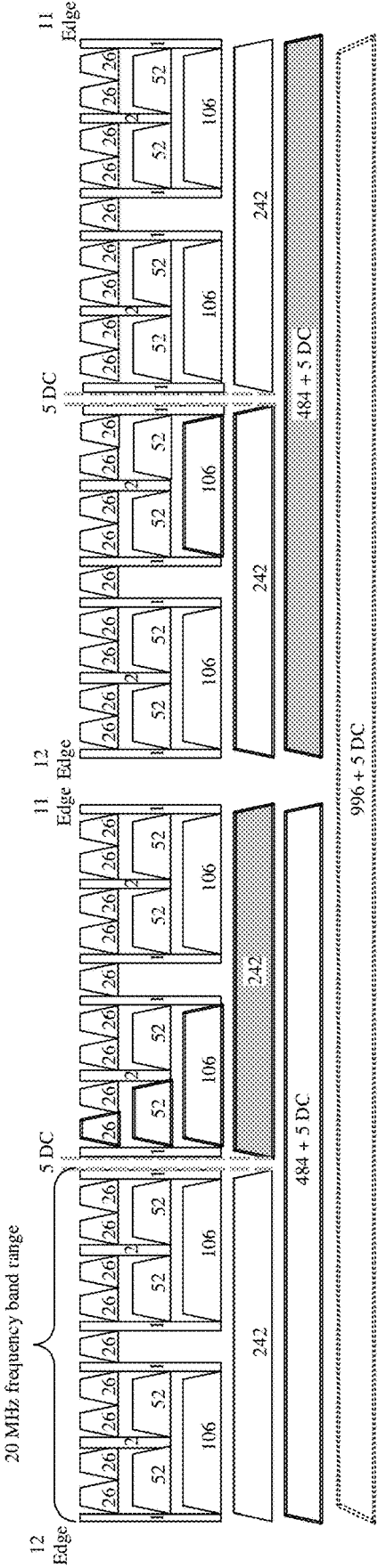
Figure 5E:
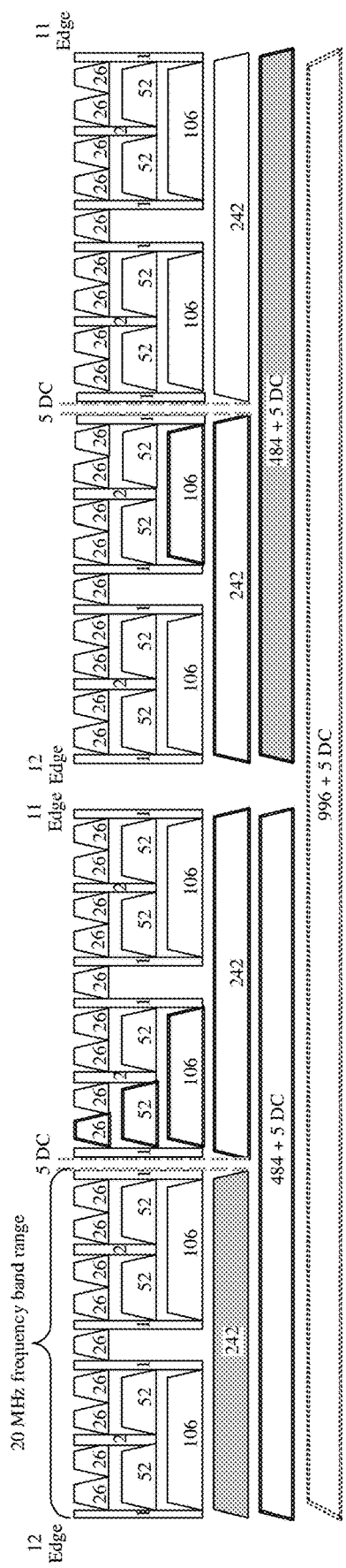
Figure 5F:
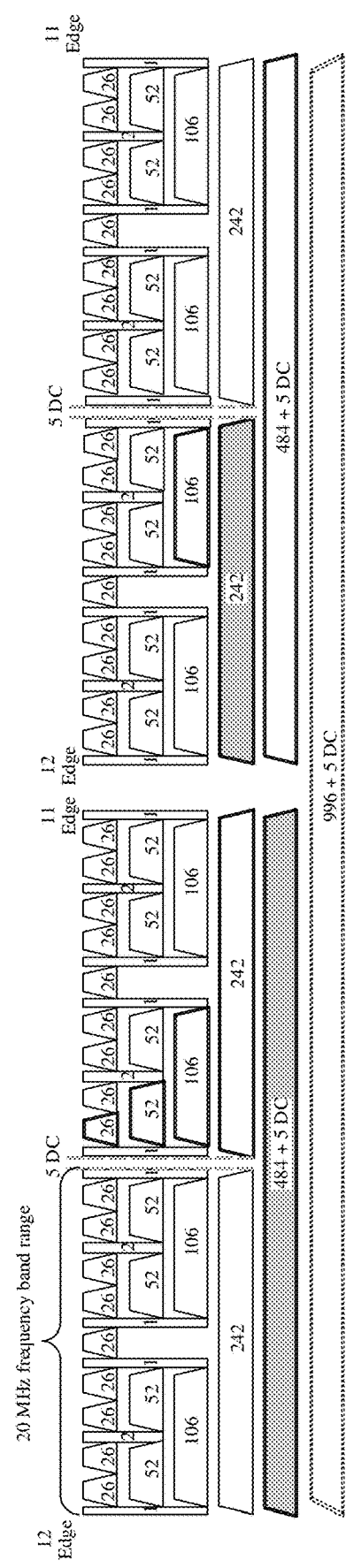
Figure 5G:
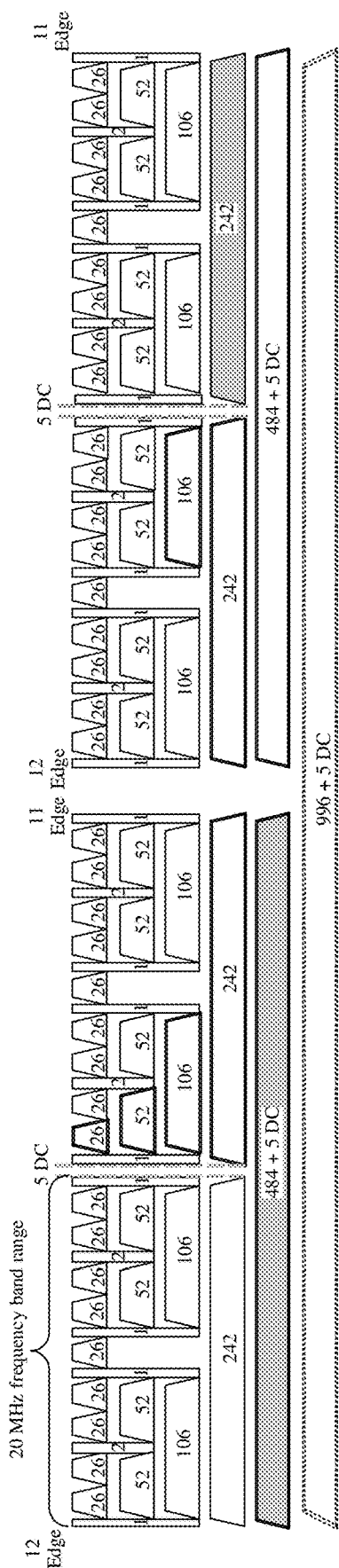

(8) RU106+RU26: This allocation manner may be understood as allocating an RU (denoted as a 26-tone RU) including 26 consecutive subcarriers and an RU (denoted as a 106-tone RU) including 106 consecutive subcarriers to a user. FIG. 5c is a schematic diagram of a tone plan of the RU106+RU26 (where a shaded part is an RU allocated to the user). Optionally, the 106-tone RU and the 26-tone RU in the RU106+RU26 are located on a same 20 MHz channel. For example, in the first 20 MHz channel from left to right shown in FIG. 5c, the first 106-tone RU and the fifth 26-tone RU in the first row are combined into an MRU and allocated to one user.

(9) RU242+RU484: This allocation manner may be understood as allocating an RU (denoted as a 242-tone RU) including 242 consecutive subcarriers and an RU (denoted as a 484-tone RU) including 484 consecutive subcarriers to a user. FIG. 5d to FIG. 5g are a schematic diagram of a tone plan of the RU242+RU484.

It should be understood that the 160 MHz tone plan may be considered as including two 80 MHz tone plans, the 240 MHz tone plan may be considered as including three 80 MHz tone plans, and the 320 MHz tone plan may be considered as including four 80 MHz tone plans. Details are not described herein. It should be noted that, if a channel puncturing pattern is used in an 80 MHz segment, an OFDMA tone plan is used. If a non-punctured 80 MHz segment is used, a non-OFDMA tone plan is used.

For example, allocatable resource units obtained by dividing a 320 MHz channel may include an RU26, an RU52, an RU52+RU26, an RU106, an RU106+RU26, an RU242, an RU484, an RU242+RU242, an RU242+RU484, an RU996, an RU484+RU996, an RU484+RU242+RU996, two·RU996s, an RU484+two·RU996s, and three RU996s. Two·RU996s are two 996-tone RUs.

For example, allocatable resource units obtained by dividing a 240 MHz channel may include an RU26, an RU52, an RU52+RU26, an RU106, an RU106+RU26, an RU242, an RU484, an RU242+RU242, an RU242+RU484, an RU996, an RU484+RU996, an RU484+RU242+RU996, two·RU996s, an RU484+two·RU996s, three RU996s, RU484+three·RU996s, and four·RU996s.

"+" means combination or aggregation. In other words, a plurality of RUs are combined (or aggregated) and allocated to a same user. For example, the RU52+RU26 is a 52-tone RU and a 26-tone RU that are allocated to a same user in a manner shown in FIG. 5b.

It should be noted that in embodiments of this application, a "protocol" may be a standard protocol in the communication field, for example, may include a WLAN protocol and a related protocol applied to a subsequent communication system. This is not limited in this application.

It should be further noted that, in embodiments of this application, "pre-obtaining" may include indication through device signaling or predefinition, for example, definition in a protocol. "Predefined" may be implemented by storing corresponding code or a table in a device (for example, the device includes a station and an access point) in advance, or may be implemented in another manner that can indicate related information. A specific implementation of "predefined" is not limited in this application. For example, "predefined" may be "defined in a protocol".

It should be further noted that "storing" in embodiments of this application may refer to storing in one or more memories. The one or more memories may be separately disposed, or may be integrated into an encoder, a decoder, a processor, or a communication apparatus. Alternatively, some of the one or more memories may be separately disposed, and some of the one or more memories are integrated into a decoder, a processor, or a communication apparatus. A type of the memory may be a storage medium in any form, and this is not limited in this application.

It should be further noted that in embodiments of this application, "of", "corresponding (relevant)", and "corresponding" are interchangeable sometimes. It should be noted that, when differences between the terms are not emphasized, meanings of the terms are the same.

It should be further noted that the term "and/or" describes an association relationship between associated objects and represents that three relationships may exist. For example, A and/or B may represent the following three cases: Only A exists, both A and B exist, and only B exists. The character "/" generally indicates an "or" relationship between the associated objects. The term "at least one" means one or more. The term "at least one of A and B", similar to the term "A and/or B", describes an association relationship between associated objects and represents that three relationships may exist. For example, at least one of A and B may represent the following three cases: Only A exists, both A and B exist, and only B exists.

The following describes in detail technical solutions provided in this application with reference to the accompanying drawings. Embodiments of this application may be applied to a plurality of different scenarios, including but not limited to the scenario shown in FIG. 1. For example, for uplink transmission, an STA may be used as a transmit end, and an AP may be used as a receive end. For downlink transmission, the AP may be used as a transmit end, and the STA may be used as a receive end. For another transmission scenario, for example, data transmission between APs, one AP may be used as a transmit end, and the other AP may be used as a receive end. For another example, for uplink transmission between STAs, one STA may be used as a transmit end, and the other STA may be used as a receive end. Therefore, the following describes embodiments of this application based on a transmit end and a receive end.

Figure 6:
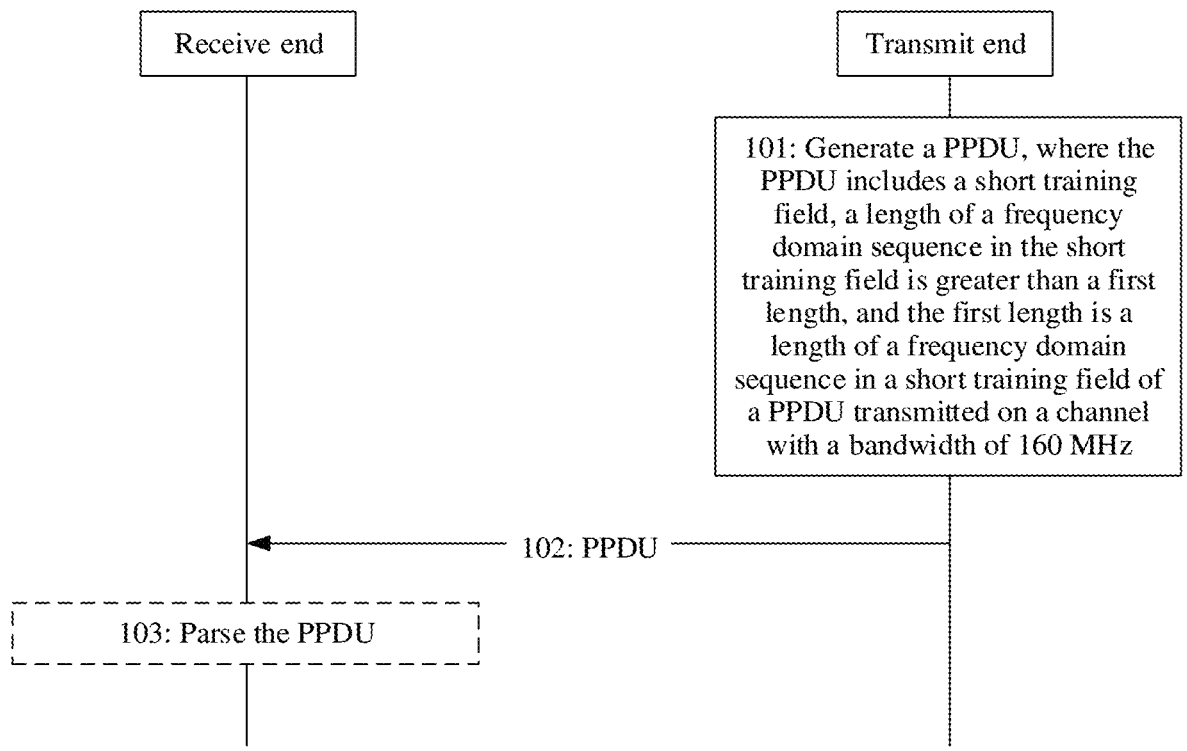
FIG. 6 is a schematic flowchart of a method for transmitting a physical layer protocol data unit according to an embodiment of this application.

FIG. 6 is a schematic flowchart of a method for transmitting a physical layer protocol data unit according to an embodiment of this application. The method shown in FIG. 6 may include the following steps.

Step 101: A transmit end generates a physical layer protocol data unit PPDU, where the PPDU includes a short training field, a length of a frequency domain sequence of the short training field is greater than a first length, and the first length is a length of a frequency domain sequence in a short training field of a PPDU transmitted on a channel with a bandwidth of 160 MHz.

Step 102: The transmit end sends the PPDU on a target channel, where a bandwidth of the target channel is greater than or equal to 160 MHz.

Accordingly, a receive end receives the PPDU on the target channel.

Step 103: The receive end parses the PPDU.

The receive end may perform signal detection, automatic gain control (AGC) estimation, symbol timing, coarse frequency offset estimation, and the like based on the short training field in the PPDU. For a specific parsing manner and application, refer to existing descriptions. This is not limited.

The short training field may also be referred to as a short training field, and is uniformly represented by the short training field below.

In this embodiment of this application, to be distinguished from a legacy-short training field, a short training field corresponding to the bandwidth of the target channel is represented as an extremely high throughput-STF (EHT-STF). It should be understood that the EHT-STF is a short training field used in the 802.11be protocol, and a specific name of the short training field constitutes no limitation on the protection scope of embodiments of this application.

The EHT-STF is obtained by using a frequency domain sequence in the EHT-STF. For example, the EHT-STF is obtained by performing IFFT transformation on the frequency domain sequence or a frequency domain value of the EHT-STF. For ease of description in this application, the frequency domain sequence in the EHT-STF is referred to as the EHTS for short. It should be understood that the EHTS is merely a name, and does not limit the protection scope of embodiments of this application. For example, the EHTS may also be referred to as the frequency domain sequence.

In this embodiment of this application, the first length indicates a length of a frequency domain sequence corresponding to a bandwidth of 160 MHz. The length of the frequency domain sequence of the short training field is greater than the first length. In other words, a length of the frequency domain sequence in the EHT-STF is greater than a length of a frequency domain sequence in an HE-STF whose channel bandwidth is 160 MHz. For example, the 160 MHz HE-STF may be obtained by concatenating two 80 MHz HE-STFs multiplied by a rotation factor. The 240 MHz EHT-STF may be obtained by concatenating three 80 MHz HE-STFs multiplied by the rotation factor. Alternatively, the 240 MHz EHT-STF may also be obtained by puncturing of a 320 MHz EHT-STF (for example, the 240 MHz EHT-STF may be obtained by 80 MHz EHT-STF puncturing of the 320 MHz EHT-STF). The 320 MHz EHT-STF may be obtained by concatenating four 80 MHz HE-STFs multiplied by the rotation factor. Therefore, the length of the frequency domain sequence in the EHT-STF is greater than the length of the frequency domain sequence in the HE-STF whose channel bandwidth is 160 MHz.

The length of the frequency domain sequence of the short training field is greater than the first length, or it may be understood that a quantity of frequency domain values of the EHT-STF is greater than a quantity of frequency domain values of the 160 MHz HE-STF. For example, a bandwidth of 240 MHz has a total of 3072 subcarriers, and the 3072 subcarriers correspond to 3072 frequency domain values. A bandwidth of 160 MHz has a total of 1024 subcarriers, and the 1024 subcarriers correspond to 1024 frequency domain values. Therefore, the quantity of frequency domain values of the EHT-STF is greater than the quantity of frequency domain values of the 160 MHz HE-STF.

The length of the frequency domain sequence of the short training field is greater than the first length, or it may be understood that a quantity of subcarrier numbers corresponding to the EHT-STF is greater than a quantity of subcarrier numbers corresponding to the 160 MHz HE-STF. For example, a short training sequence corresponding to the 240 MHz EHT-STF may be represented as EHTS−1520:16: 1520, and a short training sequence corresponding to the 160

MHz HE-STF may be represented as HES−1008:16:1008. In this case, it may be learned that the quantity of subcarrier numbers corresponding to the EHT-STF is greater than the quantity of subcarrier numbers corresponding to the 160 MHz HE-STF.

In this embodiment of this application, a length of a sequence indicates a length of elements in the sequence. For example, a sequence 1 is {0,1,−1,1}, and a length of the sequence 1 is 4. For another example, a sequence 2 is {0,1,−1,1,1,1,1}, and a length of the sequence 2 is 7. It can be learned that the length of the sequence 2 is greater than the length of the sequence 1. For another example, it is assumed that the length of the frequency domain sequence corresponding to the 160 MHz HE-STF is 2048, and the first length is 2048. In other words, the length of the frequency domain sequence in the EHT-STF is greater than 2048.

The bandwidth of the target channel is greater than or equal to 160 MHz.

Optionally, the bandwidth of the target channel may be any bandwidth greater than or equal to 160 MHz. For example, the bandwidth of the target channel is 160 MHz, 200 MHz, 240 MHz, 280 MHz, 320 MHz, or the like.

In this embodiment of this application, the EHT-STF for the target channel may be obtained through simulation calculation. For example, the transmit end may be obtained through calculation based on a sequence specified in a protocol (for example, an HE-LTF sequence in the IEEE 802.11ax) by using a corresponding formula. For another example, the transmit end may be obtained through calculation based on a stored sequence or a newly generated sequence by using a corresponding formula. This is not limited in embodiments of this application.

According to this embodiment of this application, in consideration of backward compatibility, a short training sequence of a larger channel bandwidth, for example, the short training sequence EHTS corresponding to the EHT-STF, is designed based on the short training sequence HES corresponding to an STF of an existing channel bandwidth, for example, the short training sequence HES corresponding to the HE-STF.

The method for transmitting a PPDU in this embodiment of this application can determine a short training sequence or a frequency domain sequence corresponding to a larger channel bandwidth, and support a receive end to perform automatic gain control on data transmitted on a channel with a larger bandwidth. The short training sequence may be obtained based on a short training sequence of an existing channel bandwidth, and a short training sequence with better performance may be obtained through simulation calculation, for example, through parameter adjustment. A short training field may be obtained based on the short training sequence. This embodiment of this application can meet a larger channel bandwidth during actual implementation, implement backward compatibility, verify, through exhaustive simulation on parameters, that the short training sequence provided in this embodiment of this application has a smaller peak-to-average power ratio PAPR and better performance, improve estimation effect of an automatic gain control circuit at the receive end, and achieve a lower receiving bit error rate.

In addition, for the EHTS provided in this embodiment of this application, a puncturing pattern in a larger channel bandwidth is further considered, and it is verified that the EHTS in this embodiment of this application has good performance and a small PAPR in the puncturing pattern. For uplink transmission, for the EHTS provided in this embodiment of this application, performance in cases such as multi-RU combination in a larger bandwidth is further considered. In a case of multi-RU combination transmission in a larger bandwidth, a PAPR of the EHTS is also small. Therefore, the EHTS provided in this embodiment of this application can adapt to new features such as a larger channel bandwidth, a new puncturing pattern, and multi-RU combination in the 802.11be protocol, have good performance, and can support uplink or downlink transmission in the 802.11be protocol. The following uses two examples in which the bandwidth of the target channel is 240 MHz and 320 MHz for description. The EHT-STF may include a plurality of periods, and a time length of each period may be 0.8 μs or 1.6 μs. An EHT STF of a non-EHT TB PPDU may also be referred to as an STF1x, and a period length of a frequency domain sequence in the EHT STF is 0.8 μs. An EHT STF of an EHT TB PPDU may also be referred to as an STF2x, and a period length of a frequency domain sequence in the EHT STF is 1.6 μs.

For brevity, in this embodiment of this application, the time length of each period is denoted as a period length. In this embodiment of this application, two scenarios in which period lengths are separately 0.8 μs and 1.6 μs are used to describe the frequency domain sequence in the EHT-STF of the bandwidth of the target channel. In this embodiment of this application, the period length of a reference channel is a period length of transmitting the frequency domain sequence of the short training field on the reference channel. Details are not described herein again.

In consideration of different bandwidths and different period lengths of different target channels, corresponding EHT-LTFs may be separately designed. Therefore, the following describes in detail the method in this embodiment of this application based on different cases.

A case 1 and a case 2 are for the EHT-STF of the 240 MHz channel bandwidth. Before the EHT-STF of the 240 MHz channel bandwidth is described, a 240 MHz subcarrier allocation pattern (tone plan) is described. As described above, a tone plan of an 80 MHz channel bandwidth specified in the 802.11ax has a total of 1024 subcarriers whose subscripts range from −511 to 512. There are 12 and 11 guard subcarriers (guard tone) on left and right edges of the bandwidth respectively. In an example, the tone plan of the 240 MHz channel bandwidth designed in this embodiment of this application is obtained by concatenating three 80 MHz tone plans. To be specific, left-sideband subcarriers and right-sideband subcarriers of the three 80 MHz bandwidths and direct current subcarriers in the center of each of the three 80 MHz bandwidths are reserved. In this way, the bandwidth of 240 MHz has a total of 1024×3=3072 subcarriers. There are 12 and 11 guard subcarriers on the left and right edges respectively, and 5 direct current subcarriers in the center of the bandwidth.

Case 1: The bandwidth of the target channel is 240 MHz, and the period length of the reference channel is 0.8 μs.

In this embodiment of this application, a frequency domain sequence in an EHT-STF whose bandwidth is 240 MHz and period length is 0.8 μs is denoted as STF1×240 MHz. STF1×240 MHz is denoted as EHTS−1520:16:1520, and STF1×240 MHz may be constructed in the following plurality of manners.

1. A 20 MHz Sequence in the IEEE 802.11ax is Used for Constructing STF1×240 MHz.

In this embodiment of this application, a frequency domain sequence in an HE-STF whose bandwidth is 20 MHz and period length is 0.8 μs in the IEEE 802.11ax is denoted as STF1×20 MHz. The EHTS designed in this embodiment of this application is as follows:

STF1×240 MHz=[STF1×80 MHz_1,0,STF1×80 MHz_2,0,STF1×80 MHz_3], where

STF1×80 MHz_1=[$c_1$·STF1×20 MHz,$a_1$,$c_2$·STF1×20 MHz,0,$c_3$·STF1×20 MHz,$a_2$,$c_4$·STF1×20 MHz],

STF1×80 MHz_2=[$c_5$·STF1×20 MHz,$a_3$,$c_6$·STF1×20 MHz,0,$c_7$·STF1×20 MHz,$a_4$,$c_8$·STF1×20 MHz], and STF1×80 MHz_3=[$c_9$·STF1×20 MHz,$a_5$,$c_{10}$·STF1×20 MHz,0,$c_{11}$·STF1×20 MHz,$a_6$,$c_{12}$·STF1×20 MHz].

For example, based on the foregoing formula, STF1×240 MHz may be represented as:

STF1×240 MHz=[$c_1$·STF1×20 MHz,$a_1$,$c_2$·STF1×20 MHz,0,$c_3$·STF1×20 MHz,$a_2$,$c_4$·STF1×20 MHz, 0,$c_5$·STF1×20 MHz,$a_3$,$c_6$·STF1×20 MHz,0, $c_7$·STF1×20 MHz,$a_4$,$c_8$·STF1×20 MHz,0, $c_9$·STF1×20 MHz,$a_5$,$c_{10}$·STF1×20 MHz,0, $c_{11}$·STF1×20 MHz,$a_6$,$c_{12}$·STF1×20 MHz].

For example, STF1×20 MHz=$HES_{-112:16:112}$={M}·(1+j)/$\sqrt{2}$ is denoted, and STF1×240 MHz may also be represented as:

$EHTS_{-1520:16:1520}$={$c_1$·$HES_{-112:16:112}$,$a_1$,$c_2$·$HES_{-112:16:112}$,0,$c_3$·$HES_{-112:16:112}$,$a_2$,$c_4$·$HES_{-112:16:112}$,0,$c_5$·$HES_{-112:16:112}$,$a_3$,$c_6$·$HES_{-112:16:112}$,0,$c_7$·$HES_{-112:16:112}$,$a_4$,$c_8$·$HES_{-112:16:112}$,0,$c_9$·$HES_{-112:16:112}$,$a_5$,$c_{10}$·$HES_{-112:16:112}$,0,$c_{11}$·$HES_{-112:16:112}$,$a_6$,$c_{12}$·$HES_{-112:16:112}$}, and $EHTS_{\pm1520}$=0, where a value of $a_i$ is {−1,1}, i=1, 2, . . . , or 6, a value of $c_j$ is {−1,1}, and j=1, 2, . . . , or 12.

Inverse Fourier transform and 4-fold oversampling are performed on different $EHTS_{-1520:16:1520}$ sequences determined by using the value of $a_i$ and the value of $c_j$, to obtain a time domain discrete value X for each group of sequences, and then a PAPR is calculated according to the formula. After exhaustive retrieval, all possible $EHTS_{-1520:16:1520}$ sequence values and corresponding PAPRs may be obtained, and a sequence with a smaller PAPR is selected from the possible $EHTS_{-1520:16:1520}$ sequence values.

When IFFTsize is set to 3072, with reference to Table 1-1, parameter set values of $EHTS_{-1520:16:1520}$ are obtained. In an example, a PAPR value of an EHTS corresponding to parameter set values of a sequence number 1 is a minimum value in corresponding maximum PAPR values in all possible parameter sets. In other words, when the sequence number 1 is used, an obtained PAPR value is less than a corresponding PAPR value in another parameter set. When puncturing is not performed, the PAPR value of the EHTS corresponding to the parameter set values of the sequence number 1 is 4.0742 dB.

In another example, if a channel is punctured, for example, in the foregoing channel puncturing patterns (pattern 2 to pattern 10) corresponding to 240 MHz and in another channel puncturing pattern that is not listed, a maximum PAPR value of an EHTS in puncturing patterns corresponding to parameter set values of a sequence number 2 is a minimum value in maximum PAPR values corresponding to the puncturing patterns in all possible parameter sets. It should be noted that, when the maximum PAPR value of the EHTS corresponding to the parameter set values of the sequence number 2 is obtained by using the channel puncturing pattern 5, a PAPR value of an EHTS corresponding to the parameter set value is 6.3874 dB. PAPR minimization when puncturing is performed is considered in design of an EHTS sequence of the sequence number 2.

In another example, parameter set values corresponding to a sequence number 3 may be used for both a punctured channel and a non-punctured channel, to obtain a minimum value in maximum PAPR values corresponding to puncturing and non-puncturing patterns in all possible parameter sets. A maximum PAPR value of EHTS sequences of the sequence number 3 is obtained by using the pattern 5, and the PAPR of the EHTS sequence is 6.3874 dB.

In all tables in this specification, a PAPR indicates a PAPR value of a sequence on which 4-fold oversampling is performed. Details are not described again.

TABLE 1-1

| Sequence number | $a_1$ | $a_2$ | $a_3$ | $a_4$ | $a_5$ | $a_6$ | $c_1$ | $c_2$ | $c_3$ | $c_4$ | $c_5$ | $c_6$ | $c_7$ | $c_8$ | $c_9$ | $c_{10}$ | $c_{11}$ | $c_{12}$ | PAPR [dB] |
|---|---|---|---|---|---|---|---|---|---|---|---|---|---|---|---|---|---|---|---|
| 1 | −1 | −1 | −1 | 1 | 1 | 1 | 1 | −1 | 1 | −1 | −1 | 1 | 1 | −1 | −1 | −1 | −1 | −1 | 4.0742 |
| 2 | 1 | −1 | 1 | 1 | −1 | 1 | 1 | −1 | 1 | 1 | 1 | 1 | −1 | 1 | −1 | −1 | −1 | 1 | 6.3874 |
| 3 | 1 | −1 | 1 | 1 | −1 | 1 | 1 | −1 | 1 | 1 | 1 | 1 | −1 | 1 | −1 | −1 | −1 | 1 | 6.3874 |

When IFFTsize is set to 4096, with reference to Table 1-2, parameter set values of EHTS−1520:16:1520 are obtained. In an example, a PAPR value of an EHTS corresponding to parameter set values of a sequence number 1 is a minimum value in corresponding maximum PAPR values in all possible parameter sets. In other words, when the sequence number 1 is used, an obtained PAPR value is less than a corresponding PAPR value in another parameter set. When puncturing is not performed, the PAPR value of the EHTS corresponding to the parameter set values of the sequence number 1 is 4.0751 dB.

In another example, if a channel is punctured, for example, in the foregoing channel puncturing patterns (pattern 2 to pattern 10) corresponding to 240 MHz and in another channel puncturing pattern that is not listed, a maximum PAPR value of an EHTS in puncturing patterns corresponding to parameter set values of a sequence number 2 is a minimum value in maximum PAPR values corresponding to the puncturing patterns in all possible parameter sets. It should be noted that, when the maximum PAPR value of the EHTS corresponding to the parameter set values of the sequence number 2 is obtained by using the channel puncturing pattern 2, a PAPR value of an EHTS corresponding to the parameter set value is 6.4877 dB. PAPR minimization when puncturing is performed is considered in design of an EHTS sequence of the sequence number 2.

In another example, parameter set values corresponding to a sequence number 3 may be used for both a punctured channel and a non-punctured channel, to obtain a minimum value in maximum PAPR values corresponding to puncturing and non-puncturing patterns in all possible parameter sets. A maximum PAPR value of EHTS sequences of the sequence number 3 is obtained by using the channel puncturing pattern 2, and the PAPR of the EHTS sequence is 6.4877 dB.

In all tables in this specification, a PAPR indicates a PAPR value of a sequence on which 4-fold oversampling is performed. Details are not described again.

TABLE 1-2

| Sequence number | $a_1$ | $a_2$ | $a_3$ | $a_4$ | $a_5$ | $a_6$ | $c_1$ | $c_2$ | $c_3$ | $c_4$ | $c_5$ | $c_6$ | $c_7$ | $c_8$ | $c_9$ | $c_{10}$ | $c_{11}$ | $c_{12}$ | PAPR [dB] |
|---|---|---|---|---|---|---|---|---|---|---|---|---|---|---|---|---|---|---|---|
| 1 | −1 | −1 | −1 | 1 | 1 | 1 | 1 | 1 | 1 | 1 | 1 | −1 | −1 | 1 | 1 | −1 | 1 | −1 | 4.0751 |
| 2 | 1 | −1 | 1 | 1 | −1 | 1 | 1 | −1 | 1 | 1 | 1 | 1 | −1 | 1 | −1 | −1 | −1 | 1 | 6.4877 |
| 3 | 1 | −1 | 1 | 1 | −1 | 1 | 1 | −1 | 1 | 1 | 1 | 1 | −1 | 1 | −1 | −1 | −1 | 1 | 6.4877 |

2. An 80 MHz Sequence in the IEEE 802.11ax is Used for Constructing STF1×240 MHz.

In this embodiment of this application, a frequency domain sequence in an HE-STF whose bandwidth is 80 MHz and period length is 0.8 μs in the IEEE 802.11ax is denoted as STF1×80 M. A design formula is as follows:

STF1×240 MHz=[STF1×80 MHz,0,$c_1$·STF1×80 MHz,0,$c_2$·STF1×80 MHz].

For example, STF1×80 M=HES$_{-496:16:496}$={M,1,−M,0,−M,1,−M}·(1+j)/√2 is denoted, and STF1×240 MHz may also be represented as:

EHTS$_{-1520:16:1520}$={HES$_{-496:16:496}$,0,$c_1$·HES$_{-496:16:496}$,0,$c_2$·HES$_{-496:16:496}$}, where a value of $c_j$ is {−1,1}, and j=1 or 2.

Inverse Fourier transform and 4-fold oversampling are performed on different EHTS$_{-1520:16:1520}$ sequences determined by using the value of $c_j$, to obtain a time domain discrete value X for each group of sequences, and then a PAPR is calculated according to the formula. After exhaustive retrieval, all possible EHTS$_{-1520:16:1520}$ sequence values and corresponding PAPRs may be obtained, and a sequence with a smaller PAPR is selected from the possible EHTS$_{-1520:16:1520}$ sequence values.

When IFFTsize is set to 3072, with reference to Table 2-1, parameter set values of EHTS−1520:16:1520 are obtained. In an example, a PAPR value of an EHTS corresponding to parameter set values of a sequence number 1 is a minimum value in corresponding maximum PAPR values in all possible parameter sets. In other words, when the sequence number 1 is used, an obtained PAPR value is less than a corresponding PAPR value in another parameter set. When puncturing is not performed, the PAPR value of the EHTS corresponding to the parameter set values of the sequence number 1 is 6.4759 dB.

In another example, if a channel is punctured, for example, in the foregoing channel puncturing patterns (pattern 2 to pattern 10) corresponding to 240 MHz and in another channel puncturing pattern that is not listed, a maximum PAPR value of an EHTS in puncturing patterns corresponding to parameter set values of a sequence number 2 is a minimum value in maximum PAPR values corresponding to the puncturing patterns in all possible parameter sets. It should be noted that, when the maximum PAPR value of the EHTS corresponding to the parameter set values of the sequence number 2 is obtained by using the channel puncturing pattern 8, a PAPR value of an EHTS corresponding to the parameter set value is 7.5390 dB. PAPR minimization when puncturing is performed is considered in design of an EHTS sequence of the sequence number 2.

In another example, parameter set values corresponding to a sequence number 3 may be used for both a punctured channel and a non-punctured channel, to obtain a minimum value in maximum PAPR values corresponding to puncturing and non-puncturing patterns in all possible parameter sets. A maximum PAPR value of EHTS sequences of the sequence number 3 is obtained by using the channel puncturing pattern 8, and the PAPR of the EHTS sequence is 7.5390 dB.

TABLE 2-1

| Sequence number | $c_1$ | $c_2$ | PAPR [dB] |
|---|---|---|---|
| 1 | −1 | −1 | 6.4759 |
| 2 | 1 | −1 | 7.5390 |
| 3 | 1 | −1 | 7.5390 |

When IFFTsize is set to 4096, with reference to Table 2-2, parameter set values of EHTS$_{-1520:16:1520}$ are obtained. In an example, a PAPR value of an EHTS corresponding to parameter set values of a sequence number 1 is a minimum value in corresponding maximum PAPR values in all possible parameter sets. In other words, when the sequence number 1 is used, an obtained PAPR value is less than a corresponding PAPR value in another parameter set. When puncturing is not performed, the PAPR value of the EHTS corresponding to the parameter set values of the sequence number 1 is 6.4759 dB.

In another example, if a channel is punctured, for example, in the foregoing channel puncturing patterns (pattern 2 to pattern 10) corresponding to 240 MHz and in another channel puncturing pattern that is not listed, a maximum PAPR value of an EHTS in puncturing patterns corresponding to parameter set values of a sequence number 2 is a minimum value in maximum PAPR values corresponding to the puncturing patterns in all possible parameter sets. It should be noted that, when the maximum PAPR value of the EHTS corresponding to the parameter set values of the sequence number 2 is obtained by using the channel puncturing pattern 8, a PAPR value of an EHTS corresponding to the parameter set value is 7.5390 dB. PAPR minimization when puncturing is performed is considered in design of an EHTS sequence of the sequence number 2.

In another example, parameter set values corresponding to a sequence number 3 may be used for both a punctured channel and a non-punctured channel, to obtain a minimum value in maximum PAPR values corresponding to puncturing and non-puncturing patterns in all possible parameter sets. A maximum PAPR value of EHTS sequences of the sequence number 3 is obtained by using the pattern 8, and the PAPR of the EHTS sequence is 7.5390 dB.

TABLE 2-2

| Sequence number | $c_1$ | $c_2$ | PAPR [dB] |
|---|---|---|---|
| 1 | 1 | −1 | 6.4759 |
| 2 | 1 | −1 | 7.5390 |
| 3 | 1 | −1 | 7.5390 |

3. A 160 MHz Sequence and the 80 MHz Sequence in the IEEE 802.11ax are Used for Constructing STF1×240 MHz.

In this embodiment of this application, a frequency domain sequence in an HE-STF whose bandwidth is 160 MHz and period length is 0.8 μs in the IEEE 802.11ax is denoted as STF1×160 MHz, and the frequency domain sequence in the HE-STF whose bandwidth is 80 MHz and period length is 0.8 μs in the IEEE 802.11ax is denoted as STF1×80 MHz.

In a possible implementation, a design formula is as follows:

STF1×240 MHz=[STF1×160 MHz,0,$c_1$·STF1×80 MHz].

For example, STF1×160 MHz=$HES_{-1008:16:1008}$={M,1,−M,0,−M,1,−M,0,−M,−1,M,0,−M,1,−M}·(1+j)/$\sqrt{2}$ is denoted, STF1×80 MHz=$HES_{-496:16:496}$={M,1,−M,0,−M,1,−M}·(1+j)/$\sqrt{2}$ is denoted, and STF1×240 MHz may also be represented as:

$EHTS_{-1520:16:1520}$={$HES_{-1008:16:1008}$,0,$c_1$·$HES_{-496:16:496}$}, where a value of $c_j$ is {−1,1}, and j=1.

Inverse Fourier transform and 4-fold oversampling are performed on different $EHTS_{-1520:16:1520}$ sequences determined by using the value of $a_i$ and the value of $c_j$, to obtain a time domain discrete value X for each group of sequences, and then a PAPR is calculated according to the formula. After exhaustive retrieval, all possible $EHTS_{-1520:16:1520}$ sequence values and corresponding PAPRs may be obtained, and a sequence with a smaller PAPR is selected from the possible $EHTS_{-1520:16:1520}$ sequence values.

When IFFTsize is set to 3072, with reference to Table 3-1, parameter set values of $EHTS_{-1520:16:1520}$ are obtained. In an example, a PAPR value of an EHTS corresponding to parameter set values of a sequence number 1 is a minimum value in corresponding maximum PAPR values in all possible parameter sets. In other words, when the sequence number 1 is used, an obtained PAPR value is less than a corresponding PAPR value in another parameter set. When puncturing is not performed, the PAPR value of the EHTS corresponding to the parameter set values of the sequence number 1 is 6.3992 dB.

In another example, if a channel is punctured, for example, in the foregoing channel puncturing patterns (pattern 2 to pattern 10) corresponding to 240 MHz and in another channel puncturing pattern that is not listed, a maximum PAPR value of an EHTS in puncturing patterns corresponding to parameter set values of a sequence number 2 is a minimum value in maximum PAPR values corresponding to the puncturing patterns in all possible parameter sets. It should be noted that, when the maximum PAPR value of the EHTS corresponding to the parameter set values of the sequence number 2 is obtained by using the channel puncturing pattern 1, a PAPR value of an EHTS corresponding to the parameter set value is 7.3318 dB. PAPR minimization when puncturing is performed is considered in design of an EHTS sequence of the sequence number 2.

In another example, parameter set values corresponding to a sequence number 3 may be used for both a punctured channel and a non-punctured channel, to obtain a minimum value in maximum PAPR values corresponding to puncturing and non-puncturing patterns in all possible parameter sets. A maximum PAPR value of EHTS sequences of the sequence number 3 is obtained by using the channel puncturing pattern 1, and the PAPR of the EHTS sequence is 7.4136 dB.

TABLE 3-1

| Sequence number | $c_1$ | PAPR [dB] |
| --- | --- | --- |
| 1 | 1 | 6.3992 |
| 2 | −1 | 7.3318 |
| 3 | −1 | 7.4136 |

When IFFTsize is set to 4096, with reference to Table 3-2, parameter set values of $EHTS_{-1520:16:1520}$ are obtained. In an example, a PAPR value of an EHTS corresponding to parameter set values of a sequence number 1 is a minimum value in corresponding maximum PAPR values in all possible parameter sets. In other words, when the sequence number 1 is used, an obtained PAPR value is less than a corresponding PAPR value in another parameter set. When puncturing is not performed, the PAPR value of the EHTS corresponding to the parameter set values of the sequence number 1 is 6.3992 dB.

In another example, if a channel is punctured, for example, in the foregoing channel puncturing patterns (pattern 2 to pattern 10) corresponding to 240 MHz and in another channel puncturing pattern that is not listed, a maximum PAPR value of an EHTS in puncturing patterns corresponding to parameter set values of a sequence number 2 is a minimum value in maximum PAPR values corresponding to the puncturing patterns in all possible parameter sets. It should be noted that, when the maximum PAPR value of the EHTS corresponding to the parameter set values of the sequence number 2 is obtained by using the channel puncturing pattern 1, a PAPR value of an EHTS corresponding to the parameter set value is 7.3318 dB. PAPR minimization when puncturing is performed is considered in design of an EHTS sequence of the sequence number 2.

In another example, parameter set values corresponding to a sequence number 3 may be used for both a punctured channel and a non-punctured channel, to obtain a minimum value in maximum PAPR values corresponding to puncturing and non-puncturing patterns in all possible parameter sets. A maximum PAPR value of EHTS sequences of the sequence number 3 is obtained by using the pattern 1, and the PAPR of the EHTS sequence is 7.4136 dB.

TABLE 3-2

| Sequence number | $c_1$ | PAPR [dB] |
| --- | --- | --- |
| 1 | 1 | 6.3992 |
| 2 | −1 | 7.3318 |
| 3 | −1 | 7.4136 |

In another possible implementation, the 80 MHz sequence may be further constructed by using the 20 MHz sequence, and a design formula is as follows:

STF1×240 MHz=[STF1×160 MHz,0,STF1×80 MHz_1], where

STF1×80 MHz_1=[$c_1$·STF1×20 MHz,$a_1$,$c_2$·STF1×20 MHz,0,$c_3$·STF1×20 MHz,$a_2$,$c_4$·STF1×20 MHz].

For example, based on the foregoing formula, STF1×240 MHz may be represented as:

STF1×240 MHz=[STF1×160 MHz,0,$c_1$·STF1×20 MHz,$a_1$,$c_2$·STF1×20 MHz,0,$c_3$·STF1×20 MHz, $a_2$,$c_4$·STF1×20 MHz].

For example, STF1×160 MHz=$HES_{-1008:16:1008}$={M,1,−M,0,−M,1,−M,0,−M,−1,M,0,−M,1,−M}·(1+j)/$\sqrt{2}$ is denoted, STF1×20 MHz=HES$_{-112:16:112}$={M}·(1+j)/$\sqrt{2}$ is denoted, and STF1×240 MHz may also be represented as:

EHTS$_{-1520:16:1520}$={HES$_{-1008:16:1008}$,0,$c_1$·
HES$_{-112:16:112}$,$a_1$,$c_2$·HES$_{-112:16:112}$,0,$c_3$·
HES$_{-112:16:112}$,$a_2$,$c_4$·HES$_{-112:16:112}$}, where a value of $a_i$ is {−1,1}, i=1 or 2, a value of $c_j$ is {−1,1}, and j=1, 2, 3, or 4.

Inverse Fourier transform and 4-fold oversampling are performed on different EHTS$_{-1520:16:1520}$ sequences determined by using the value of $a_i$ and the value of $c_j$, to obtain a time domain discrete value X for each group of sequences, and then a PAPR is calculated according to the formula. After exhaustive retrieval, all possible EHTS$_{-1520:16:1520}$ sequence values and corresponding PAPRs may be obtained, and a sequence with a smaller PAPR is selected from the possible EHTS$_{-1520:16:1520}$ sequence values.

When IFFTsize is set to 3072, with reference to Table 4-1, parameter set values of EHTS$_{-1520:16:1520}$ are obtained. In an example, a PAPR value of an EHTS corresponding to parameter set values of a sequence number 1 is a minimum value in corresponding maximum PAPR values in all possible parameter sets. In other words, when the sequence number 1 is used, an obtained PAPR value is less than a corresponding PAPR value in another parameter set. When puncturing is not performed, the PAPR value of the EHTS corresponding to the parameter set values of the sequence number 1 is 5.3596 dB.

In another example, if a channel is punctured, for example, in the foregoing channel puncturing patterns (pattern 2 to pattern 10) corresponding to 240 MHz and in another channel puncturing pattern that is not listed, a maximum PAPR value of an EHTS in puncturing patterns corresponding to parameter set values of a sequence number 2 is a minimum value in maximum PAPR values corresponding to the puncturing patterns in all possible parameter sets. It should be noted that, when the maximum PAPR value of the EHTS corresponding to the parameter set values of the sequence number 2 is obtained by using the channel puncturing pattern 4, a PAPR value of an EHTS corresponding to the parameter set value is 7.5525 dB. PAPR minimization when puncturing is performed is considered in design of an EHTS sequence of the sequence number 2.

In another example, parameter set values corresponding to a sequence number 3 may be used for both a punctured channel and a non-punctured channel, to obtain a minimum value in maximum PAPR values corresponding to puncturing and non-puncturing patterns in all possible parameter sets. A maximum PAPR value of EHTS sequences of the sequence number 3 is obtained by using the channel puncturing pattern 4, and the PAPR of the EHTS sequence is 7.5525 dB.

TABLE 4-1

| Sequence number | $a_1$ | $a_2$ | $c_1$ | $c_2$ | $c_3$ | $c_4$ | PAPR [dB] |
|---|---|---|---|---|---|---|---|
| 1 | −1 | 1 | −1 | 1 | −1 | 1 | 5.3596 |
| 2 | −1 | −1 | 1 | 1 | 1 | −1 | 7.5525 |
| 3 | −1 | −1 | 1 | 1 | 1 | −1 | 7.5525 |

When IFFTsize is set to 4096, with reference to Table 4-2, parameter set values of EHTS$_{-1520:16:1520}$ are obtained. In an example, a PAPR value of an EHTS corresponding to parameter set values of a sequence number 1 is a minimum value in corresponding maximum PAPR values in all possible parameter sets. In other words, when the sequence number 1 is used, an obtained PAPR value is less than a corresponding PAPR value in another parameter set. When puncturing is not performed, the PAPR value of the EHTS corresponding to the parameter set values of the sequence number 1 is 5.4363 dB.

In another example, if a channel is punctured, for example, in the foregoing channel puncturing patterns (pattern 2 to pattern 10) corresponding to 240 MHz and in another channel puncturing pattern that is not listed, a maximum PAPR value of an EHTS in puncturing patterns corresponding to parameter set values of a sequence number 2 is a minimum value in maximum PAPR values corresponding to the puncturing patterns in all possible parameter sets. It should be noted that, when the maximum PAPR value of the EHTS corresponding to the parameter set values of the sequence number 2 is obtained by using the channel puncturing pattern 2, a PAPR value of an EHTS corresponding to the parameter set value is 7.6672 dB. PAPR minimization when puncturing is performed is considered in design of an EHTS sequence of the sequence number 2.

In another example, parameter set values corresponding to a sequence number 3 may be used for both a punctured channel and a non-punctured channel, to obtain a minimum value in maximum PAPR values corresponding to puncturing and non-puncturing patterns in all possible parameter sets. A maximum PAPR value of EHTS sequences of the sequence number 3 is obtained by using the channel puncturing pattern 2, and the PAPR of the EHTS sequence is 7.6672 dB.

TABLE 4-2

| Sequence number | $a_1$ | $a_2$ | $c_1$ | $c_2$ | $c_3$ | $c_4$ | PAPR [dB] |
|---|---|---|---|---|---|---|---|
| 1 | −1 | 1 | −1 | 1 | −1 | 1 | 5.4363 |
| 2 | −1 | 1 | 1 | −1 | −1 | −1 | 7.6672 |
| 3 | −1 | 1 | 1 | −1 | −1 | −1 | 7.6672 |

In another possible implementation, the 80 MHz sequence may further be constructed by using a 40 MHz sequence. In this embodiment of this application, a frequency domain sequence in an HE-STF whose bandwidth is 40 MHz and period length is 0.8 μs in the IEEE 802.11ax is denoted as STF1×40 MHz. A design formula is as follows:

STF1×240 MHz=[STF1×160 MHz,0,STF1×80 MHz_1], where

STF1×80 MHz_1=[$c_1$·STF1×40 MHz,0,$c_2$·STF1×40 MHz].

For example, based on the foregoing formula, STF1×240 MHz may be represented as:

STF1×240 MHz=[STF1×160 MHz,0,$c_1$·STF1×40 MHz,0,$c_2$·STF1×40 MHz].

For example, STF1×160 MHz=HES$_{-1008:16:1008}$={M,1,−M,0,−M,1,−M,0,−M,−1,M,0,−M,1,−M}·(1+j)/$\sqrt{2}$ is denoted, STF1×40 MHz=HES$_{-240:16:240}$={M,0,−M}·(1+j)/$\sqrt{2}$ is denoted, and STF1×240 MHz may also be represented as:

EHTS$_{-1520:16:1520}$={HES$_{-1008:16:1008}$,0,$c_1$·
HES$_{-240:16:240}$,0,$c_2$·HES$_{-240:16:240}$}, where a value of $c_j$ is {−1,1}, and j=1 or 2.

Inverse Fourier transform and 5-fold oversampling are performed on different EHTS−1520:16:1520 sequences determined by using the value of ai and the value of cj, to obtain a time domain discrete value X for each group of sequences, and then a PAPR is calculated according to the formula. After exhaustive retrieval, all possible EHTS−1520:16:1520 sequence values and corresponding PAPRs may be obtained, and a sequence with a smaller PAPR is selected from the possible EHTS−1520:16:1520 sequence values.

When IFFTsize is set to 3072, with reference to Table 5-1, parameter set values of $EHTS_{-1520:16:1520}$ are obtained. In an example, a PAPR value of an EHTS corresponding to parameter set values of a sequence number 1 is a minimum value in corresponding maximum PAPR values in all possible parameter sets. In other words, when the sequence number 1 is used, an obtained PAPR value is less than a corresponding PAPR value in another parameter set. When puncturing is not performed, the PAPR value of the EHTS corresponding to the parameter set values of the sequence number 1 is 5.4541 dB.

In another example, if a channel is punctured, for example, in the foregoing channel puncturing patterns (pattern 2 to pattern 10) corresponding to 240 MHz and in another channel puncturing pattern that is not listed, a maximum PAPR value of an EHTS in puncturing patterns corresponding to parameter set values of a sequence number 2 is a minimum value in maximum PAPR values corresponding to the puncturing patterns in all possible parameter sets. It should be noted that, when the maximum PAPR value of the EHTS corresponding to the parameter set values of the sequence number 2 is obtained by using the channel puncturing pattern 4, a PAPR value of an EHTS corresponding to the parameter set value is 7.6702 dB. PAPR minimization when puncturing is performed is considered in design of an EHTS sequence of the sequence number 2.

In another example, parameter set values corresponding to a sequence number 3 may be used for both a punctured channel and a non-punctured channel, to obtain a minimum value in maximum PAPR values corresponding to puncturing and non-puncturing patterns in all possible parameter sets. A maximum PAPR value of EHTS sequences of the sequence number 3 is obtained by using the channel puncturing pattern 4, and the PAPR of the EHTS sequence is 7.6702 dB.

TABLE 5-1

| Sequence number | $c_1$ | $c_2$ | PAPR [dB] |
|---|---|---|---|
| 1 | −1 | −1 | 5.4541 |
| 2 | −1 | 1 | 7.6702 |
| 3 | −1 | 1 | 7.6702 |

When IFFTsize is set to 4096, with reference to Table 5-2, parameter set values of $EHTS_{-1520:16:1520}$ are obtained. In an example, a PAPR value of an EHTS corresponding to parameter set values of a sequence number 1 is a minimum value in corresponding maximum PAPR values in all possible parameter sets. In other words, when the sequence number 1 is used, an obtained PAPR value is less than a corresponding PAPR value in another parameter set. When puncturing is not performed, the PAPR value of the EHTS corresponding to the parameter set values of the sequence number 1 is 7.3662 dB.

In another example, if a channel is punctured, for example, in the foregoing channel puncturing patterns (pattern 2 to pattern 10) corresponding to 240 MHz and in another channel puncturing pattern that is not listed, a maximum PAPR value of an EHTS in puncturing patterns corresponding to parameter set values of a sequence number 2 is a minimum value in maximum PAPR values corresponding to the puncturing patterns in all possible parameter sets. It should be noted that, when the maximum PAPR value of the EHTS corresponding to the parameter set values of the sequence number 2 is obtained by using the channel puncturing pattern 4, a PAPR value of an EHTS corresponding to the parameter set value is 7.6187 dB. PAPR minimization when puncturing is performed is considered in design of an EHTS sequence of the sequence number 2.

In another example, parameter set values corresponding to a sequence number 3 may be used for both a punctured channel and a non-punctured channel, to obtain a minimum value in maximum PAPR values corresponding to puncturing and non-puncturing patterns in all possible parameter sets. A maximum PAPR value of EHTS sequences of the sequence number 3 is obtained by using the channel puncturing pattern 4, and the PAPR of the EHTS sequence is 7.6187 dB.

TABLE 5-2

| Sequence number | $c_1$ | $c_2$ | PAPR [dB] |
|---|---|---|---|
| 1 | 1 | −1 | 7.3662 |
| 2 | −1 | 1 | 7.6187 |
| 3 | −1 | 1 | 7.6187 |

Case 2: The Bandwidth of the Target Channel is 240 MHz, and the Period Length of the Reference Channel is 1.6 μs.

In this embodiment of this application, a frequency domain sequence in an EHT-STF whose bandwidth is 240 MHz and period length is 1.6 μs is denoted as STF2×240 MHz. STF2×240 MHz is denoted as $EHTS_{-1528:8:1528}$, and $EHTS_{-1528:8:1528}$ may be constructed in the following plurality of manners.

1. The 20 MHz Sequence in the IEEE 802.11ax is Used for Constructing STF2×240 MHz.

In this embodiment of this application, a frequency domain sequence in an HE-STF whose bandwidth is 20 MHz and period length is 1.6 μs in the IEEE 802.11ax is denoted as STF2×20 MHz. A design formula is as follows:

STF2×240 MHz=[STF2×80 MHz_1,0,STF2×80 MHz_2,0,STF2×80 MHz_3], where

STF2×80 MHz_1=[$c_1$·STF2×20 MHz,$a_1$,$c_2$·STF2×20 MHz,0,$c_3$·STF2×20 MHz,$a_2$,$c_4$·STF2×20 MHz],

STF2×80 MHz_2=[$c_5$·STF2×20 MHz,$a_3$,$c_6$·STF2×20 MHz,0,$c_7$·STF2×20 MHz,$a_4$,$c_8$·STF2×20 MHz],

STF2×80 MHz_3=[$c_9$·STF2×20 MHz,$a_5$,$c_{10}$·STF2×20 MHz,0,$c_{11}$·STF2×20 MHz,$a_6$,$c_{12}$·STF2×20 MHz], and STF2×240 MHz$_{-1528}$=STF2×240 MHz$_{-520}$=STF2×240 MHz$_{-504}$=STF2×240 MHz$_{504}$=STF2×240 MHz$_{520}$=STF2×240 MHz$_{1528}$=0.

For example, based on the foregoing formula, STF2×240 MHz may be represented as:

STF2×240 MHz=[$c_1$·STF2×20 MHz,$a_1$,$c_2$·STF2×20 MHz,0,$c_3$·STF2×20 MHz,$a_2$,$c_4$·STF2×20 MHz, 0,$c_5$·STF2×20 MHz,$a_3$,$c_6$·STF2×20 MHz,0, $c_7$·STF2×20 MHz,$a_4$,$c_8$·STF2×20 MHz,0, $c_9$·STF2×20 MHz,$a_5$,$c_{10}$·STF2×20 MHz,0, $c_{11}$·STF2×20 MHz,$a_6$,$c_{12}$·STF2×20 MHz].

For example, STF2×20 MHz=HES$_{-120:8:120}$={M,0,−M}· (1+j)/√2 is denoted, and STF2×240 MHz may also be represented as:

EHTS$_{-1528:8:1528}$={$c_1$·HES$_{-120:8:120}$,$a_1$,$c_2$· HES$_{-120:8:120}$,0,$c_3$·HES$_{-120:8:120}$,$a_2$,$c_4$· HES$_{-120:8:120}$,0,$c_5$·HES$_{-120:8:120}$,$a_3$,$c_6$·

HES$_{-120:8:120}$,0,$c_7$·HES$_{-120:8:120}$,$a_4$,$c_8$· HES$_{-120:8:120}$,0,$c_9$·HES$_{-120:8:120}$,$a_5$,$c_{10}$· HES$_{-120:8:120}$,0,$c_{11}$·HES$_{-120:8:120}$,$a_6$,$c_{12}$· HES$_{-120:8:120}$}, and STF2×240 MHz$_{-1528}$=STF2×240 MHz$_{-520}$=STF2× 240 MHz$_{-504}$=STF2×240 MHz$_{504}$=STF2×240 MHz$_{520}$=STF2×240 MHz$_{1528}$=0, where a value of $a_i$ is {−1,1}, i=1, 2, . . . , or 6, a value of $c_j$ is {−1,1}, and j=1, 2, . . . , or 12.

Inverse Fourier transform and 4-fold oversampling are performed on different EHTS$_{-1528:8:1528}$ sequences determined by using the value of $a_i$ and the value of $c_j$, to obtain a time domain discrete value X for each group of sequences, and then a PAPR is calculated according to the formula. After exhaustive retrieval, all possible EHTS$_{-1528:8:1528}$ sequence values and corresponding PAPRs may be obtained, and a sequence with a smaller PAPR is selected from the possible EHTS$_{-1528:8:1528}$ sequence values.

When IFFTsize is set to 3072, with reference to Table 6-1, parameter set values of EHTS$_{-1528:8:1528}$ are obtained. In an example, a PAPR value of an EHTS corresponding to parameter set values of a sequence number 1 is a minimum value in corresponding maximum PAPR values in all possible parameter sets. It should be noted that, when the maximum PAPR value of the EHTS corresponding to the parameter set values of the sequence number 1 is obtained by using the RU allocation manner of RU242+RU484, a PAPR value of an EHTS corresponding to the parameter set value is 9.2333 dB. PAPR minimization when puncturing is not performed and a multi-RU allocation manner is used is considered in design of an EHTS sequence of the sequence number 1.

In another example, if a channel is punctured, for example, in the foregoing channel puncturing patterns (pattern 2 to pattern 10) corresponding to 240 MHz and in another channel puncturing pattern that is not listed, a maximum PAPR value of an EHTS in puncturing patterns corresponding to parameter set values of a sequence number 2 is a minimum value in maximum PAPR values corresponding to the puncturing patterns in all possible parameter sets. It should be noted that, when the maximum PAPR value of the EHTS corresponding to the parameter set values of the sequence number 2 is obtained by using the RU allocation manner of RU242+RU484, a PAPR value of an EHTS corresponding to the parameter set value is 9.6074 dB. PAPR minimization when puncturing is performed and a multi-RU allocation manner is used is considered in design of an EHTS sequence of the sequence number 2.

In another example, parameter set values corresponding to a sequence number 3 may be used for both a punctured channel and a non-punctured channel, to obtain a minimum value in maximum PAPR values corresponding to puncturing and non-puncturing patterns in all possible parameter sets. A maximum PAPR value of EHTS sequences of the sequence number 3 is obtained by using the RU allocation manner of RU242+RU484, and the PAPR of the EHTS sequence is 9.6074 dB.

TABLE 6-1

| Sequence number | $a_1$ | $a_2$ | $a_3$ | $a_4$ | $a_5$ | $a_6$ | $c_1$ | $c_2$ | $c_3$ | $c_4$ | $c_5$ | $c_6$ | $c_7$ | $c_8$ | $c_9$ | $c_{10}$ | $c_{11}$ | $c_{12}$ | PAPR [dB] |
|---|---|---|---|---|---|---|---|---|---|---|---|---|---|---|---|---|---|---|---|
| 1 | 1 | 1 | 1 | 1 | 1 | 1 | 1 | 1 | −1 | −1 | 1 | −1 | 1 | −1 | 1 | 1 | −1 | −1 | 9.2333 |
| 2 | 1 | 1 | 1 | 1 | 1 | −1 | 1 | 1 | 1 | −1 | 1 | −1 | −1 | 1 | −1 | 1 | 1 | 1 | 9.6074 |
| 3 | 1 | 1 | 1 | 1 | 1 | −1 | 1 | 1 | 1 | −1 | 1 | −1 | −1 | 1 | −1 | 1 | 1 | 1 | 9.6074 |

When IFFTsize is set to 3072, with reference to Table 6-2, parameter set values of EHTS$_{-1528:8:1528}$ are obtained. In an example, a PAPR value of an EHTS corresponding to parameter set values of a sequence number 1 is a minimum value in corresponding maximum PAPR values in all possible parameter sets. It should be noted that, when the maximum PAPR value of the EHTS corresponding to the parameter set values of the sequence number 1 is obtained by using the RU allocation manner of RU996, a PAPR value of an EHTS corresponding to the parameter set value is 8.3706 dB. PAPR minimization when puncturing is not performed and a multi-RU allocation manner is used is considered in design of an EHTS sequence of the sequence number 1.

In another example, if a channel is punctured, for example, in the foregoing channel puncturing patterns (pattern 2 to pattern 10) corresponding to 240 MHz and in another channel puncturing pattern that is not listed, a maximum PAPR value of an EHTS in puncturing patterns corresponding to parameter set values of a sequence number 2 is a minimum value in maximum PAPR values corresponding to the puncturing patterns in all possible parameter sets. It should be noted that, when the maximum PAPR value of the EHTS corresponding to the parameter set values of the sequence number 2 is obtained by using the channel puncturing pattern 8 or by using the RU allocation manner of RU996, a PAPR value of an EHTS corresponding to the parameter set value is 9.3189 dB. PAPR minimization when puncturing is performed and a multi-RU allocation manner is used is considered in design of an EHTS sequence of the sequence number 2.

In another example, parameter set values corresponding to a sequence number 3 may be used for both a punctured channel and a non-punctured channel, to obtain a minimum value in maximum PAPR values corresponding to puncturing and non-puncturing patterns in all possible parameter sets. A maximum PAPR value of EHTS sequences of the sequence number 3 is obtained by using the channel puncturing pattern 8 or by using the RU allocation manner of RU996, and the PAPR of the EHTS sequence is 9.3189 dB.

TABLE 6-2

| Sequence number | $a_1$ | $a_2$ | $a_3$ | $a_4$ | $a_5$ | $a_6$ | $c_1$ | $c_2$ | $c_3$ | $c_4$ | $c_5$ | $c_6$ | $c_7$ | $c_8$ | $c_9$ | $c_{10}$ | $c_{11}$ | $c_{12}$ | PAPR [dB] |
|---|---|---|---|---|---|---|---|---|---|---|---|---|---|---|---|---|---|---|---|
| 1 | 1 | 1 | 1 | 1 | 1 | -1 | 1 | -1 | 1 | -1 | 1 | -1 | -1 | 1 | 1 | -1 | -1 | 1 | 8.3706 |
| 2 | 1 | 1 | -1 | -1 | 1 | 1 | 1 | 1 | -1 | -1 | -1 | 1 | -1 | 1 | 1 | -1 | 1 | -1 | 9.3189 |
| 3 | 1 | 1 | -1 | -1 | 1 | 1 | 1 | 1 | -1 | -1 | -1 | 1 | -1 | 1 | 1 | -1 | 1 | -1 | 9.3189 |

When IFFTsize is set to 4096, with reference to Table 6-3, parameter set values of EHTS−1528:8:1528 are obtained. In an example, a PAPR value of an EHTS corresponding to parameter set values of a sequence number 1 is a minimum value in corresponding maximum PAPR values in all possible parameter sets. It should be noted that, when the maximum PAPR value of the EHTS corresponding to the parameter set values of the sequence number 1 is obtained by using the RU allocation manner of RU484+RU996, a PAPR value of an EHTS corresponding to the parameter set value is 9.3160 dB. PAPR minimization when puncturing is not performed and a multi-RU allocation manner is used is considered in design of an EHTS sequence of the sequence number 1.

In another example, if a channel is punctured, for example, in the foregoing channel puncturing patterns (pattern 2 to pattern 10) corresponding to 240 MHz and in another channel puncturing pattern that is not listed, a maximum PAPR value of an EHTS in puncturing patterns corresponding to parameter set values of a sequence number 2 is a minimum value in maximum PAPR values corresponding to the puncturing patterns in all possible parameter sets. It should be noted that, when the maximum PAPR value of the EHTS corresponding to the parameter set values of the sequence number 2 is obtained by using the RU allocation manner of RU242+RU484, a PAPR value of an EHTS corresponding to the parameter set value is 9.3160 dB. PAPR minimization when puncturing is performed and a multi-RU allocation manner is used is considered in design of an EHTS sequence of the sequence number 2.

In another example, parameter set values corresponding to a sequence number 3 may be used for both a punctured channel and a non-punctured channel, to obtain a minimum value in maximum PAPR values corresponding to puncturing and non-puncturing patterns in all possible parameter sets. A maximum PAPR value of EHTS sequences of the sequence number 3 is obtained by using the RU allocation manner of RU242+RU484, and the PAPR of the EHTS sequence is 9.3160 dB.

TABLE 6-3

| Sequence number | $a_1$ | $a_2$ | $a_3$ | $a_4$ | $a_5$ | $a_6$ | $c_1$ | $c_2$ | $c_3$ | $c_4$ | $c_5$ | $c_6$ | $c_7$ | $c_8$ | $c_9$ | $c_{10}$ | $c_{11}$ | $c_{12}$ | PAPR [dB] |
|---|---|---|---|---|---|---|---|---|---|---|---|---|---|---|---|---|---|---|---|
| 1 | 1 | 1 | 1 | 1 | 1 | 1 | 1 | 1 | -1 | -1 | 1 | -1 | 1 | -1 | 1 | 1 | -1 | -1 | 9.3160 |
| 2 | 1 | 1 | 1 | 1 | 1 | -1 | 1 | 1 | 1 | -1 | 1 | -1 | -1 | 1 | -1 | 1 | 1 | 1 | 9.3160 |
| 3 | 1 | 1 | 1 | 1 | 1 | -1 | 1 | 1 | 1 | -1 | 1 | -1 | -1 | 1 | -1 | 1 | 1 | 1 | 9.3160 |

When IFFTsize is set to 4096, with reference to Table 6-4, parameter set values of EHTS−1528:8:1528 are obtained. In an example, a PAPR value of an EHTS corresponding to parameter set values of a sequence number 1 is a minimum value in corresponding maximum PAPR values in all possible parameter sets. It should be noted that, when the maximum PAPR value of the EHTS corresponding to the parameter set values of the sequence number 1 is obtained by using the RU allocation manner of RU996, a PAPR value of an EHTS corresponding to the parameter set value is 8.3639 dB. PAPR minimization when puncturing is not performed and a multi-RU allocation manner is used is considered in design of an EHTS sequence of the sequence number 1.

In another example, if a channel is punctured, for example, in the foregoing channel puncturing patterns (pattern 2 to pattern 10) corresponding to 240 MHz and in another channel puncturing pattern that is not listed, a maximum PAPR value of an EHTS in puncturing patterns corresponding to parameter set values of a sequence number 2 is a minimum value in maximum PAPR values corresponding to the puncturing patterns in all possible parameter sets. It should be noted that, when the maximum PAPR value of the EHTS corresponding to the parameter set values of the sequence number 2 is obtained by using the puncturing pattern 8 or by using the RU allocation manner of RU996, a PAPR value of an EHTS corresponding to the parameter set value is 9.3504 dB. PAPR minimization when puncturing is performed and a multi-RU allocation manner is used is considered in design of an EHTS sequence of the sequence number 2.

In another example, parameter set values corresponding to a sequence number 3 may be used for both a punctured channel and a non-punctured channel, to obtain a minimum value in maximum PAPR values corresponding to puncturing and non-puncturing patterns in all possible parameter sets. A maximum PAPR value of EHTS sequences of the sequence number 3 is obtained by using the puncturing pattern 8 or by using the RU allocation manner of RU996, and the PAPR of the EHTS sequence is 9.3504 dB.

Inverse Fourier transform and 4-fold oversampling are performed on different EHTS−1528:8:1528 sequences determined by using the value of cj, to obtain a time domain discrete value X for each group of sequences, and then a PAPR is calculated according to the formula. After exhaustive retrieval, all possible EHTS−1528:8:1528 sequence values and corresponding PAPRs may be obtained, and a sequence with a smaller PAPR is selected from the possible EHTS−1528:8:1528 sequence values.

When IFFTsize is set to 3072, with reference to Table 7-1, parameter set values of EHTS−1528:8:1528 are obtained. In an example, a PAPR value of an EHTS corresponding to parameter set values of a sequence number 1 is a minimum value in corresponding maximum PAPR values in all possible parameter sets. In other words, when the sequence number 1 is used, an obtained PAPR value is less than a corresponding PAPR value in another parameter set. When puncturing is not performed and a multi-RU allocation manner is used, the PAPR value of the EHTS corresponding to the parameter set values of the sequence number 1 is 9.0692 dB.

In another example, if a channel is punctured, for example, in the foregoing channel puncturing patterns (pattern 2 to pattern 10) corresponding to 240 MHz and in another channel puncturing pattern that is not listed, a maximum PAPR value of an EHTS in puncturing patterns corresponding to parameter set values of a sequence number 2 is a minimum value in maximum PAPR values corresponding to the puncturing patterns in all possible parameter sets. It should be noted that, when the maximum PAPR value of the EHTS corresponding to the parameter set values of the sequence number 2 is obtained by using the RU allocation manner of RU242+RU484+RU996, a PAPR value of an EHTS corresponding to the parameter set value is 9.0692 dB. PAPR minimization when puncturing is performed and a multi-RU allocation manner is used is considered in design of an EHTS sequence of the sequence number 2.

TABLE 6-4

| Sequence number | $a_1$ | $a_2$ | $a_3$ | $a_4$ | $a_5$ | $a_6$ | $c_1$ | $c_2$ | $c_3$ | $c_4$ | $c_5$ | $c_6$ | $c_7$ | $c_8$ | $c_9$ | $c_{10}$ | $c_{11}$ | $c_{12}$ | PAPR [dB] |
|---|---|---|---|---|---|---|---|---|---|---|---|---|---|---|---|---|---|---|---|
| 1 | 1 | 1 | −1 | −1 | 1 | −1 | 1 | −1 | −1 | 1 | −1 | 1 | −1 | 1 | 1 | −1 | −1 | 1 | 8.3639 |
| 2 | 1 | 1 | −1 | −1 | 1 | 1 | 1 | 1 | −1 | −1 | −1 | 1 | −1 | 1 | 1 | −1 | 1 | −1 | 9.3504 |
| 3 | 1 | 1 | −1 | −1 | 1 | 1 | 1 | 1 | −1 | −1 | −1 | 1 | −1 | 1 | 1 | −1 | 1 | −1 | 9.3504 |

2. The 80 MHz Sequence in the IEEE 802.11ax is Used for Constructing STF2×240 MHz.

In this embodiment of this application, a frequency domain sequence in an HE-STF whose bandwidth is 80 MHz and period length is 1.6 μs in the IEEE 802.11ax is denoted as STF2×80 MHz. A design formula is as follows:

STF2×240 MHz=[STF2×80 MHz,0,$c_1$·STF2×80 MHz,0,$c_2$·STF2×80 MHz]

For example, STF2×80 MHz=HES$_{-504:8:504}$={M,−1,M,−1,−M,−1,M,0,−M,1,M,1,−M,1,−M}·(1+j)/$\sqrt{2}$ is denoted, and STF2×240 MHz may also be represented as:

EHTS$_{-1528:8:1528}$={HES$_{-504:8:504}$,0,$c_1$·HES$_{-504:8:504}$, 0,$c_2$·HES$_{-504:8:504}$}, where STF2×240 MHz$_{-1528}$=STF2×240 MHz$_{-520}$=STF2×240 MHz$_{-504}$=STF2×240 MHz$_{504}$=STF2×240 MHz$_{520}$=STF2×240 MHz$_{1528}$=0, a value of $c_j$ is {−1,1}, and j=1 or 2.

In another example, parameter set values corresponding to a sequence number 3 may be used for both a punctured channel and a non-punctured channel, to obtain a minimum value in maximum PAPR values corresponding to puncturing and non-puncturing patterns in all possible parameter sets. A maximum PAPR value of EHTS sequences of the sequence number 3 is obtained by using the RU allocation manner of RU242+RU484+RU996, and the PAPR of the EHTS sequence is 9.0692 dB.

TABLE 7-1

| Sequence number | $c_1$ | $c_2$ | PAPR [dB] |
|---|---|---|---|
| 1 | 1 | −1 | 9.0692 |
| 2 | 1 | −1 | 9.0692 |
| 3 | 1 | −1 | 9.0692 |

When IFFTsize is set to 3072, with reference to Table 7-2, parameter set values of EHTS−1528:8:1528 are obtained. In an example, a PAPR value of an EHTS corresponding to parameter set values of a sequence number 1 is a minimum value in corresponding maximum PAPR values in all possible parameter sets. In other words, when the sequence number 1 is used, an obtained PAPR value is less than a corresponding PAPR value in another parameter set. When puncturing is not performed and a multi-RU allocation manner is used, the PAPR value of the EHTS corresponding to the parameter set values of the sequence number 1 is 7.7842 dB.

In another example, if a channel is punctured, for example, in the foregoing channel puncturing patterns (pattern 2 to pattern 10) corresponding to 240 MHz and in another channel puncturing pattern that is not listed, a maximum PAPR value of an EHTS in puncturing patterns corresponding to parameter set values of a sequence number 2 is a minimum value in maximum PAPR values corresponding to the puncturing patterns in all possible parameter sets. It should be noted that, when the maximum PAPR value of the EHTS corresponding to the parameter set values of the sequence number 2 is obtained by using the channel puncturing pattern 4, a PAPR value of an EHTS corresponding to the parameter set value is 9.0245 dB. PAPR minimization when puncturing is performed and a multi-RU allocation manner is used is considered in design of an EHTS sequence of the sequence number 2.

In another example, parameter set values corresponding to a sequence number 3 may be used for both a punctured channel and a non-punctured channel, to obtain a minimum value in maximum PAPR values corresponding to puncturing and non-puncturing patterns in all possible parameter sets. A maximum PAPR value of EHTS sequences of the sequence number 3 is obtained by using the channel puncturing pattern 4, and the PAPR of the EHTS sequence is 9.0245 dB.

TABLE 7-2

| Sequence number | $c_1$ | $c_2$ | PAPR [dB] |
|---|---|---|---|
| 1 | 1 | −1 | 7.7842 |
| 2 | 1 | −1 | 9.0245 |
| 3 | 1 | −1 | 9.0245 |

When IFFTsize is set to 4096, with reference to Table 7-3, parameter set values of $EHTS_{-1528:8:1528}$ are obtained. In an example, a PAPR value of an EHTS corresponding to parameter set values of a sequence number 1 is a minimum value in corresponding maximum PAPR values in all possible parameter sets. In other words, when the sequence number 1 is used, an obtained PAPR value is less than a corresponding PAPR value in another parameter set. When puncturing is not performed and a multi-RU allocation manner is used, the PAPR value of the EHTS corresponding to the parameter set values of the sequence number 1 is 9.0692 dB.

In another example, if a channel is punctured, for example, in the foregoing channel puncturing patterns (pattern 2 to pattern 10) corresponding to 240 MHz and in another channel puncturing pattern that is not listed, a maximum PAPR value of an EHTS in puncturing patterns corresponding to parameter set values of a sequence number 2 is a minimum value in maximum PAPR values corresponding to the puncturing patterns in all possible parameter sets. It should be noted that, when the maximum PAPR value of the EHTS corresponding to the parameter set values of the sequence number 2 is obtained by using the RU allocation manner of RU242+RU484+RU996, a PAPR value of an EHTS corresponding to the parameter set value is 9.0692 dB. PAPR minimization when puncturing is performed and a multi-RU allocation manner is used is considered in design of an EHTS sequence of the sequence number 2.

In another example, parameter set values corresponding to a sequence number 3 may be used for both a punctured channel and a non-punctured channel, to obtain a minimum value in maximum PAPR values corresponding to puncturing and non-puncturing patterns in all possible parameter sets. A maximum PAPR value of EHTS sequences of the sequence number 3 is obtained by using the RU allocation manner of RU242+RU484+RU996, and the PAPR of the EHTS sequence is 9.0692 dB.

TABLE 7-3

| Sequence number | $c_1$ | $c_2$ | PAPR [dB] |
|---|---|---|---|
| 1 | 1 | −1 | 9.0692 |
| 2 | 1 | −1 | 9.0692 |
| 3 | 1 | −1 | 9.0692 |

When IFFTsize is set to 4096, with reference to Table 7-4, parameter set values of EHTS−1528:8:1528 are obtained. In an example, a PAPR value of an EHTS corresponding to parameter set values of a sequence number 1 is a minimum value in corresponding maximum PAPR values in all possible parameter sets. In other words, when the sequence number 1 is used, an obtained PAPR value is less than a corresponding PAPR value in another parameter set. When puncturing is not performed and a multi-RU allocation manner is used, the PAPR value of the EHTS corresponding to the parameter set values of the sequence number 1 is 7.7842 dB.

In another example, if a channel is punctured, for example, in the foregoing channel puncturing patterns (pattern 2 to pattern 10) corresponding to 240 MHz and in another channel puncturing pattern that is not listed, a maximum PAPR value of an EHTS in puncturing patterns corresponding to parameter set values of a sequence number 2 is a minimum value in maximum PAPR values corresponding to the puncturing patterns in all possible parameter sets. It should be noted that, when the maximum PAPR value of the EHTS corresponding to the parameter set values of the sequence number 2 is obtained by using the channel puncturing pattern 5, a PAPR value of an EHTS corresponding to the parameter set value is 9.0245 dB. PAPR minimization when puncturing is performed and a multi-RU allocation manner is used is considered in design of an EHTS sequence of the sequence number 2.

In another example, parameter set values corresponding to a sequence number 3 may be used for both a punctured channel and a non-punctured channel, to obtain a minimum value in maximum PAPR values corresponding to puncturing and non-puncturing patterns in all possible parameter sets. A maximum PAPR value of EHTS sequences of the sequence number 3 is obtained by using the channel puncturing pattern 5, and the PAPR of the EHTS sequence is 9.0245 dB.

TABLE 7-4

| Sequence number | $c_1$ | $c_2$ | PAPR [dB] |
|---|---|---|---|
| 1 | 1 | −1 | 7.7842 |
| 2 | −1 | −1 | 9.0245 |
| 3 | −1 | −1 | 9.0245 |

3. The 160 MHz Sequence and the 80 MHz Sequence in the IEEE 802.11ax are Used for Constructing STF2×240 MHz.

In this embodiment of this application, a frequency domain sequence in an HE-STF whose bandwidth is 160 MHz and period length is 1.6 µs in the IEEE 802.11ax is denoted as STF2×160 MHz, and the frequency domain sequence in the HE-STF whose bandwidth is 80 MHz and period length is 1.6 µs in the IEEE 802.11ax is denoted as STF2×80 MHz.

In a possible implementation, a design formula is as follows:

STF2×240 MHz=[STF2×160 MHz,0,$c_1$·STF2×80 MHz].

For example, STF2×160 MHz=$HES_{-1016:8:1016}$={M,−1,M,−M,−1,M,0,−M,1,M,1,−M,1,−M,0,−M,1,−M,1,M,1,−M,0,−M,1,M,1,−M,1,−M}·(1+j)/√2 is denoted, STF2×80 MHz=$HES_{-504:8:504}$={M,−1,M,−1,−M,−1,M,0,−M,1,M,1,−M,1,−M}·(1+j)/√2 is denoted, and STF2×240 MHz may also be represented as:

$EHTS_{-1528:8:1528}$={$HES_{-1016:8:1016}$,0,$c_1$·$HES_{-504:8:504}$}, and

STF2×240 $MHz_{-1528}$=STF2×240 $MHz_{-520}$=STF2×240 $MHz_{-504}$=STF2×240 $MHz_{504}$=STF2×240 $MHz_{520}$=STF2×240 $MHz_{1528}$=0, where a value of $c_j$ is {−1,1}, and j=1.

Inverse Fourier transform and 5-fold oversampling are performed on different EHTS−1528:8:1528 sequences determined by using the value of ai and the value of cj, to obtain a time domain discrete value X for each group of sequences, and then a PAPR is calculated according to the formula. After exhaustive retrieval, all possible EHTS−1528:8:1528 sequence values and corresponding PAPRs may be obtained, and a sequence with a smaller PAPR is selected from the possible EHTS−1528:8:1528 sequence values.

When IFFTsize is set to 3072, with reference to Table 8-1, parameter set values of $EHTS_{-1528:8:1528}$ are obtained. In an example, a PAPR value of an EHTS corresponding to parameter set values of a sequence number 1 is a minimum value in corresponding maximum PAPR values in all possible parameter sets. In other words, when the sequence number 1 is used, an obtained PAPR value is less than a corresponding PAPR value in another parameter set. When puncturing is not performed and a multi-RU allocation manner is used, the PAPR value of the EHTS corresponding to the parameter set values of the sequence number 1 is 9.1317 dB.

In another example, if a channel is punctured, for example, in the foregoing channel puncturing patterns (pattern 2 to pattern 10) corresponding to 240 MHz and in another channel puncturing pattern that is not listed, a maximum PAPR value of an EHTS in puncturing patterns corresponding to parameter set values of a sequence number 2 is a minimum value in maximum PAPR values corresponding to the puncturing patterns in all possible parameter sets. It should be noted that, when the maximum PAPR value of the EHTS corresponding to the parameter set values of the sequence number 2 is obtained by using the RU allocation manner of RU484+RU996, a PAPR value of an EHTS corresponding to the parameter set value is 9.1317 dB. PAPR minimization when puncturing is performed and a multi-RU allocation manner is used is considered in design of an EHTS sequence of the sequence number 2.

In another example, parameter set values corresponding to a sequence number 3 may be used for both a punctured channel and a non-punctured channel, to obtain a minimum value in maximum PAPR values corresponding to puncturing and non-puncturing patterns in all possible parameter sets. A maximum PAPR value of EHTS sequences of the sequence number 3 is obtained by using the RU allocation manner of RU484+RU996, and the PAPR of the EHTS sequence is 9.1317 dB.

TABLE 8-1

| Sequence number | $c_1$ | PAPR [dB] |
|---|---|---|
| 1 | 1 | 9.1317 |
| 2 | −1 | 9.1317 |
| 3 | −1 | 9.1317 |

When IFFTsize is set to 3072, with reference to Table 8-2, parameter set values of EHTS−1528:8:1528 are obtained. In an example, a PAPR value of an EHTS corresponding to parameter set values of a sequence number 1 is a minimum value in corresponding maximum PAPR values in all possible parameter sets. In other words, when the sequence number 1 is used, an obtained PAPR value is less than a corresponding PAPR value in another parameter set. When puncturing is not performed and a multi-RU allocation manner is used, the PAPR value of the EHTS corresponding to the parameter set values of the sequence number 1 is 7.5136 dB.

In another example, if a channel is punctured, for example, in the foregoing channel puncturing patterns (pattern 2 to pattern 10) corresponding to 240 MHz and in another channel puncturing pattern that is not listed, a maximum PAPR value of an EHTS in puncturing patterns corresponding to parameter set values of a sequence number 2 is a minimum value in maximum PAPR values corresponding to the puncturing patterns in all possible parameter sets. It should be noted that, when the maximum PAPR value of the EHTS corresponding to the parameter set values of the sequence number 2 is obtained by using the channel puncturing pattern 5, a PAPR value of an EHTS corresponding to the parameter set value is 9.0245 dB. PAPR minimization when puncturing is performed and a multi-RU allocation manner is used is considered in design of an EHTS sequence of the sequence number 2.

In another example, parameter set values corresponding to a sequence number 3 may be used for both a punctured channel and a non-punctured channel, to obtain a minimum value in maximum PAPR values corresponding to puncturing and non-puncturing patterns in all possible parameter sets. A maximum PAPR value of EHTS sequences of the sequence number 3 is obtained by using the channel puncturing pattern 5, and the PAPR of the EHTS sequence is 9.0245 dB.

TABLE 8-2

| Sequence number | $c_1$ | PAPR [dB] |
|---|---|---|
| 1 | 1 | 7.5136 |
| 2 | −1 | 9.0245 |
| 3 | −1 | 9.0245 |

When IFFTsize is set to 4096, with reference to Table 8-3, parameter set values of $EHTS_{-1528:8:1528}$ are obtained. In an example, a PAPR value of an EHTS corresponding to parameter set values of a sequence number 1 is a minimum value in corresponding maximum PAPR values in all possible parameter sets. In other words, when the sequence number 1 is used, an obtained PAPR value is less than a corresponding PAPR value in another parameter set. When puncturing is not performed and a multi-RU allocation manner is used, the PAPR value of the EHTS corresponding to the parameter set values of the sequence number 1 is 9.1317 dB.

In another example, if a channel is punctured, for example, in the foregoing channel puncturing patterns (pattern 2 to pattern 10) corresponding to 240 MHz and in another channel puncturing pattern that is not listed, a maximum PAPR value of an EHTS in puncturing patterns corresponding to parameter set values of a sequence number 2 is a minimum value in maximum PAPR values corresponding to the puncturing patterns in all possible parameter sets. It should be noted that, when the maximum PAPR value of the EHTS corresponding to the parameter set values of the sequence number 2 is obtained by using the RU allocation manner of RU484+RU996, a PAPR value of an EHTS corresponding to the parameter set value is 9.1317 dB. PAPR minimization when puncturing is performed and a multi-RU allocation manner is used is considered in design of an EHTS sequence of the sequence number 2.

In another example, parameter set values corresponding to a sequence number 3 may be used for both a punctured channel and a non-punctured channel, to obtain a minimum value in maximum PAPR values corresponding to puncturing and non-puncturing patterns in all possible parameter sets. A maximum PAPR value of EHTS sequences of the sequence number 3 is obtained by using the RU allocation manner of RU484+RU996, and the PAPR of the EHTS sequence is 9.1317 dB.

TABLE 8-3

| Sequence number | $c_1$ | PAPR [dB] |
|---|---|---|
| 1 | 1 | 9.1317 |
| 2 | −1 | 9.1317 |
| 3 | −1 | 9.1317 |

When IFFTsize is set to 4096, with reference to Table 8-4, parameter set values of EHTS−1528:8:1528 are obtained. In an example, a PAPR value of an EHTS corresponding to parameter set values of a sequence number 1 is a minimum value in corresponding maximum PAPR values in all possible parameter sets. In other words, when the sequence number 1 is used, an obtained PAPR value is less than a corresponding PAPR value in another parameter set. When puncturing is not performed and a multi-RU allocation manner is used, the PAPR value of the EHTS corresponding to the parameter set values of the sequence number 1 is 7.5136 dB.

In another example, if a channel is punctured, for example, in the foregoing channel puncturing patterns (pattern 2 to pattern 10) corresponding to 240 MHz and in another channel puncturing pattern that is not listed, a maximum PAPR value of an EHTS in puncturing patterns corresponding to parameter set values of a sequence number 2 is a minimum value in maximum PAPR values corresponding to the puncturing patterns in all possible parameter sets. It should be noted that, when the maximum PAPR value of the EHTS corresponding to the parameter set values of the sequence number 2 is obtained by using the channel puncturing pattern 5, a PAPR value of an EHTS corresponding to the parameter set value is 9.0245 dB. PAPR minimization when puncturing is performed and a multi-RU allocation manner is used is considered in design of an EHTS sequence of the sequence number 2.

In another example, parameter set values corresponding to a sequence number 3 may be used for both a punctured channel and a non-punctured channel, to obtain a minimum value in maximum PAPR values corresponding to puncturing and non-puncturing patterns in all possible parameter sets. A maximum PAPR value of EHTS sequences of the sequence number 3 is obtained by using the channel puncturing pattern 5, and the PAPR of the EHTS sequence is 9.0245 dB.

TABLE 8-4

| Sequence number | $c_1$ | PAPR [dB] |
|---|---|---|
| 1 | 1 | 7.5136 |
| 2 | −1 | 9.0245 |
| 3 | −1 | 9.0245 |

In another possible implementation, the 80 MHz sequence may be further constructed by using the 20 MHz sequence, and a design formula is as follows:

STF2×240 MHz=[STF2×160 MHz,0,STF2×80 MHz_1], where

STF1×80 MHz_1=[$c_1$·STF2×20 MHz,$a_1$,$c_2$·STF2×20 MHz,0,$c_3$·STF2×20 MHz,$a_2$,$c_4$·STF2×20 MHz], and STF2×240 MHz$_{-1528}$=STF2×240 MHz$_{-520}$=STF2×240 MHz$_{-504}$=STF2×240 MHz$_{504}$=STF2×240 MHz$_{520}$=STF2×240 MHz$_{1528}$=0.

For example, based on the foregoing formula, STF2×240 MHz may be represented as:

STF2×240 MHz=[STF2×160 MHz,0,$c_1$·STF2×20 MHz,$a_1$,$c_2$·STF2×20 MHz,0,$c_3$·STF2×20 MHz, $a_2$,$c_4$·STF2×20 MHz].

For example, STF2×160 MHz=$HES_{-1016:8:1016}$={M,−1, M,−M,−1,M,0,−M,1,M,1,−M,1,−M,0,−M,1,−M,1,M,1,−M, 0,−M,1,M,1,−M,1,−M}·(1+j)/√2 is denoted, STF1×20 MHz=$HES_{-120:8:120}$={M,0,−M}·(1+j)/√2 is denoted, and STF2×240 MHz may also be represented as:

$EHTS_{-1528:8:1528}$={$HES_{-1016:8:1016}$,0,$c_1$· $HES_{-120:8:120}$,$a_1$,$c_2$·$HES_{-120:8:120}$,0,$c_3$· $HES_{-120:8:120}$,$a_2$,$c_4$·$HES_{-120:8:120}$}, and STF2×240 MHz$_{-1528}$=STF2×240 MHz$_{-520}$=STF2×240 MHz$_{-504}$=STF2×240 MHz$_{504}$=STF2×240 MHz$_{520}$=STF2×240 MHz$_{1528}$=0, where a value of $a_i$ is {−1,1}, i=1 or 2, a value of $c_j$ is {−1,1}, and j=1, 2, 3, or 4.

Inverse Fourier transform and 5-fold oversampling are performed on different EHTS−1528:8:1528 sequences determined by using the value of ai and the value of cj, to obtain a time domain discrete value X for each group of sequences, and then a PAPR is calculated according to the formula. After exhaustive retrieval, all possible EHTS−1528:8:1528 sequence values and corresponding PAPRs may be obtained, and a sequence with a smaller PAPR is selected from the possible EHTS−1528:8:1528 sequence values.

When IFFTsize is set to 3072, with reference to Table 9-1, parameter set values of $EHTS_{-1528:8:1528}$ are obtained. In an example, a PAPR value of an EHTS corresponding to parameter set values of a sequence number 1 is a minimum value in corresponding maximum PAPR values in all possible parameter sets. It should be noted that, when the maximum PAPR value of the EHTS corresponding to the parameter set values of the sequence number 1 is obtained by using the RU allocation manner of RU484+RU996, a PAPR value of an EHTS corresponding to the parameter set value is 9.3230 dB. PAPR minimization when puncturing is not performed and a multi-RU allocation manner is used is considered in design of an EHTS sequence of the sequence number 1.

In another example, if a channel is punctured, for example, in the foregoing channel puncturing patterns (pattern 2 to pattern 10) corresponding to 240 MHz and in another channel puncturing pattern that is not listed, a maximum PAPR value of an EHTS in puncturing patterns corresponding to parameter set values of a sequence number 2 is a minimum value in maximum PAPR values corresponding to the puncturing patterns in all possible parameter sets. It should be noted that, when the maximum PAPR value of the EHTS corresponding to the parameter set values of the sequence number 2 is obtained by using the RU allocation manner of RU242+RU484, a PAPR value of an EHTS corresponding to the parameter set value is 9.6402 dB. PAPR minimization when puncturing is performed and a multi-RU allocation manner is used is considered in design of an EHTS sequence of the sequence number 2.

In another example, parameter set values corresponding to a sequence number 3 may be used for both a punctured channel and a non-punctured channel, to obtain a minimum value in maximum PAPR values corresponding to puncturing and non-puncturing patterns in all possible parameter sets. A maximum PAPR value of EHTS sequences of the sequence number 3 is obtained by using the RU allocation manner of RU242+RU484, and the PAPR of the EHTS sequence is 9.6402 dB.

TABLE 9-1

| Sequence number | $a_1$ | $a_2$ | $c_1$ | $c_2$ | $c_3$ | $c_4$ | PAPR [dB] |
|---|---|---|---|---|---|---|---|
| 1 | −1 | 1 | 1 | −1 | 1 | 1 | 9.3230 |
| 2 | 1 | 1 | −1 | 1 | −1 | −1 | 9.6402 |
| 3 | 1 | 1 | −1 | 1 | −1 | −1 | 9.6402 |

When IFFTsize is set to 3072, with reference to Table 9-2, parameter set values of EHTS−1528:8:1528 are obtained. In an example, a PAPR value of an EHTS corresponding to parameter set values of a sequence number 1 is a minimum value in corresponding maximum PAPR values in all possible parameter sets. It should be noted that, when the maximum PAPR value of the EHTS corresponding to the parameter set values of the sequence number 1 is obtained by using the RU allocation manner of RU484+RU242, a PAPR value of an EHTS corresponding to the parameter set value is 8.2314 dB. PAPR minimization when puncturing is not performed and a multi-RU allocation manner is used is considered in design of an EHTS sequence of the sequence number 1.

In another example, if a channel is punctured, for example, in the foregoing channel puncturing patterns (pattern 2 to pattern 10) corresponding to 240 MHz and in another channel puncturing pattern that is not listed, a maximum PAPR value of an EHTS in puncturing patterns corresponding to parameter set values of a sequence number 2 is a minimum value in maximum PAPR values corresponding to the puncturing patterns in all possible parameter sets. It should be noted that, when the maximum PAPR value of the EHTS corresponding to the parameter set values of the sequence number 2 is obtained by using the channel puncturing pattern 3, a PAPR value of an EHTS corresponding to the parameter set value is 9.4043 dB. PAPR minimization when puncturing is performed and a multi-RU allocation manner is used is considered in design of an EHTS sequence of the sequence number 2.

In another example, parameter set values corresponding to a sequence number 3 may be used for both a punctured channel and a non-punctured channel, to obtain a minimum value in maximum PAPR values corresponding to puncturing and non-puncturing patterns in all possible parameter sets. A maximum PAPR value of EHTS sequences of the sequence number 3 is obtained by using the channel puncturing pattern 3, and the PAPR of the EHTS sequence is 9.4043 dB.

TABLE 9-2

| Sequence number | $a_1$ | $a_2$ | $c_1$ | $c_2$ | $c_3$ | $c_4$ | PAPR [dB] |
|---|---|---|---|---|---|---|---|
| 1 | 1 | 1 | 1 | −1 | −1 | 1 | 8.2314 |
| 2 | −1 | 1 | −1 | 1 | 1 | −1 | 9.4043 |
| 3 | −1 | 1 | −1 | 1 | 1 | −1 | 9.4043 |

When IFFTsize is set to 4096, with reference to Table 9-3, parameter set values of EHTS−1528:8:1528 are obtained. In an example, a PAPR value of an EHTS corresponding to parameter set values of a sequence number 1 is a minimum value in corresponding maximum PAPR values in all possible parameter sets. It should be noted that, when the maximum PAPR value of the EHTS corresponding to the parameter set values of the sequence number 1 is obtained by using the RU allocation manner of RU484+RU996, a PAPR value of an EHTS corresponding to the parameter set value is 9.3469 dB. PAPR minimization when puncturing is not performed and a multi-RU allocation manner is used is considered in design of an EHTS sequence of the sequence number 1.

In another example, if a channel is punctured, for example, in the foregoing channel puncturing patterns (pattern 2 to pattern 10) corresponding to 240 MHz and in another channel puncturing pattern that is not listed, a maximum PAPR value of an EHTS in puncturing patterns corresponding to parameter set values of a sequence number 2 is a minimum value in maximum PAPR values corresponding to the puncturing patterns in all possible parameter sets. It should be noted that, when the maximum PAPR value of the EHTS corresponding to the parameter set values of the sequence number 2 is obtained by using the RU allocation manner of RU484+RU996, a PAPR value of an EHTS corresponding to the parameter set value is 9.6481 dB. PAPR minimization when puncturing is performed and a multi-RU allocation manner is used is considered in design of an EHTS sequence of the sequence number 2.

In another example, parameter set values corresponding to a sequence number 3 may be used for both a punctured channel and a non-punctured channel, to obtain a minimum value in maximum PAPR values corresponding to puncturing and non-puncturing patterns in all possible parameter sets. A maximum PAPR value of EHTS sequences of the sequence number 3 is obtained by using the RU allocation manner of RU484+RU996, and the PAPR of the EHTS sequence is 9.6481 dB.

TABLE 9-3

| Sequence number | $a_1$ | $a_2$ | $c_1$ | $c_2$ | $c_3$ | $c_4$ | PAPR [dB] |
|---|---|---|---|---|---|---|---|
| 1 | −1 | 1 | −1 | −1 | 1 | 1 | 9.3469 |
| 2 | 1 | 1 | −1 | 1 | 1 | −1 | 9.6481 |
| 3 | 1 | 1 | −1 | 1 | 1 | −1 | 9.6481 |

When IFFTsize is set to 4096, with reference to Table 9-4, parameter set values of EHTS−1528:8:1528 are obtained. In an example, a PAPR value of an EHTS corresponding to parameter set values of a sequence number 1 is a minimum value in corresponding maximum PAPR values in all possible parameter sets. It should be noted that, when the maximum PAPR value of the EHTS corresponding to the parameter set values of the sequence number 1 is obtained by using the RU allocation manner of RU484+RU242, a PAPR value of an EHTS corresponding to the parameter set value is 8.2314 dB. PAPR minimization when puncturing is not performed and a multi-RU allocation manner is used is considered in design of an EHTS sequence of the sequence number 1.

In another example, if a channel is punctured, for example, in the foregoing channel puncturing patterns (pattern 2 to pattern 10) corresponding to 240 MHz and in another channel puncturing pattern that is not listed, a maximum PAPR value of an EHTS in puncturing patterns corresponding to parameter set values of a sequence number 2 is a minimum value in maximum PAPR values corresponding to the puncturing patterns in all possible parameter sets. It should be noted that, when the maximum PAPR value of the EHTS corresponding to the parameter set values of the sequence number 2 is obtained by using the channel puncturing pattern 3, a PAPR value of an EHTS corresponding to the parameter set value is 9.3153 dB. PAPR minimization when puncturing is performed and a multi-RU allocation manner is used is considered in design of an EHTS sequence of the sequence number 2.

In another example, parameter set values corresponding to a sequence number 3 may be used for both a punctured channel and a non-punctured channel, to obtain a minimum value in maximum PAPR values corresponding to puncturing and non-puncturing patterns in all possible parameter sets. A maximum PAPR value of EHTS sequences of the sequence number 3 is obtained by using the channel puncturing pattern 3, and the PAPR of the EHTS sequence is 9.3153 dB.

TABLE 9-4

| Sequence number | $a_1$ | $a_2$ | $c_1$ | $c_2$ | $c_3$ | $c_4$ | PAPR [dB] |
|---|---|---|---|---|---|---|---|
| 1 | 1 | 1 | 1 | −1 | −1 | 1 | 8.2314 |
| 2 | −1 | 1 | −1 | 1 | 1 | −1 | 9.3153 |
| 3 | −1 | 1 | −1 | 1 | 1 | −1 | 9.3153 |

In another possible implementation, the 80 MHz sequence may further be constructed by using the 40 MHz sequence. In this embodiment of this application, a frequency domain sequence in an HE-STF whose bandwidth is 40 MHz and period length is 1.6 μs in the IEEE 802.11ax is denoted as STF2×40 MHz. A design formula is as follows:

STF2×240 MHz=[STF2×160 MHz,0,STF2×80 MHz_1], where

STF2×80 MHz_1=[$c_1$·STF2×40 MHz,0,$c_2$·STF2×40 MHz].

For example, based on the foregoing formula, STF2×240 MHz may be represented as:

TF2×240 MHz=[STF2×160 MHz,0,$c_1$·STF2×40 MHz,0,$c_2$·STF2×40 MHz].

For example, STF2×160 MHz=HES$_{−1016:8:1016}$={M,−1, M,−M,−1,M,0,−M,1,M,1,−M,1,−M,0,−M,1,−M,1,M,1,−M, 0,−M,1,M,1,−M,1,−M}·(1+j)/√2 is denoted, STF1×40 MHz=HES$_{−248:8:248}$={M,−1,−M,0,M,−1,M}·(1+j)/√2 is denoted, and STF2×240 MHz may also be represented as:

EHTS$_{−1528:8:1528}$={HES$_{−1016:8:1016}$,0,$c_1$·HES$_{−248:8:248}$,0,$c_2$·HES$_{−248:8:248}$}, and STF2×240 MHz$_{−1528}$=STF2×240 MHz$_{−520}$=STF2×240 MHz$_{−504}$=STF2×240 MHz$_{504}$=STF2×240 MHz$_{520}$=STF2×240 MHz$_{1528}$=0, where a value of $c_j$ is {−1,1}, and j=1 or 2.

Inverse Fourier transform and 5-fold oversampling are performed on different EHTS−1528:8:1528 sequences determined by using the value of ai and the value of cj, to obtain a time domain discrete value X for each group of sequences, and then a PAPR is calculated according to the formula. After exhaustive retrieval, all possible EHTS−1528:8:1528 sequence values and corresponding PAPRs may be obtained, and a sequence with a smaller PAPR is selected from the possible EHTS−1528:8:1528 sequence values.

When IFFTsize is set to 3072, with reference to Table 10-1, parameter set values of EHTS$_{−1528:8:1528}$ are obtained. In an example, a PAPR value of an EHTS corresponding to parameter set values of a sequence number 1 is a minimum value in corresponding maximum PAPR values in all possible parameter sets. It should be noted that, when the maximum PAPR value of the EHTS corresponding to the parameter set values of the sequence number 1 is obtained by using the RU allocation manner of RU484+RU996, a PAPR value of an EHTS corresponding to the parameter set value is 9.1317 dB. PAPR minimization when puncturing is not performed and a multi-RU allocation manner is used is considered in design of an EHTS sequence of the sequence number 1.

In another example, if a channel is punctured, for example, in the foregoing channel puncturing patterns (pattern 2 to pattern 10) corresponding to 240 MHz and in another channel puncturing pattern that is not listed, a maximum PAPR value of an EHTS in puncturing patterns corresponding to parameter set values of a sequence number 2 is a minimum value in maximum PAPR values corresponding to the puncturing patterns in all possible parameter sets. It should be noted that, when the maximum PAPR value of the EHTS corresponding to the parameter set values of the sequence number 2 is obtained by using the channel puncturing pattern 2, a PAPR value of an EHTS corresponding to the parameter set value is 9.4529 dB. PAPR minimization when puncturing is performed and a multi-RU allocation manner is used is considered in design of an EHTS sequence of the sequence number 2.

In another example, parameter set values corresponding to a sequence number 3 may be used for both a punctured channel and a non-punctured channel, to obtain a minimum value in maximum PAPR values corresponding to puncturing and non-puncturing patterns in all possible parameter sets. A maximum PAPR value of EHTS sequences of the sequence number 3 is obtained by using the channel puncturing pattern 2, and the PAPR of the EHTS sequence is 9.4529 dB.

TABLE 10-1

| Sequence number | $c_1$ | $c_2$ | PAPR [dB] |
|---|---|---|---|
| 1 | −1 | 1 | 9.1317 |
| 2 | −1 | −1 | 9.4529 |
| 3 | −1 | −1 | 9.4529 |

When IFFTsize is set to 3072, with reference to Table 10-2, parameter set values of EHTS−1528:8:1528 are obtained. In an example, a PAPR value of an EHTS corresponding to parameter set values of a sequence number 1 is a minimum value in corresponding maximum PAPR values in all possible parameter sets. It should be noted that, when the maximum PAPR value of the EHTS corresponding to the parameter set values of the sequence number 1 is obtained by using the RU allocation manner of RU52+RU26, a PAPR value of an EHTS corresponding to the parameter set value is 7.3595 dB. PAPR minimization when puncturing is not performed and a multi-RU allocation manner is used is considered in design of an EHTS sequence of the sequence number 1.

In another example, if a channel is punctured, for example, in the foregoing channel puncturing patterns (pattern 2 to pattern 10) corresponding to 240 MHz and in another channel puncturing pattern that is not listed, a maximum PAPR value of an EHTS in puncturing patterns corresponding to parameter set values of a sequence number 2 is a minimum value in maximum PAPR values corresponding to the puncturing patterns in all possible parameter sets. It should be noted that, when the maximum PAPR value of the EHTS corresponding to the parameter set values of the sequence number 2 is obtained by using the channel puncturing pattern 2, a PAPR value of an EHTS corresponding to the parameter set value is 9.4529 dB. PAPR minimization when puncturing is performed and a multi-RU allocation manner is used is considered in design of an EHTS sequence of the sequence number 2.

In another example, parameter set values corresponding to a sequence number 3 may be used for both a punctured channel and a non-punctured channel, to obtain a minimum value in maximum PAPR values corresponding to puncturing and non-puncturing patterns in all possible parameter sets. A maximum PAPR value of EHTS sequences of the sequence number 3 is obtained by using the channel puncturing pattern 2, and the PAPR of the EHTS sequence is 9.4529 dB.

TABLE 10-2

| Sequence number | $c_1$ | $c_2$ | PAPR [dB] |
|---|---|---|---|
| 1 | 1 | 1 | 7.3595 |
| 2 | −1 | −1 | 9.4529 |
| 3 | −1 | −1 | 9.4529 |

When IFFTsize is set to 4096, with reference to Table 10-3, parameter set values of EHTS−1528:8:1528 are obtained. In an example, a PAPR value of an EHTS corresponding to parameter set values of a sequence number 1 is a minimum value in corresponding maximum PAPR values in all possible parameter sets. It should be noted that, when the maximum PAPR value of the EHTS corresponding to the parameter set values of the sequence number 1 is obtained by using the RU allocation manner of RU484+RU996, a PAPR value of an EHTS corresponding to the parameter set value is 9.1317 dB. PAPR minimization when puncturing is not performed and a multi-RU allocation manner is used is considered in design of an EHTS sequence of the sequence number 1.

In another example, if a channel is punctured, for example, in the foregoing channel puncturing patterns (pattern 2 to pattern 10) corresponding to 240 MHz and in another channel puncturing pattern that is not listed, a maximum PAPR value of an EHTS in puncturing patterns corresponding to parameter set values of a sequence number 2 is a minimum value in maximum PAPR values corresponding to the puncturing patterns in all possible parameter sets. It should be noted that, when the maximum PAPR value of the EHTS corresponding to the parameter set values of the sequence number 2 is obtained by using the channel puncturing pattern 2, a PAPR value of an EHTS corresponding to the parameter set value is 9.4529 dB. PAPR minimization when puncturing is performed and a multi-RU allocation manner is used is considered in design of an EHTS sequence of the sequence number 2.

In another example, parameter set values corresponding to a sequence number 3 may be used for both a punctured channel and a non-punctured channel, to obtain a minimum value in maximum PAPR values corresponding to puncturing and non-puncturing patterns in all possible parameter sets. A maximum PAPR value of EHTS sequences of the sequence number 3 is obtained by using the channel puncturing pattern 2, and the PAPR of the EHTS sequence is 9.4529 dB.

TABLE 10-3

| Sequence number | $c_1$ | $c_2$ | PAPR [dB] |
|---|---|---|---|
| 1 | −1 | 1 | 9.1317 |
| 2 | −1 | −1 | 9.4529 |
| 3 | −1 | −1 | 9.4529 |

When IFFTsize is set to 4096, with reference to Table 10-4, parameter set values of EHTS−1528:8:1528 are obtained. In an example, a PAPR value of an EHTS corresponding to parameter set values of a sequence number 1 is a minimum value in corresponding maximum PAPR values in all possible parameter sets. It should be noted that, when the maximum PAPR value of the EHTS corresponding to the parameter set values of the sequence number 1 is obtained by using the RU allocation manner of RU52+RU26, a PAPR value of an EHTS corresponding to the parameter set value is 7.3595 dB. PAPR minimization when puncturing is not performed and a multi-RU allocation manner is used is considered in design of an EHTS sequence of the sequence number 1.

In another example, if a channel is punctured, for example, in the foregoing channel puncturing patterns (pattern 2 to pattern 10) corresponding to 240 MHz and in another channel puncturing pattern that is not listed, a maximum PAPR value of an EHTS in puncturing patterns corresponding to parameter set values of a sequence number 2 is a minimum value in maximum PAPR values corresponding to the puncturing patterns in all possible parameter sets. It should be noted that, when the maximum PAPR value of the EHTS corresponding to the parameter set values of the sequence number 2 is obtained by using the channel puncturing pattern 2, a PAPR value of an EHTS corresponding to the parameter set value is 9.4529 dB. PAPR minimization when puncturing is performed and a multi-RU allocation manner is used is considered in design of an EHTS sequence of the sequence number 2.

In another example, parameter set values corresponding to a sequence number 3 may be used for both a punctured channel and a non-punctured channel, to obtain a minimum value in maximum PAPR values corresponding to puncturing and non-puncturing patterns in all possible parameter sets. A maximum PAPR value of EHTS sequences of the sequence number 3 is obtained by using the channel puncturing pattern 2, and the PAPR of the EHTS sequence is 9.4529 dB.

TABLE 10-4

| Sequence number | $c_1$ | $c_2$ | PAPR [dB] |
|---|---|---|---|
| 1 | 1 | 1 | 7.3595 |
| 2 | −1 | −1 | 9.4529 |
| 3 | −1 | −1 | 9.4529 |

A case 3 and a case 4 are for the EHT-STF of the 320 MHz channel bandwidth. Before the EHT-STF of the 320 MHz channel bandwidth is described, a 320 MHz subcarrier allocation pattern (tone plan) is described. As described above, a tone plan of an 80 MHz channel bandwidth specified in the 802.11ax has a total of 1024 subcarriers whose subscripts range from −511 to 512. There are 12 and 11 guard subcarriers (guard tone) on left and right edges of the bandwidth respectively, and 5 direct current subcarriers in the center of the bandwidth. The tone plan of the 320 MHz channel bandwidth designed in this embodiment of this application is obtained by concatenating four 80 MHz tone plans. To be specific, left edge subcarriers and right edge subcarriers of the four 80 MHz bandwidths and direct current subcarriers in the center of each of the four 80 MHz bandwidths are reserved. In this way, the bandwidth of 320 MHz has a total of 1024×4=4096 subcarriers. There are 12 and 11 guard subcarriers on the left and right edges respectively, and 23 direct current subcarriers in the center of the bandwidth.

Case 3: The Bandwidth of the Target Channel is 320 MHz, and the Period Length of the Reference Channel is 0.8 μs.

In this embodiment of this application, a frequency domain sequence in an EHT-STF whose bandwidth is 320 MHz and period length is 0.8 μs is denoted as STF1×320 MHz. STF1×320 MHz is denoted as $EHTS_{-2032:16:2032}$, and STF1×320 MHz may be constructed in the following plurality of manners.

1. The 20 MHz Sequence in the IEEE 802.11ax is Used for Constructing STF1×320 MHz.

In this embodiment of this application, the frequency domain sequence in the HE-STF whose bandwidth is 20 MHz and period length is 0.8 μs in the IEEE 802.11ax is denoted as STF1×20 MHz. A design formula is as follows:

STF1×320 MHz=[STF1×80 MHz_1,0,STF1×80 MHz_2,0,STF1×80 MHz_3,0,STF1×80 MHz_4], where STF1×80 MHz_1=[$c_1$·STF1×20 MHz,$a_1$,$c_2$·STF1×20 MHz,0,$c_3$·STF1×20 MHz,$a_2$,$c_4$·STF1×20 MHz], STF1×80 MHz_2=[$c_5$·STF1×20 MHz,$a_3$,$c_6$·STF1×20 MHz,0,$c_7$·STF1×20 MHz,$a_4$,$c_8$·STF1×20 MHz], STF1×80 MHz_3=[$c_9$·STF1×20 MHz,$a_5$,$c_{10}$·STF1×20 MHz,0,$c_{11}$·STF1×20 MHz,$a_6$,$c_{12}$·STF1×20 MHz], and STF1×80 MHz_4=[$c_{13}$·STF1×20 M,$a_7$,$c_{14}$·STF1×20 M,0,$c_{15}$·STF1×20 M,$a_8$,$c_{16}$·STF1×20 M].

For example, based on the foregoing formula, STF1×320 MHz may be represented as:

STF1×320 MHz=[$c_1$·STF1×20 MHz,$a_1$,$c_2$·STF1×20 MHz,0,$c_3$·STF1×20 MHz,$a_2$,$c_4$·STF1×20 MHz, 0,$c_5$·STF1×20 MHz,$a_3$,$c_6$·STF1×20 MHz,0, $c_7$·STF1×20 MHz,$a_4$,$c_5$·STF1×20 MHz,0, $c_9$·STF1×20 MHz,$a_5$,$c_{10}$·STF1×20 MHz,0, $c_{11}$·STF1×20 MHz,$a_6$,$c_{12}$·STF1×20 MHz,0, $c_{13}$·STF1×20 M,$a_7$,$c_{14}$·STF1×20 M,0,$c_{15}$·STF1× 20 M,$a_8$,$c_{16}$·STF1×20 M].

For example, STF1×20 MHz=$HES_{-112:16:112}$={M}·(1+j)/$\sqrt{2}$ is denoted, and STF1×320 MHz may also be represented as:

$EHTS_{-2032:16:2032}$={$c_1$·$HES_{-112:16:112}$,$a_1$,$c_2$·
$HES_{-112:16:112}$,0,$c_3$·$HES_{-112:16:112}$,$a_2$,$c_4$·
$HES_{-112:16:112}$,0,$c_5$·$HES_{-112:16:112}$,$a_3$,$c_6$·
$HES_{-112:16:112}$,0,$c_7$·$HES_{-112:16:112}$,$a_4$,$c_8$·
$HES_{-112:16:112}$,0,$c_9$·$HES_{-112:16:112}$,$a_5$,$c_{10}$·
$HES_{-112:16:112}$,0,$c_{11}$·$HES_{-112:16:112}$,$a_6$,$c_{12}$·
$HES_{-112:16:112}$,0,$c_{13}$·$HES_{-112:16:112}$,$a_7$,$c_{14}$·
$HES_{-112:16:112}$,0,$c_{15}$·$HES_{-112:16:112}$,$a_8$,$c_{16}$·
$HES_{-112:16:112}$}, where a value of $a_i$ is {−1,1}, i=1, 2, ..., or 8, a value of $c_j$ is {−1,1}, and j=1, 2, ..., or 16.

Inverse Fourier transform and 5-fold oversampling are performed on different $EHTS_{-2032:16:2032}$ sequences determined by using the value of $a_i$ and the value of $c_j$, to obtain a time domain discrete value X for each group of sequences, and then a PAPR is calculated according to the formula. After exhaustive retrieval, all possible $EHTS_{-2032:16:2032}$ sequence values and corresponding PAPRs may be obtained, and a sequence with a smaller PAPR is selected from the possible $EHTS_{-2032:16:2032}$ sequence values.

With reference to Table 11, parameter set values of $EHTS_{-2032:16:2032}$ are obtained. In an example, a PAPR value of an EHTS corresponding to parameter set values of a sequence number 1 is a minimum value in corresponding maximum PAPR values in all possible parameter sets. In other words, when the sequence number 1 is used, an obtained PAPR value is less than a corresponding PAPR value in another parameter set. When puncturing is not performed, the PAPR value of the EHTS corresponding to the parameter set values of the sequence number 1 is 4.3449 dB.

In another example, if a channel is punctured, for example, in the foregoing channel puncturing patterns (including puncturing pattern A and puncturing pattern B for 320 MHz) corresponding to 320 MHz and in another channel puncturing pattern that is not listed, a maximum PAPR value of an EHTS in puncturing patterns corresponding to parameter set values of a sequence number 2 is a minimum value in maximum PAPR values corresponding to the puncturing patterns in all possible parameter sets. It should be noted that, when the maximum PAPR value of the EHTS corresponding to the parameter set values of the sequence number 2 is obtained by using the channel puncturing pattern 10, a PAPR value of an EHTS corresponding to the parameter set value is 6.4230 dB. PAPR minimization when puncturing is performed is considered in design of an EHTS sequence of the sequence number 2.

In another example, parameter set values corresponding to a sequence number 3 may be used for both a punctured channel and a non-punctured channel, to obtain a minimum value in maximum PAPR values corresponding to puncturing and non-puncturing patterns in all possible parameter sets. A maximum PAPR value of EHTS sequences of the sequence number 3 is obtained by using the channel puncturing pattern 10, and the PAPR of the EHTS sequence is 6.4230 dB.

In another example, if a channel is punctured, for example, in the foregoing channel puncturing patterns (including channel puncturing pattern A and channel puncturing pattern B for 320 MHz) corresponding to 320 MHz and in another channel puncturing pattern that is not listed, a maximum PAPR value of an EHTS in puncturing patterns corresponding to parameter set values of a sequence number 2 is a minimum value in maximum PAPR values corresponding to the puncturing patterns in all possible parameter sets. It should be noted that, when the maximum PAPR value of the EHTS corresponding to the parameter set values of the sequence number 2 is obtained by using the channel puncturing pattern 4 in the channel puncturing pattern A and the channel puncturing pattern B, a PAPR value of an EHTS corresponding to the parameter set value is 8.2020 dB. PAPR minimization when puncturing is performed is considered in design of an EHTS sequence of the sequence number 2.

In another example, parameter set values corresponding to a sequence number 3 may be used for both a punctured (including punctured in the channel puncturing pattern A and the channel puncturing pattern B for 320 MHz) channel and

TABLE 11

| Sequence number | $a_1$ | $a_2$ | $a_3$ | $a_4$ | $a_5$ | $a_6$ | $a_7$ | $a_8$ | $c_1$ | $c_2$ | $c_3$ | $c_4$ | $c_5$ | $c_6$ | $c_7$ | $c_8$ | $c_9$ | $c_{10}$ | $c_{11}$ | $c_{12}$ | $c_{13}$ | $c_{14}$ | $c_{15}$ | $c_{16}$ | PAPR [dB] |
|---|---|---|---|---|---|---|---|---|---|---|---|---|---|---|---|---|---|---|---|---|---|---|---|---|---|
| 1 | −1 | 1 | −1 | −1 | −1 | −1 | −1 | −1 | 1 | −1 | −1 | −1 | −1 | 1 | 1 | 1 | 1 | −1 | 1 | 1 | 1 | −1 | 1 | 1 | 4.3449 |
| 2 | 1 | 1 | 1 | 1 | 1 | 1 | 1 | −1 | 1 | 1 | −1 | −1 | −1 | −1 | −1 | 1 | −1 | −1 | 1 | −1 | −1 | 1 | 1 | 1 | 6.4230 |
| 3 |   | 1 | 1 | 1 | 1 | 1 | 1 | −1 | 1 | 1 | −1 | −1 | −1 | −1 | −1 | 1 | −1 | −1 | 1 | −1 | −1 | 1 | 1 | 1 | 6.4230 |

2. The 80 MHz Sequence in the IEEE 802.11ax is Used for Constructing STF1×320 MHz.

In this embodiment of this application, the frequency domain sequence in the HE-STF whose bandwidth is 80 MHz and period length is 0.8 µs in the IEEE 802.11ax is denoted as STF1×80 MHz. A design formula is as follows:

STF1×320 MHz=[STF1×80 MHz,0,$c_1$·STF1×80 MHz,0,$c_2$·STF1×80 MHz,0,$c_3$·STF1×80 MHz].

For example, STF1×80 M=HES$_{-496:16:496}$={M,1,−M,0,−M,1,−M}·(1+j)/√2 is denoted, and STF1×320 MHz may also be represented as:

EHTS$_{-2032:16:2032}$={HES$_{-496:16:496}$,0,$c_1$·HES$_{-496:16:496}$,0,$c_2$·HES$_{-496:16:496}$,0,$c_3$·HES$_{-496:16:496}$}, where a value of $c_j$ is {−1,1}, and j=1, 2, or 3.

Inverse Fourier transform and 5-fold oversampling are performed on different EHTS$_{-2032:16:2032}$ sequences determined by using the value of $a_i$ and the value of $c_j$, to obtain a time domain discrete value X for each group of sequences, and then a PAPR is calculated according to the formula. After exhaustive retrieval, all possible EHTS$_{-2032:16:2032}$ sequence values and corresponding PAPRs may be obtained, and a sequence with a smaller PAPR is selected from the possible EHTS$_{-2032:16:2032}$ sequence values.

With reference to Table 12, parameter set values of EHTS−2032:16:2032 are obtained. In an example, a PAPR value of an EHTS corresponding to parameter set values of a sequence number 1 is a minimum value in corresponding maximum PAPR values in all possible parameter sets. In other words, when the sequence number 1 is used, an obtained PAPR value is less than a corresponding PAPR value in another parameter set. When puncturing is not performed, the PAPR value of the EHTS corresponding to the parameter set values of the sequence number 1 is 6.0505 dB.

a non-punctured channel, to obtain a minimum value in maximum PAPR values corresponding to puncturing and non-puncturing patterns in all possible parameter sets. A maximum PAPR value of EHTS sequences of the sequence number 3 is obtained by using the channel puncturing pattern 4 in the channel puncturing pattern A and the channel puncturing pattern B, and the PAPR of the EHTS sequence is 8.2020 dB.

TABLE 12

| Sequence number | $c_1$ | $c_2$ | $c_3$ | PAPR [dB] |
|---|---|---|---|---|
| 1 | 1 | 1 | −1 | 6.0505 |
| 2 | 1 | −1 | −1 | 8.2020 |
| 3 | 1 | −1 | −1 | 8.2020 |

3. The 160 MHz Sequence in the IEEE 802.11ax is Used for Constructing STF1×320 MHz.

In this embodiment of this application, the frequency domain sequence in the HE-STF whose bandwidth is 160 MHz and period length is 0.8 µs in the IEEE 802.11ax is denoted as STF1×160 MHz.

In a possible implementation, a design formula is as follows:

STF1×320 MHz=[STF1×160 MHz,0,$c_1$·STF1×160 MHz].

For example, STF1×160 MHz=HES$_{-1008:16:1008}$={M,1,−M,0,−M,1,−M,0,−M,−1,M,0,−M,1,−M}·(1+j)/√2 is denoted, and STF1×320 MHz may also be represented as:

EHTS$_{-2032:16:2032}$={HES$_{-1008:16:1008}$,0,$c_1$·HES$_{-1008:16:1008}$}, where a value of $c_j$ is {−1,1}, and j=1.

Inverse Fourier transform and 5-fold oversampling are performed on different $\text{EHTS}_{-2032:16:2032}$ sequences determined by using the value of $a_i$ and the value of $c_j$, to obtain a time domain discrete value X for each group of sequences, and then a PAPR is calculated according to the formula. After exhaustive retrieval, all possible $\text{EHTS}_{-2032:16:2032}$ sequence values and corresponding PAPRs may be obtained, and a sequence with a smaller PAPR is selected from the possible $\text{EHTS}_{-2032:16:2032}$ sequence values.

With reference to Table 13, parameter set values of EHTS−2032:16:2032 are obtained. In an example, a PAPR value of an EHTS corresponding to parameter set values of a sequence number 1 is a minimum value in corresponding maximum PAPR values in all possible parameter sets. In other words, when the sequence number 1 is used, an obtained PAPR value is less than a corresponding PAPR value in another parameter set. When puncturing is not performed, the PAPR value of the EHTS corresponding to the parameter set values of the sequence number 1 is 7.7322 dB.

In another example, if a channel is punctured, for example, in the foregoing channel puncturing patterns (including channel puncturing pattern A and channel puncturing pattern B for 320 MHz) corresponding to 320 MHz and in another channel puncturing pattern that is not listed, a maximum PAPR value of an EHTS in puncturing patterns corresponding to parameter set values of a sequence number 2 is a minimum value in maximum PAPR values corresponding to the puncturing patterns in all possible parameter sets. It should be noted that, when the maximum PAPR value of the EHTS corresponding to the parameter set values of the sequence number 2 is obtained by using the channel puncturing pattern 8 in the channel puncturing pattern A and the channel puncturing pattern B, a PAPR value of an EHTS corresponding to the parameter set value is 8.1648 dB. PAPR minimization when puncturing is performed is considered in design of an EHTS sequence of the sequence number 2.

In another example, parameter set values corresponding to a sequence number 3 may be used for both a punctured (including punctured in the channel puncturing pattern A and the channel puncturing pattern B for 320 MHz) channel and a non-punctured channel, to obtain a minimum value in maximum PAPR values corresponding to puncturing and non-puncturing patterns in all possible parameter sets. A maximum PAPR value of EHTS sequences of the sequence number 3 is obtained by using the channel puncturing pattern 8, and the PAPR of the EHTS sequence is 8.1648 dB.

TABLE 13

| Sequence number | $c_1$ | PAPR |
|---|---|---|
| 1 | 1 | 7.7322 |
| 2 | −1 | 8.1648 |
| 3 | −1 | 8.1648 |

In a possible implementation, the 160 MHz sequence may be further constructed by using the 20 MHz sequence, and a design formula is as follows:

STF1×320 MHz=[STF1×160 MHz,0,STF1×80 MHz_1,0,STF1×80 MHz_2],

STF1×80 MHz_1=[$c_1$·STF1×20 MHz,$a_1$,$c_2$·STF1×20 MHz,0,$c_3$·STF1×20 MHz,$a_2$,$c_4$·STF1×20 MHz], and STF1×80 MHz_2=[$c_5$·STF1×20 MHz,$a_3$,$c_6$·STF1×20 MHz,0,$c_7$·STF1×20 MHz,$a_4$,$c_8$·STF1×20 MHz].

For example, based on the foregoing formula, STF1×320 MHz may be represented as:

STF1×320 MHz=[STF1×160 MHz,0,$c_1$·STF1×20 MHz,$a_1$,$c_2$·STF1×20 MHz,0,$c_3$·STF1×20 MHz, $a_2$,$c_4$·STF1×20 MHz,0,$c_5$·STF1×20 MHz,$a_3$, $c_6$·STF1×20 MHz,0,$c_7$·STF1×20 MHz,$a_4$, $c_8$·STF1×20 MHz].

For example, STF1×160 MHz=$\text{HES}_{-1008:16:1008}$={M,1,−M,0,−M,1,−M,0,−M,−1,M,0,−M,1,−M}·(1+j)/$\sqrt{2}$ is denoted, STF1×20 MHz=$\text{HES}_{-112:16:112}$={M}·(1+j)/$\sqrt{2}$ is denoted, and STF1×320 MHz may also be represented as:

$\text{EHTS}_{-2032:16:2032}$={$\text{HES}_{-1008:16:1008}$,0,$c_1$·
$\text{HES}_{-112:16:112}$,$a_1$,$c_2$·$\text{HES}_{-112:16:112}$,0,$c_3$·
$\text{HES}_{-112:16:112}$,$a_2$,$c_4$·$\text{HES}_{-112:16:112}$,0,$c_5$·
$\text{HES}_{-112:16:112}$,$a_3$,$c_6$·$\text{HES}_{-112:16:112}$,0,$c_7$·
$\text{HES}_{-112:16:112}$,$a_4$,$c_8$·$\text{HES}_{-112:16:112}$}, where a value of $a_i$ is {−1,1}, i=1, 2, 3, or 4, a value of c is {−1,1}, and j=1, 2, . . . , or 8.

Inverse Fourier transform and 5-fold oversampling are performed on different EHTS−2032:16:2032 sequences determined by using the value of ai and the value of cj, to obtain a time domain discrete value X for each group of sequences, and then a PAPR is calculated according to the formula. After exhaustive retrieval, all possible EHTS−2032:16:2032 sequence values and corresponding PAPRs may be obtained, and a sequence with a smaller PAPR is selected from the possible EHTS−2032:16:2032 sequence values.

With reference to Table 14-1, parameter set values of EHTS−2032:16:2032 are obtained. In an example, a PAPR value of an EHTS corresponding to parameter set values of a sequence number 1 is a minimum value in corresponding maximum PAPR values in all possible parameter sets. In other words, when the sequence number 1 is used, an obtained PAPR value is less than a corresponding PAPR value in another parameter set. When puncturing is not performed, the PAPR value of the EHTS corresponding to the parameter set values of the sequence number 1 is 5.0482 dB.

In another example, if a channel is punctured, for example, in the foregoing pattern A in channel puncturing patterns corresponding to 320 MHz, a maximum PAPR value of an EHTS in puncturing patterns corresponding to parameter set values of a sequence number 2 is a minimum value in maximum PAPR values corresponding to the puncturing patterns in all possible parameter sets. It should be noted that, when the maximum PAPR value of the EHTS corresponding to the parameter set values of the sequence number 2 is obtained by using the channel puncturing pattern 23 in the channel puncturing pattern A, a PAPR value of an EHTS corresponding to the parameter set value is 7.6672 dB. PAPR minimization when puncturing is performed is considered in design of an EHTS sequence of the sequence number 2.

In another example, parameter set values corresponding to a sequence number 3 may be used for both a punctured (punctured in the channel puncturing pattern A for 320 MHz) channel and a non-punctured channel, to obtain a minimum value in maximum PAPR values corresponding to puncturing and non-puncturing patterns in all possible parameter sets. A maximum PAPR value of EHTS sequences of the sequence number 3 is obtained by using the channel puncturing pattern 23 in the channel puncturing pattern A, and the PAPR of the EHTS sequence is 7.6672 dB.

TABLE 14-1

| Sequence number | $a_1$ | $a_2$ | $a_3$ | $a_4$ | $c_1$ | $c_2$ | $c_3$ | $c_4$ | $c_5$ | $c_6$ | $c_7$ | $c_8$ | PAPR [dB] |
|---|---|---|---|---|---|---|---|---|---|---|---|---|---|
| 1 | 1 | −1 | −1 | −1 | −1 | −1 | 1 | −1 | 1 | 1 | 1 | −1 | 5.0482 |
| 2 | −1 | −1 | −1 | 1 | −1 | 1 | 1 | −1 | 1 | −1 | −1 | −1 | 7.6672 |
| 3 | −1 | −1 | −1 | 1 | −1 | 1 | 1 | −1 | 1 | −1 | −1 | −1 | 7.6672 |

With reference to Table 14-2, parameter set values of $EHTS_{-2032:16:2032}$ are obtained. In an example, a PAPR value of an EHTS corresponding to parameter set values of a sequence number 1 is a minimum value in corresponding maximum PAPR values in all possible parameter sets. In other words, when the sequence number 1 is used, an obtained PAPR value is less than a corresponding PAPR value in another parameter set. When puncturing is not performed, the PAPR value of the EHTS corresponding to the parameter set values of the sequence number 1 is 5.0482 dB.

In another example, if a channel is punctured, for example, in the foregoing pattern B in channel puncturing patterns corresponding to 320 MHz, a maximum PAPR value of an EHTS in puncturing patterns corresponding to parameter set values of a sequence number 2 is a minimum value in maximum PAPR values corresponding to the puncturing patterns in all possible parameter sets. It should be noted that, when the maximum PAPR value of the EHTS corresponding to the parameter set values of the sequence number 2 is obtained by using the channel puncturing pattern 5 in the channel puncturing pattern A, a PAPR value of an EHTS corresponding to the parameter set value is 6.8656 dB. PAPR minimization when puncturing is performed is considered in design of an EHTS sequence of the sequence number 2.

In another example, parameter set values corresponding to a sequence number 3 may be used for both a punctured (punctured in the channel puncturing pattern B for 320 MHz) channel and a non-punctured channel, to obtain a minimum value in maximum PAPR values corresponding to puncturing and non-puncturing patterns in all possible parameter sets. A maximum PAPR value of EHTS sequences of the sequence number 3 is obtained by using the channel puncturing pattern 5 in the channel puncturing pattern A, and the PAPR of the EHTS sequence is 6.8656 dB.

For example, based on the foregoing formula, STF1×320 MHz may be represented as:

STF1×320 MHz=[STF1×160 MHz,0,$c_1$·STF1×40 MHz,0,$c_2$·STF1×40 MHz,0,$c_3$·STF1×40 MHz,0, $c_4$·STF1×40 MHz].

For example, STF1×160 MHz=$HES_{-1008:16:1008}$={M,1,−M,0,−M,1,−M,0,−M,−1,M,0,−M,1,−M}·(1+j)/$\sqrt{2}$ is denoted, STF1×40 MHz=$HES_{-240:16:240}$={M,0,−M}· (1+j)/$\sqrt{2}$ is denoted, and STF1×320 MHz may also be represented as:

$EHTS_{-2032:16:2032}$={$HES_{-1008:16:1008}$,0,$c_1$· $HES_{-240:16:240}$,0,$c_2$·$HES_{-240:16:240}$,0,$c_3$· $HES_{-240:16:240}$,0,$c_4$·$HES_{-240:16:240}$}, where a value of $c_j$ is {−1,1}, and j=1, 2, 3, or 4.

Inverse Fourier transform and 5-fold oversampling are performed on different $EHTS_{-2032:16:2032}$ sequences determined by using the value of $a_i$ and the value of $c_j$, to obtain a time domain discrete value X for each group of sequences, and then a PAPR is calculated according to the formula. After exhaustive retrieval, all possible $EHTS_{-2032:16:2032}$ sequence values and corresponding PAPRs may be obtained, and a sequence with a smaller PAPR is selected from the possible $EHTS_{-2032:16:2032}$ sequence values.

With reference to Table 15, parameter set values of EHTS−2032:16:2032 are obtained. In an example, a PAPR value of an EHTS corresponding to parameter set values of a sequence number 1 is a minimum value in corresponding maximum PAPR values in all possible parameter sets. In other words, when the sequence number 1 is used, an obtained PAPR value is less than a corresponding PAPR value in another parameter set. When puncturing is not performed, the PAPR value of the EHTS corresponding to the parameter set values of the sequence number 1 is 5.8901 dB.

TABLE 14-2

| Sequence number | $a_1$ | $a_2$ | $a_3$ | $a_4$ | $c_1$ | $c_2$ | $c_3$ | $c_4$ | $c_5$ | $c_6$ | $c_7$ | $c_8$ | PAPR [dB] |
|---|---|---|---|---|---|---|---|---|---|---|---|---|---|
| 1 | 1 | −1 | −1 | −1 | −1 | −1 | 1 | −1 | 1 | 1 | 1 | −1 | 5.0482 |
| 2 | 1 | −1 | −1 | −1 | −1 | 1 | −1 | 1 | 1 | 1 | 1 | −1 | 6.8656 |
| 3 | 1 | −1 | −1 | −1 | −1 | 1 | −1 | 1 | 1 | 1 | 1 | −1 | 6.8656 |

In a possible implementation, the 160 MHz sequence may further be constructed by using the 40 MHz sequence. In this embodiment of this application, the frequency domain sequence in the HE-STF whose bandwidth is 40 MHz and period length is 0.8 μs in the IEEE 802.11ax is denoted as STF1×40 MHz. A design formula is as follows:

STF1×320 MHz=[STF1×160 MHz,0,STF1×80 MHz_1,0,STF1×80 MHz_2], where

STF1×80 MHz_1=[$c_1$·STF1×40 MHz,0,$c_2$·STF1×40 MHz], and

STF1×80 MHz_2=[$c_3$·STF1×40 MHz,0,$c_4$·STF1×40 MHz].

In another example, if a channel is punctured, for example, in the foregoing channel puncturing patterns (including puncturing pattern A and puncturing pattern B for 320 MHz) corresponding to 320 MHz and in another channel puncturing pattern that is not listed, a maximum PAPR value of an EHTS in puncturing patterns corresponding to parameter set values of a sequence number 2 is a minimum value in maximum PAPR values corresponding to the puncturing patterns in all possible parameter sets. It should be noted that, when the maximum PAPR value of the EHTS corresponding to the parameter set values of the sequence number 2 is obtained by using the channel puncturing pattern 3, a PAPR value of an EHTS corresponding to the parameter set value is 7.8512 dB. PAPR minimization when puncturing is performed is considered in design of an EHTS sequence of the sequence number 2.

In another example, parameter set values corresponding to a sequence number 3 may be used for both a punctured channel and a non-punctured channel, to obtain a minimum value in maximum PAPR values corresponding to puncturing and non-puncturing patterns in all possible parameter sets. A maximum PAPR value of EHTS sequences of the sequence number 3 is obtained by using the channel puncturing pattern 3, and the PAPR of the EHTS sequence is 7.8512 dB.

TABLE 15

| Sequence number | $c_1$ | $c_2$ | $c_3$ | $c_4$ | PAPR [dB] |
|---|---|---|---|---|---|
| 1 | −1 | 1 | −1 | 1 | 5.8901 |
| 2 | −1 | 1 | 1 | −1 | 7.8512 |
| 3 | −1 | 1 | 1 | −1 | 7.8512 |

Case 4: The Bandwidth of the Target Channel is 320 MHz, and the Period Length of the Reference Channel is 1.6 μs In this embodiment of this application, a frequency domain sequence in an EHT-STF whose bandwidth is 320 MHz and period length is 1.6 μs is denoted as STF2×320 MHz. STF2×320 MHz is denoted as EHTS−2040:8:2040, and STF2×320 MHz may be constructed in the following plurality of manners.

1. The 20 MHz Sequence in the IEEE 802.11ax is Used for Constructing STF2×320 MHz.

In this embodiment of this application, the frequency domain sequence in the HE-STF whose bandwidth is 20 MHz and period length is 1.6 μs in the IEEE 802.11ax is denoted as STF2×20 MHz. A design formula is as follows:

STF2×320 MHz=[STF2×80 MHz_1,0,STF2×80 MHz_2,0,STF2×80 MHz_3,0,STF2×80 MHz_4], where STF2×80 MHz_1=[$c_1$·STF2×20 M,$a_1$,$c_2$·STF2×20 M,0,$c_3$·STF1×20 M,$a_2$,$c_4$·STF2×20 M], STF2×80 MHz_2=[$c_5$·STF2×20 M,$a_3$,$c_6$·STF2×20 M,0,$c_7$·STF2×20 M,$a_4$,$c_8$·STF2×20 M], STF2×80 MHz_3=[$c_9$·STF2×20 M,$a_5$,$c_{10}$·STF2×20 M,0,$c_{11}$·STF2×20 M,$a_6$,$c_{12}$·STF2×20 M], STF2×80 MHz_4=[$c_{13}$·STF2×20 M,$a_7$,$c_{14}$·STF2×20 M,0,$c_{15}$·STF2×20 M,$a_8$,$c_{16}$·STF2×20 M], and STF2×240 MHz$_{-2040}$=STF2×240 MHz$_{-1032}$=STF2× 240 MHz$_{-1016}$=STF2×240 MHz$_{-8}$=STF2×240 MHz$_8$=STF2×240 MHz$_{1016}$=STF2×240 MHz$_{1132}$=STF2×240 MHz$_{2040}$=0.

For example, based on the foregoing formula, STF2×320 MHz may be represented as:

STF2×320 MHz=[STF2×80 MHz_1,0,$c_1$·STF2×20 M,$a_1$,$c_2$·STF2×20 M,0,$c_3$·STF1×20 M,$a_2$, $c_4$·STF2×20 M,0,$c_5$·STF2×20 M,$a_3$,$c_6$·STF2×20 M,0,$c_7$·STF2×20 M,$a_4$,$c_8$·STF2×20 M,0, $c_9$·STF2×20 M,$a_5$,$c_{10}$·STF2×20 M,0,$c_{11}$·STF2×20 M,$a_6$,$c_{12}$·STF2×20 M,0,$c_{13}$·STF2×20 M,$a_7$, $c_{14}$·STF2×20 M,0,$c_{15}$·STF2×20 M,$a_8$,$c_{16}$·STF2×20 M].

For example, STF2×20 MHz=HES$_{-120:8:120}$={M,0,−M}· (1+j)/√2 is denoted, and STF2×320 MHz may also be represented as:

EHTS$_{-2040:8:2040}$={$c_1$·HES$_{-120:8:120}$,$a_1$,$c_2$· HES$_{-120:8:120}$,0,$c_3$·HES$_{-120:8:120}$,$a_2$,$c_4$· HES$_{-120:8:120}$,0,$c_5$·HES$_{-120:8:120}$,$a_3$,$c_6$· HES$_{-120:8:120}$,0,$c_7$·HES$_{-120:8:120}$,$a_4$,$c_8$· HES$_{-120:8:120}$,0,$c_9$·HES$_{-120:8:120}$,$a_5$,$c_{10}$· HES$_{-120:8:120}$,0,$c_{11}$·HES$_{-120:8:120}$,$a_6$,$c_{12}$· HES$_{-120:8:120}$,0,$c_{13}$·HES$_{-120:8:120}$,$a_7$,$c_{14}$· HES$_{-120:8:120}$,0,$c_{15}$·HES$_{-120:8:120}$,$a_8$,$c_{16}$· HES$_{-120:8:120}$}, and STF2×240 MHz$_{-2040}$=STF2×240 MHz$_{-1132}$=STF2× 240 MHz$_{-1016}$=STF2×240 MHz$_{-8}$=STF2×240 MHz$_8$=STF2×240 MHz$_{1016}$=STF2×240 MHz$_{1032}$=STF2×240 MHz$_{2040}$=0, where a value of $a_i$ is {−1,1}, i=1, 2, . . . , or 8, a value of $c_j$ is {−1,1}, and j=1, 2, . . . , or 16.

Inverse Fourier transform and 5-fold oversampling are performed on different EHTS−2040:8:2040 sequences determined by using the value of ai and the value of cj, to obtain a time domain discrete value X for each group of sequences, and then a PAPR is calculated according to the formula. After exhaustive retrieval, all possible EHTS−2040:8:2040 sequence values and corresponding PAPRs may be obtained, and a sequence with a smaller PAPR is selected from the possible EHTS−2040:8:2040 sequence values.

With reference to Table 16, parameter set values of EHTS$_{-2040:8:2040}$ are obtained. In an example, a PAPR value of an EHTS corresponding to parameter set values of a sequence number 1 is a minimum value in corresponding maximum PAPR values in all possible parameter sets. In other words, when the sequence number 1 is used, an obtained PAPR value is less than a corresponding PAPR value in another parameter set. When puncturing is not performed and a multi-RU allocation manner is used, the PAPR value of the EHTS corresponding to the parameter set values of the sequence number 1 is 4.0742 dB.

In another example, if a channel is punctured, for example, in the foregoing channel puncturing patterns (including puncturing pattern A and puncturing pattern B for 320 MHz) corresponding to 320 MHz and in another channel puncturing pattern that is not listed, a maximum PAPR value of an EHTS in puncturing patterns corresponding to parameter set values of a sequence number 2 is a minimum value in maximum PAPR values corresponding to the puncturing patterns in all possible parameter sets. It should be noted that, when the maximum PAPR value of the EHTS corresponding to the parameter set values of the sequence number 2 is obtained by using the channel puncturing pattern 5, a PAPR value of an EHTS corresponding to the parameter set value is 6.3874 dB. PAPR minimization when puncturing is performed and a multi-RU allocation manner is used is considered in design of an EHTS sequence of the sequence number 2.

In another example, parameter set values corresponding to a sequence number 3 may be used for both a punctured channel and a non-punctured channel, to obtain a minimum value in maximum PAPR values corresponding to puncturing and non-puncturing patterns in all possible parameter sets parameter sets. A maximum PAPR value of EHTS sequences of the sequence number 3 is obtained by using the channel puncturing pattern 5, and the PAPR of the EHTS sequence is 6.3874 dB.

TABLE 16

| Sequence number | $a_1$ | $a_2$ | $a_3$ | $a_4$ | $a_5$ | $a_6$ | $a_7$ | $a_8$ | $c_1$ | $c_2$ | $c_3$ | $c_4$ | $c_5$ | $c_6$ | $c_7$ | $c_8$ | $c_9$ | $c_{10}$ | $c_{11}$ | $c_{12}$ | $c_{13}$ | $c_{14}$ | $c_{15}$ | $c_{16}$ | PAPR [dB] |
|---|---|---|---|---|---|---|---|---|---|---|---|---|---|---|---|---|---|---|---|---|---|---|---|---|---|
| 1 | −1 | 1 | −1 | −1 | −1 | −1 | −1 | −1 | 1 | −1 | −1 | −1 | −1 | 1 | 1 | 1 | 1 | −1 | 1 | 1 | 1 | −1 | 1 | 1 | 4.3449 |
| 2 | 1 | 1 | 1 | 1 | 1 | 1 | 1 | −1 | 1 | 1 | −1 | −1 | −1 | −1 | −1 | 1 | −1 | −1 | 1 | −1 | −1 | 1 | 1 | 1 | 6.4230 |
| 3 | 1 | 1 | 1 | 1 | 1 | 1 | 1 | −1 | 1 | 1 | −1 | −1 | −1 | −1 | −1 | 1 | −1 | −1 | 1 | −1 | −1 | 1 | 1 | 1 | 6.4230 |

2. The 80 MHz Sequence in the IEEE 802.11ax is Used for Constructing STF2×320 MHz.

In this embodiment of this application, the frequency domain sequence in the HE-STF whose bandwidth is 80 MHz and period length is 1.6 μs in the IEEE 802.11ax is denoted as STF2×80 MHz. A design formula is as follows:

STF2×320 MHz=[STF2×80 MHz,0,$c_1$·STF2×80 MHz,0,$c_2$·STF2×80 MHz,0,$c_3$·STF2×80 MHz].

For example, STF2×80 MHz=HES$_{-504:8:504}$={M,−1,M,−1,−M,−1,M,0,−M,1,M,1,−M,1,−M}·(1+j)/√2 is denoted, and STF2×320 MHz may also be represented as:

EHTS$_{-2040:8:2040}$={HES$_{-504:8:504}$,0,$c_1$·HES$_{-504:8:504}$, 0,$c_2$·HES$_{-504:8:504}$,0,$c_3$·HES$_{-504:8:504}$}, and STF2×240 MHz$_{-2040}$=STF2×240 MHz$_{-1032}$=STF2×240 MHz$_{-1016}$=STF2×240 MHz$_{-8}$=STF2×240 MHz$_8$=STF2×240 MHz$_{1016}$=STF2×240 MHz$_{1032}$=STF2×240 MHz$_{2040}$=0, where a value of $c_j$ is {−1,1}, and j=1, 2, or 3.

Inverse Fourier transform and 4-fold oversampling are performed on different EHTS−2040:8:2040 sequences determined by using the value of ai and the value of cj, to obtain a time domain discrete value X for each group of sequences, and then a PAPR is calculated according to the formula. After exhaustive retrieval, all possible EHTS−2040:8:2040 sequence values and corresponding PAPRs may be obtained, and a sequence with a smaller PAPR is selected from the possible EHTS−2040:8:2040 sequence values.

With reference to Table 17-1, parameter set values of EHTS$_{-2040:8:2040}$ are obtained. In an example, a PAPR value of an EHTS corresponding to parameter set values of a sequence number 1 is a minimum value in corresponding maximum PAPR values in all possible parameter sets. In other words, when the sequence number 1 is used, an obtained PAPR value is less than a corresponding PAPR value in another parameter set. When puncturing is not performed and a multi-RU allocation manner is used, the PAPR value of the EHTS corresponding to the parameter set values of the sequence number 1 is 9.0122 dB.

In another example, if a channel is punctured, for example, in the foregoing channel puncturing patterns (including channel puncturing pattern A and channel puncturing pattern B for 320 MHz) corresponding to 320 MHz and in another channel puncturing pattern that is not listed, a maximum PAPR value of an EHTS in puncturing patterns corresponding to parameter set values of a sequence number 2 is a minimum value in maximum PAPR values corresponding to the puncturing patterns in all possible parameter sets. It should be noted that, when the maximum PAPR value of the EHTS corresponding to the parameter set values of the sequence number 2 is obtained by using the channel puncturing pattern 7 in the channel puncturing pattern A and channel puncturing pattern B, a PAPR value of an EHTS corresponding to the parameter set value is 9.8171 dB. PAPR minimization when puncturing is performed and a multi-RU allocation manner is used is considered in design of an EHTS sequence of the sequence number 2.

In another example, parameter set values corresponding to a sequence number 3 may be used for both a punctured (including punctured in the channel puncturing pattern A and the channel puncturing pattern B for 320 MHz) channel and a non-punctured channel, to obtain a minimum value in maximum PAPR values corresponding to puncturing and non-puncturing patterns in all possible parameter sets. A maximum PAPR value of EHTS sequences of the sequence number 3 is obtained by using the channel puncturing pattern 7 in the channel puncturing pattern A and the channel puncturing pattern B, and the PAPR of the EHTS sequence is 9.8171 dB.

TABLE 17-1

| Sequence number | $c_1$ | $c_2$ | $c_3$ | PAPR [dB] |
|---|---|---|---|---|
| 1 | 1 | −1 | −1 | 9.0122 |
| 2 | 1 | −1 | −1 | 9.8171 |
| 3 | 1 | −1 | −1 | 9.8171 |

With reference to Table 17-2, parameter set values of EHTS−2040:8:2040 are obtained. In an example, a PAPR value of an EHTS corresponding to parameter set values of a sequence number 1 is a minimum value in corresponding maximum PAPR values in all possible parameter sets. In other words, when the sequence number 1 is used, an obtained PAPR value is less than a corresponding PAPR value in another parameter set. When puncturing is not performed and a multi-RU allocation manner is used, the PAPR value of the EHTS corresponding to the parameter set values of the sequence number 1 is 7.4659 dB.

In another example, if a channel is punctured, for example, in the foregoing channel puncturing patterns (including channel puncturing pattern A and channel puncturing pattern B for 320 MHz) corresponding to 320 MHz and in another channel puncturing pattern that is not listed, a maximum PAPR value of an EHTS in puncturing patterns corresponding to parameter set values of a sequence number 2 is a minimum value in maximum PAPR values corresponding to the puncturing patterns in all possible parameter sets. It should be noted that, when the maximum PAPR value of the EHTS corresponding to the parameter set values of the sequence number 2 is obtained by using the channel puncturing pattern 11 in the channel puncturing pattern A and the channel puncturing pattern B, a PAPR value of an EHTS corresponding to the parameter set value is 9.8171 dB. PAPR minimization when puncturing is performed and a multi-RU allocation manner is used is considered in design of an EHTS sequence of the sequence number 2.

In another example, parameter set values corresponding to a sequence number 3 may be used for both a punctured (including punctured in the channel puncturing pattern A and the channel puncturing pattern B for 320 MHz) channel and a non-punctured channel, to obtain a minimum value in maximum PAPR values corresponding to puncturing and non-puncturing patterns in all possible parameter sets. A maximum PAPR value of EHTS sequences of the sequence number 3 is obtained by using the channel puncturing pattern 11 in the channel puncturing pattern A and the channel puncturing pattern B, and the PAPR of the EHTS sequence is 9.8171 dB.

TABLE 17-2

| Sequence number | $c_1$ | $c_2$ | $c_3$ | PAPR [dB] |
|---|---|---|---|---|
| 1 | 1 | 1 | −1 | 7.4659 |
| 2 | 1 | −1 | −1 | 9.8171 |
| 3 | 1 | −1 | −1 | 9.8171 |

3. The 160 MHz Sequence in the IEEE 802.1Ax is Used for Constructing STF2×320 MHz.

In this embodiment of this application, the frequency domain sequence in the HE-STF whose bandwidth is 160 MHz and period length is 1.6 μs in the IEEE 802.11ax is denoted as STF2×160 MHz.

In a possible implementation, a design formula is as follows:

STF2×320 MHz=[STF2×160 MHz,0,$c_1$·STF2×160 MHz].

For example, STF2×160 MHz=$HES_{-1016:8:1016}$={M,−1, M,−M,−1,M,0,−M,1,M,1,−M,1,−M,0,−M,1,−M,1,M,1,−M, 0,−M,1,M,1,−M,1,−M}·(1+j)/√2 is denoted, and STF2×320 MHz may also be represented as:

$EHTS_{-2040:8:2040}$={$HES_{-1016:8:1016}$,0,$c_1$·$HES_{-1016:8:1016}$}, and

STF2×240 $MHz_{-2040}$=STF2×240 $MHz_{-1032}$=STF2×240 $MHz_{-1016}$=STF2×240 $MHz_{-8}$=STF2×240 $MHz_8$=STF2×240 $MHz_{1016}$=STF2×240 $MHz_{1032}$=STF2×240 $MHz_{2040}$=0, where a value of $c_j$ is {−1,1}, and j=1.

Inverse Fourier transform and 5-fold oversampling are performed on different EHTS−2040:8:2040 sequences determined by using the value of ai and the value of cj, to obtain a time domain discrete value X for each group of sequences, and then a PAPR is calculated according to the formula. After exhaustive retrieval, all possible EHTS−2040:8:2040 sequence values and corresponding PAPRs may be obtained, and a sequence with a smaller PAPR is selected from the possible EHTS−2040:8:2040 sequence values.

With reference to Table 18-1, parameter set values of $EHTS_{-2040:8:2040}$ are obtained. In an example, a PAPR value of an EHTS corresponding to parameter set values of a sequence number 1 is a minimum value in corresponding maximum PAPR values in all possible parameter sets. In other words, when the sequence number 1 is used, an obtained PAPR value is less than a corresponding PAPR value in another parameter set. When puncturing is not performed and a multi-RU allocation manner is used, the PAPR value of the EHTS corresponding to the parameter set values of the sequence number 1 is 9.1317 dB.

In another example, if a channel is punctured, for example, in the foregoing channel puncturing patterns (including channel puncturing pattern A and channel puncturing pattern B for 320 MHz) corresponding to 320 MHz and in another channel puncturing pattern that is not listed, a maximum PAPR value of an EHTS in puncturing patterns corresponding to parameter set values of a sequence number 2 is a minimum value in maximum PAPR values corresponding to the puncturing patterns in all possible parameter sets. It should be noted that, when the maximum PAPR value of the EHTS corresponding to the parameter set values of the sequence number 2 is obtained by using the channel puncturing pattern 8 in the channel puncturing pattern A and the channel puncturing pattern B, a PAPR value of an EHTS corresponding to the parameter set value is 9.7824 dB. PAPR minimization when puncturing is performed and a multi-RU allocation manner is used is considered in design of an EHTS sequence of the sequence number 2.

In another example, parameter set values corresponding to a sequence number 3 may be used for both a punctured (including punctured in the channel puncturing pattern A and the channel puncturing pattern B for 320 MHz) channel and a non-punctured channel, to obtain a minimum value in maximum PAPR values corresponding to puncturing and non-puncturing patterns in all possible parameter sets. A maximum PAPR value of EHTS sequences of the sequence number 3 is obtained by using the channel puncturing pattern 8 in the channel puncturing pattern A and the channel puncturing pattern B, and the PAPR of the EHTS sequence is 9.7824 dB.

TABLE 18-1

| Sequence number | $c_1$ | PAPR |
|---|---|---|
| 1 | 1 | 9.1317 |
| 2 | −1 | 9.7824 |
| 3 | −1 | 9.7824 |

With reference to Table 18-2, parameter set values of EHTS−2040:8:2040 are obtained. In an example, a PAPR value of an EHTS corresponding to parameter set values of a sequence number 1 is a minimum value in corresponding maximum PAPR values in all possible parameter sets. In other words, when the sequence number 1 is used, an obtained PAPR value is less than a corresponding PAPR value in another parameter set. When puncturing is not performed and a multi-RU allocation manner is used, the PAPR value of the EHTS corresponding to the parameter set values of the sequence number 1 is 8.0063 dB.

In another example, if a channel is punctured, for example, in the foregoing channel puncturing patterns (including channel puncturing pattern A and channel puncturing pattern B for 320 MHz) corresponding to 320 MHz and in another channel puncturing pattern that is not listed, a maximum PAPR value of an EHTS in puncturing patterns corresponding to parameter set values of a sequence number 2 is a minimum value in maximum PAPR values corresponding to the puncturing patterns in all possible parameter sets. It should be noted that, when the maximum PAPR value of the EHTS corresponding to the parameter set values of the sequence number 2 is obtained by using the channel puncturing pattern 3 in the channel puncturing pattern A and the channel puncturing pattern B, a PAPR value of an EHTS corresponding to the parameter set value is 9.7824 dB. PAPR minimization when puncturing is performed and a multi-RU allocation manner is used is considered in design of an EHTS sequence of the sequence number 2.

In another example, parameter set values corresponding to a sequence number 3 may be used for both a punctured (including punctured in the channel puncturing pattern A and the channel puncturing pattern B for 320 MHz) channel and a non-punctured channel, to obtain a minimum value in maximum PAPR values corresponding to puncturing and non-puncturing patterns in all possible parameter sets. A maximum PAPR value of EHTS sequences of the sequence number 3 is obtained by using the channel puncturing pattern 3 in the channel puncturing pattern A and the channel puncturing pattern B, and the PAPR of the EHTS sequence is 9.7824 dB.

TABLE 18-2

| Sequence number | $c_1$ | PAPR |
|---|---|---|
| 1 | 1 | 8.0063 |
| 2 | −1 | 9.7824 |
| 3 | −1 | 9.7824 |

In a possible implementation, the 160 MHz sequence may be further constructed by using the 20 MHz sequence, and a design formula is as follows:

STF2×320 MHz=[STF2×160 MHz,0,STF2×80 MHz_1,0,STF2×80 MHz_2], where

STF2×80 MHz_1=[$c_1$·STF2×20 MHz,$a_1$,$c_2$·STF2×20 MHz,0,$c_3$·STF2×20 MHz,$a_2$,$c_4$·STF2×20 MHz],

STF2×80 MHz_2=[$c_5$·STF2×20 MHz,$a_3$,$c_6$·STF2×20 MHz,0,$c_7$·STF2×20 MHz,$a_4$,$c_8$·STF1×20 MHz], and STF2×240 MHz$_{-2040}$=STF2×240 MHz$_{-1032}$=STF2×240 MHz$_{-1016}$=STF2×240 MHz$_{-8}$=STF2×240 MHz$_{8}$=STF2×240 MHz$_{1016}$=STF2×240 MHz$_{1032}$=STF2×240 MHz$_{2040}$=0.

For example, based on the foregoing formula, STF2×320 MHz may be represented as:

STF2×320 MHz=[STF2×160 MHz,0,$c_1$·STF2×20 MHz,$a_1$,$c_2$·STF2×20 MHz,0,$c_3$·STF2×20 MHz, $a_2$,$c_4$·STF2×20 MHz,0,$c_5$·STF2×20 MHz,$a_3$, $c_6$·STF2×20 MHz,0,$c_7$·STF2×20 MHz,$a_4$, $c_8$·STF1×20 MHz].

For example, STF2×160 MHz=HES$_{-1016:8:1016}$={M,−1, M,−M,−1,M,0,−M,1,M,1,−M,1,−M,0,−M,1,−M,1,M,1,−M, 0,−M,1,M,1,−M,1,−M}·(1+j)/√2 is denoted, STF1×20 MHz=HES$_{-120:8:120}$={M,0,−M}·(1+j)/√2 is denoted, and STF2×320 MHz may also be represented as:

EHTS$_{-2040:8:2040}$={HES$_{-1016:8:1016}$,0,$c_1$·HES$_{-120:8:120}$,$a_1$,$c_2$·HES$_{-120:8:120}$,0,$c_3$·HES$_{-120:8:120}$,$a_2$,$c_4$·HES$_{-120:8:120}$,0,$c_5$·HES$_{-120:8:120}$,$a_3$,$c_6$·HES$_{-120:8:120}$,0,$c_7$·HES$_{-120:8:120}$,$a_4$,$c_8$·HES$_{-120:8:120}$}, and STF2×240 MHz$_{-2040}$=STF2×240 MHz$_{-1032}$=STF2×240 MHz$_{-1016}$=STF2×240 MHz$_{-8}$=STF2×240 MHz$_{8}$=STF2×240 MHz$_{1016}$=STF2×240 MHz$_{1032}$=STF2×240 MHz$_{2040}$=0, where a value of $a_i$ is {−1,1}, i=1, 2, 3, or 4, a value of $c_j$ is {−1,1}, and j=1, 2, . . . , or 8.

Inverse Fourier transform and 5-fold oversampling are performed on different EHTS−2040:8:2040 sequences determined by using the value of ai and the value of cj, to obtain a time domain discrete value X for each group of sequences, and then a PAPR is calculated according to the formula. After exhaustive retrieval, all possible EHTS−2040:8:2040 sequence values and corresponding PAPRs may be obtained, and a sequence with a smaller PAPR is selected from the possible EHTS−2040:8:2040 sequence values.

With reference to Table 19-1, parameter set values of EHTS$_{-2040:8:2040}$ are obtained. In an example, a PAPR value of an EHTS corresponding to parameter set values of a sequence number 1 is a minimum value in corresponding maximum PAPR values in all possible parameter sets. It should be noted that, when the maximum PAPR value of the EHTS corresponding to the parameter set values of the sequence number 1 is obtained by using the RU allocation manner of RU484+RU996, a PAPR value of an EHTS corresponding to the parameter set value is 9.3160 dB. PAPR minimization when puncturing is not performed and a multi-RU allocation manner is used is considered in design of an EHTS sequence of the sequence number 1.

In another example, if a channel is punctured, for example, in the foregoing channel puncturing pattern A corresponding to 320 MHz, a maximum PAPR value of an EHTS in puncturing patterns corresponding to parameter set values of a sequence number 2 is a minimum value in maximum PAPR values corresponding to the puncturing patterns in all possible parameter sets. It should be noted that, when the maximum PAPR value of the EHTS corresponding to the parameter set values of the sequence number 2 is obtained by using the RU allocation manner of RU242+RU484+RU996, a PAPR value of an EHTS corresponding to the parameter set value is 9.8876 dB. PAPR minimization when puncturing is performed and a multi-RU allocation manner is used is considered in design of an EHTS sequence of the sequence number 2.

In another example, parameter set values corresponding to a sequence number 3 may be used for both a punctured (punctured in the channel puncturing pattern A for 320 MHz) channel and a non-punctured channel, to obtain a minimum value in maximum PAPR values corresponding to puncturing and non-puncturing patterns in all possible parameter sets. A maximum PAPR value of EHTS sequences of the sequence number 3 is obtained by using the RU allocation manner of RU242+RU484+RU996, and the PAPR of the EHTS sequence is 9.8876 dB.

TABLE 19-1

| Sequence number | $a_1$ | $a_2$ | $a_3$ | $a_4$ | $c_1$ | $c_2$ | $c_3$ | $c_4$ | $c_5$ | $c_6$ | $c_7$ | $c_8$ | PAPR [dB] |
|---|---|---|---|---|---|---|---|---|---|---|---|---|---|
| 1 | 1 | 1 | 1 | 1 | 1 | 1 | −1 | −1 | 1 | −1 | 1 | −1 | 9.3160 |
| 2 | 1 | 1 | −1 | 1 | −1 | 1 | 1 | −1 | −1 | −1 | 1 | −1 | 9.8876 |
| 3 | 1 | 1 | −1 | 1 | −1 | 1 | 1 | −1 | −1 | −1 | 1 | −1 | 9.8876 |

With reference to Table 19-2, parameter set values of EHTS−2040:8:2040 are obtained. In an example, a PAPR value of an EHTS corresponding to parameter set values of a sequence number 1 is a minimum value in corresponding maximum PAPR values in all possible parameter sets. It should be noted that, when the maximum PAPR value of the EHTS corresponding to the parameter set values of the sequence number 1 is obtained by using the RU allocation manner of RU484+RU996, a PAPR value of an EHTS corresponding to the parameter set value is 9.3160 dB. PAPR minimization when puncturing is not performed and a multi-RU allocation manner is used is considered in design of an EHTS sequence of the sequence number 1.

In another example, if a channel is punctured, for example, in the foregoing channel puncturing pattern B corresponding to 320 MHz, a maximum PAPR value of an EHTS in puncturing patterns corresponding to parameter set values of a sequence number 2 is a minimum value in maximum PAPR values corresponding to the puncturing patterns in all possible parameter sets. It should be noted that, when the maximum PAPR value of the EHTS corresponding to the parameter set values of the sequence number 2 is obtained by using the RU allocation manner of RU242+RU484, a PAPR value of an EHTS corresponding to the parameter set value is 9.6130 dB. PAPR minimization when puncturing is performed and a multi-RU allocation manner is used is considered in design of an EHTS sequence of the sequence number 2.

In another example, parameter set values corresponding to a sequence number 3 may be used for both a punctured (punctured in the channel puncturing pattern B for 320 MHz) channel and a non-punctured channel, to obtain a minimum value in maximum PAPR values corresponding to puncturing and non-puncturing patterns in all possible parameter sets. A maximum PAPR value of EHTS sequences of the sequence number 3 is obtained by using the RU allocation manner of RU242+RU484, and the PAPR of the EHTS sequence is 9.6130 dB.

TABLE 19-2

| Sequence number | $a_1$ | $a_2$ | $a_3$ | $a_4$ | $c_1$ | $c_2$ | $c_3$ | $c_4$ | $c_5$ | $c_6$ | $c_7$ | $c_8$ | PAPR [dB] |
|---|---|---|---|---|---|---|---|---|---|---|---|---|---|
| 1 | 1 | 1 | 1 | 1 | 1 | 1 | −1 | −1 | 1 | −1 | 1 | −1 | 9.3160 |
| 2 | 1 | 1 | 1 | 1 | −1 | 1 | 1 | −1 | 1 | −1 | −1 | −1 | 9.6130 |
| 3 | 1 | 1 | 1 | 1 | −1 | 1 | 1 | −1 | 1 | −1 | −1 | −1 | 9.6130 |

With reference to Table 19-3, parameter set values of EHTS−2040:8:2040 are obtained. In an example, a PAPR value of an EHTS corresponding to parameter set values of a sequence number 1 is a minimum value in corresponding maximum PAPR values in all possible parameter sets. It should be noted that, when the maximum PAPR value of the EHTS corresponding to the parameter set values of the sequence number 1 is obtained by using the RU allocation manner of RU996, a PAPR value of an EHTS corresponding to the parameter set value is 8.3639 dB. PAPR minimization when puncturing is not performed and a multi-RU allocation manner is used is considered in design of an EHTS sequence of the sequence number 1.

In another example, if a channel is punctured, for example, in the foregoing channel puncturing pattern A corresponding to 320 MHz, a maximum PAPR value of an EHTS in puncturing patterns corresponding to parameter set values of a sequence number 2 is a minimum value in maximum PAPR values corresponding to the puncturing patterns in all possible parameter sets. It should be noted that, when the maximum PAPR value of the EHTS corresponding to the parameter set values of the sequence number 2 is obtained by using the RU allocation manner of RU242+RU484+RU996, a PAPR value of an EHTS corresponding to the parameter set value is 9.8186 dB. PAPR minimization when puncturing is performed and a multi-RU allocation manner is used is considered in design of an EHTS sequence of the sequence number 2.

In another example, parameter set values corresponding to a sequence number 3 may be used for both a punctured (punctured in the channel puncturing pattern A for 320 MHz) channel and a non-punctured channel, to obtain a minimum value in maximum PAPR values corresponding to puncturing and non-puncturing patterns in all possible parameter sets. A maximum PAPR value of EHTS sequences of the sequence number 3 is obtained by using the RU allocation manner of RU242+RU484+RU996, and the PAPR of the EHTS sequence is 9.8186 dB.

TABLE 19-3

| Sequence number | $a_1$ | $a_2$ | $a_3$ | $a_4$ | $c_1$ | $c_2$ | $c_3$ | $c_4$ | $c_5$ | $c_6$ | $c_7$ | $c_8$ | PAPR [dB] |
|---|---|---|---|---|---|---|---|---|---|---|---|---|---|
| 1 | 1 | 1 | 1 | 1 | 1 | −1 | −1 | 1 | 1 | −1 | 1 | −1 | 8.3639 |
| 2 | 1 | −1 | −1 | −1 | −1 | 1 | 1 | −1 | −1 | −1 | 1 | −1 | 9.8186 |
| 3 | 1 | −1 | −1 | −1 | −1 | 1 | 1 | −1 | −1 | −1 | 1 | −1 | 9.8186 |

With reference to Table 19-4, parameter set values of EHTS−2040:8:2040 are obtained. In an example, a PAPR value of an EHTS corresponding to parameter set values of a sequence number 1 is a minimum value in corresponding maximum PAPR values in all possible parameter sets. It should be noted that, when the maximum PAPR value of the EHTS corresponding to the parameter set values of the sequence number 1 is obtained by using the RU allocation manner of RU996, a PAPR value of an EHTS corresponding to the parameter set value is 8.3639 dB. PAPR minimization when puncturing is not performed and a multi-RU allocation manner is used is considered in design of an EHTS sequence of the sequence number 1.

In another example, if a channel is punctured, for example, in the foregoing channel puncturing pattern B corresponding to 320 MHz, a maximum PAPR value of an EHTS in puncturing patterns corresponding to parameter set values of a sequence number 2 is a minimum value in maximum PAPR values corresponding to the puncturing patterns in all possible parameter sets. It should be noted that, when the maximum PAPR value of the EHTS corresponding to the parameter set values of the sequence number 2 is obtained by using the channel puncturing pattern 10 in the channel puncturing pattern B, a PAPR value of an EHTS corresponding to the parameter set value is 9.4496 dB. PAPR minimization when puncturing is performed and a multi-RU allocation manner is used is considered in design of an EHTS sequence of the sequence number 2.

In another example, parameter set values corresponding to a sequence number 3 may be used for both a punctured (punctured in the channel puncturing pattern B for 320 MHz) channel and a non-punctured channel, to obtain a minimum value in maximum PAPR values corresponding to puncturing and non-puncturing patterns in all possible parameter sets. A maximum PAPR value of EHTS sequences of the sequence number 3 is obtained by using the channel puncturing pattern 10 in the channel puncturing pattern B, and the PAPR of the EHTS sequence is 9.4496 dB.

PAPR minimization when puncturing is not performed and a multi-RU allocation manner is used is considered in design of an EHTS sequence of the sequence number 1.

In another example, if a channel is punctured, for example, in the foregoing channel puncturing pattern A corresponding to 320 MHz, a maximum PAPR value of an EHTS in puncturing patterns corresponding to parameter set values of a sequence number 2 is a minimum value in maximum PAPR values corresponding to the puncturing patterns in all possible parameter sets. It should be noted that, when the maximum PAPR value of the EHTS corresponding to the parameter set values of the sequence number 2 is obtained by using the channel puncturing pattern 41 in the channel puncturing pattern A, a PAPR value of an EHTS corresponding to the parameter set value is 10.0133 dB. PAPR minimization when puncturing is performed is considered in design of an EHTS sequence of the sequence number 2.

TABLE 19-4

| Sequence number | $a_1$ | $a_2$ | $a_3$ | $a_4$ | $c_1$ | $c_2$ | $c_3$ | $c_4$ | $c_5$ | $c_6$ | $c_7$ | $c_8$ | PAPR [dB] |
|---|---|---|---|---|---|---|---|---|---|---|---|---|---|
| 1 | 1 | 1 | 1 | 1 | 1 | −1 | −1 | 1 | 1 | −1 | 1 | −1 | 8.3639 |
| 2 | −1 | 1 | −1 | −1 | −1 | 1 | 1 | −1 | 1 | 1 | −1 | −1 | 9.4496 |
| 3 | −1 | 1 | −1 | −1 | −1 | 1 | 1 | −1 | 1 | 1 | −1 | −1 | 9.4496 |

In a possible implementation, the 160 MHz sequence may be further constructed by using the 80 MHz sequence, and a design formula is as follows:

STF2×320 MHz=[STF2×160 MHz,$0,c_1$·STF2×80 MHz,$0,c_2$·STF2×80 MHz].

For example, STF2×160 MHz=HES$_{-1016:8:1016}$={M,−1,M,−M,−1,M,0,−M,1,M,1,−M,1,−M,0,−M,1,−M,1,M,1,−M,0,−M,1,M,1,−M,1,−M}·(1+j)/√2 is denoted, STF2×80 MHz=HES$_{-504:8:504}$={M,−1,M,−1,−M,−1,M,0,−M,1,M,1,−M,1,−M}·(1+j)/√2 is denoted, and STF1×320 MHz may also be represented as:

EHTS$_{-2040:8:2040}$={HES$_{-1016:8:1016}$,$0,c_1$·HES$_{-504:8:504}$,$0,c_2$·HES$_{-504:8:504}$}, and STF2×240 MHz$_{-2040}$=STF2×240 MHz$_{-1032}$=STF2×240 MHz$_{-1016}$=STF2×240 MHz$_{-8}$=STF2×240 MHz$_8$=STF2×240 MHz$_{1006}$=STF2×240 MHz$_{1032}$=STF2×240 MHz$_{2040}$=0, where a value of $c_j$ is {−1,1}, and j=1 or 2.

Inverse Fourier transform and 4-fold oversampling are performed on different EHTS$_{-2040:8:2040}$ sequences determined by using the value of $a_i$ and the value of $c_j$, to obtain a time domain discrete value X for each group of sequences, and then a PAPR is calculated according to the formula. After exhaustive retrieval, all possible EHTS$_{-2040:8:2040}$ sequence values and corresponding PAPRs may be obtained, and a sequence with a smaller PAPR is selected from the possible EHTS$_{-2040:8:2040}$ sequence values.

With reference to Table 20-1, parameter set values of EHTS−2040:8:2040 are obtained. In an example, a PAPR value of an EHTS corresponding to parameter set values of a sequence number 1 is a minimum value in corresponding maximum PAPR values in all possible parameter sets. It should be noted that, when the maximum PAPR value of the EHTS corresponding to the parameter set values of the sequence number 1 is obtained by using the RU allocation manner of RU484+RU996, a PAPR value of an EHTS corresponding to the parameter set value is 9.1317 dB.

In another example, parameter set values corresponding to a sequence number 3 may be used for both a punctured (punctured in the channel puncturing pattern A for 320 MHz) channel and a non-punctured channel, to obtain a minimum value in maximum PAPR values corresponding to puncturing and non-puncturing patterns in all possible parameter sets. A maximum PAPR value of EHTS sequences of the sequence number 3 is obtained by using the channel puncturing pattern 41 in the channel puncturing pattern A, and the PAPR of the EHTS sequence is 10.0133 dB.

TABLE 20-1

| Sequence number | $c_1$ | $c_2$ | PAPR [dB] |
|---|---|---|---|
| 1 | 1 | 1 | 9.1317 |
| 2 | −1 | 1 | 10.0133 |
| 3 | −1 | 1 | 10.0133 |

With reference to Table 20-2, parameter set values of EHTS−2040:8:2040 are obtained. In an example, a PAPR value of an EHTS corresponding to parameter set values of a sequence number 1 is a minimum value in corresponding maximum PAPR values in all possible parameter sets. It should be noted that, when the maximum PAPR value of the EHTS corresponding to the parameter set values of the sequence number 1 is obtained by using the RU allocation manner of RU484+RU996, a PAPR value of an EHTS corresponding to the parameter set value is 9.1317 dB. PAPR minimization when puncturing is not performed and a multi-RU allocation manner is used is considered in design of an EHTS sequence of the sequence number 1.

In another example, if a channel is punctured, for example, in the foregoing channel puncturing pattern B corresponding to 320 MHz, a maximum PAPR value of an EHTS in puncturing patterns corresponding to parameter set values of a sequence number 2 is a minimum value in maximum PAPR values corresponding to the puncturing patterns in all possible parameter sets. It should be noted that, when the maximum PAPR value of the EHTS corresponding to the parameter set values of the sequence number 2 is obtained by using the channel puncturing pattern 4 in the channel puncturing pattern B, a PAPR value of an EHTS corresponding to the parameter set value is 9.8171 dB. PAPR minimization when puncturing is performed is considered in design of an EHTS sequence of the sequence number 2.

In another example, parameter set values corresponding to a sequence number 3 may be used for both a punctured (punctured in the channel puncturing pattern B for 320 MHz) channel and a non-punctured channel, to obtain a minimum value in maximum PAPR values corresponding to puncturing and non-puncturing patterns in all possible parameter sets. A maximum PAPR value of EHTS sequences of the sequence number 3 is obtained by using the channel puncturing pattern 4 in the channel puncturing pattern B, and the PAPR of the EHTS sequence is 9.8171 dB.

TABLE 20-2

| Sequence number | $c_1$ | $c_2$ | PAPR [dB] |
|---|---|---|---|
| 1 | 1 | 1 | 9.1317 |
| 2 | −1 | −1 | 9.8171 |
| 3 | −1 | −1 | 9.8171 |

With reference to Table 20-3, parameter set values of EHTS−2040:8:2040 are obtained. In an example, a PAPR value of an EHTS corresponding to parameter set values of a sequence number 1 is a minimum value in corresponding maximum PAPR values in all possible parameter sets. In other words, when the sequence number 1 is used, an obtained PAPR value is less than a corresponding PAPR value in another parameter set. When puncturing is not performed and a multi-RU allocation manner is used, the PAPR value of the EHTS corresponding to the parameter set values of the sequence number 1 is 8.5519 dB.

In another example, if a channel is punctured, for example, in the foregoing channel puncturing pattern A corresponding to 320 MHz, a maximum PAPR value of an EHTS in puncturing patterns corresponding to parameter set values of a sequence number 2 is a minimum value in maximum PAPR values corresponding to the puncturing patterns in all possible parameter sets. It should be noted that, when the maximum PAPR value of the EHTS corresponding to the parameter set values of the sequence number 2 is obtained by using the channel puncturing pattern 41 in the channel puncturing pattern A, a PAPR value of an EHTS corresponding to the parameter set value is 10.0133 dB. PAPR minimization when puncturing is performed is considered in design of an EHTS sequence of the sequence number 2.

In another example, parameter set values corresponding to a sequence number 3 may be used for both a punctured (punctured in the channel puncturing pattern A for 320 MHz) channel and a non-punctured channel, to obtain a minimum value in maximum PAPR values corresponding to puncturing and non-puncturing patterns in all possible parameter sets. A maximum PAPR value of EHTS sequences of the sequence number 3 is obtained by using the channel puncturing pattern 41 in the channel puncturing pattern A, and the PAPR of the EHTS sequence is 10.0133 dB.

TABLE 20-3

| Sequence number | $c_1$ | $c_2$ | PAPR [dB] |
|---|---|---|---|
| 1 | 1 | 1 | 8.5519 |
| 2 | −1 | 1 | 10.0133 |
| 3 | −1 | 1 | 10.0133 |

With reference to Table 20-4, parameter set values of EHTS−2040:8:2040 are obtained. In an example, a PAPR value of an EHTS corresponding to parameter set values of a sequence number 1 is a minimum value in corresponding maximum PAPR values in all possible parameter sets. In other words, when the sequence number 1 is used, an obtained PAPR value is less than a corresponding PAPR value in another parameter set. When puncturing is not performed and a multi-RU allocation manner is used, the PAPR value of the EHTS corresponding to the parameter set values of the sequence number 1 is 8.5519 dB.

In another example, if a channel is punctured, for example, in the foregoing channel puncturing pattern B corresponding to 320 MHz, a maximum PAPR value of an EHTS in puncturing patterns corresponding to parameter set values of a sequence number 2 is a minimum value in maximum PAPR values corresponding to the puncturing patterns in all possible parameter sets. It should be noted that, when the maximum PAPR value of the EHTS corresponding to the parameter set values of the sequence number 2 is obtained by using the channel puncturing pattern 4 in the channel puncturing pattern B, a PAPR value of an EHTS corresponding to the parameter set value is 9.8171 dB. PAPR minimization when puncturing is performed is considered in design of an EHTS sequence of the sequence number 2.

In another example, parameter set values corresponding to a sequence number 3 may be used for both a punctured (punctured in the channel puncturing pattern B for 320 MHz) channel and a non-punctured channel, to obtain a minimum value in maximum PAPR values corresponding to puncturing and non-puncturing patterns in all possible parameter sets. A maximum PAPR value of EHTS sequences of the sequence number 3 is obtained by using the channel puncturing pattern 4 in the channel puncturing pattern B, and the PAPR of the EHTS sequence is 9.8171 dB.

TABLE 20-4

| Sequence number | $c_1$ | $c_2$ | PAPR [dB] |
|---|---|---|---|
| 1 | 1 | 1 | 8.5519 |
| 2 | −1 | −1 | 9.8171 |
| 3 | −1 | −1 | 9.8171 |

In a possible implementation, the 160 MHz sequence may further be constructed by using the 40 MHz sequence. In this embodiment of this application, the frequency domain sequence in the HE-STF whose bandwidth is 40 MHz and period length is 1.6 μs in the IEEE 802.11ax is denoted as STF2×40 MHz. A design formula is as follows:

STF2×320 MHz=[STF2×160 MHz,0,STF2×80 MHz_1,0,STF2×80 MHz_2], where

STF2×80 MHz_1=[$c_1$·STF2×40 MHz,0,$c_2$·STF2×40 MHz],

STF2×80 MHz_2=[$c_3$·STF2×40 MHz,0,$c_4$·STF2×40 MHz], and

STF2×240 MHz$_{-2040}$=STF2×240 MHz$_{-1032}$=STF2× 240 MHz$_{-1016}$=STF2×240 MHz$_{-8}$=STF2×240 MHz$_{8}$=STF2×240 MHz$_{1016}$=STF2×240 MHz$_{1032}$=STF2×240 MHz$_{2040}$=0.

For example, based on the foregoing formula, STF2×320 MHz may be represented as:

STF2×320 MHz=[STF2×160 MHz,0,$c_1$·STF2×40 MHz,0,$c_2$·STF2×40 MHz,0,$c_3$·STF2×40 MHz,0,$c_4$·STF2×40 MHz].

For example, STF2×160 MHz=HES$_{-1016:8:1016}$={M,−1, M,−M,−1,M,0,−M,1,M,1,−M,1,−M,0,−M,1,−M,1,M,1,−M, 0,−M,1,M,1,−M,1,−M}·(1+j)/$\sqrt{2}$ is denoted, STF1×40 MHz=HES$_{-248:8:248}$={M,−1,−M,0,M,−1,M}·(1+j)/$\sqrt{2}$ is denoted, and STF1×320 MHz may also be represented as:

EHTS$_{-2040:8:2040}$={HES$_{-1016:8:1016}$,0,$c_1$· HES$_{-248:8:248}$,0,$c_2$·HES$_{-248:8:248}$,0,$c_3$· HES$_{-248:8:248}$,0,$c_4$·HES$_{-248:8:248}$}, and STF2×240 MHz$_{-2040}$=STF2×240 MHz$_{-1032}$=STF2× 240 MHz$_{-1016}$=STF2×240 MHz$_{-8}$=STF2×240 MHz$_{8}$=STF2×240 MHz$_{1016}$=STF2×240 MHz$_{1032}$=STF2×240 MHz$_{2040}$=0, where a value of $c_j$ is {−1,1}, and j=1, 2, 3, or 4.

Inverse Fourier transform and 5-fold oversampling are performed on different EHTS$_{-2040:8:2040}$ sequences determined by using the value of $a_i$ and the value of $c_j$, to obtain a time domain discrete value X for each group of sequences, and then a PAPR is calculated according to the formula. After exhaustive retrieval, all possible EHTS$_{-2040:8:2040}$ sequence values and corresponding PAPRs may be obtained, and a sequence with a smaller PAPR is selected from the possible EHTS$_{-2040:8:2040}$ sequence values.

With reference to Table 21-1, parameter set values of EHTS-2040:8:2040 are obtained. In an example, a PAPR value of an EHTS corresponding to parameter set values of a sequence number 1 is a minimum value in corresponding maximum PAPR values in all possible parameter sets. It should be noted that, when the maximum PAPR value of the EHTS corresponding to the parameter set values of the sequence number 1 is obtained by using the RU allocation manner of RU484+RU996, a PAPR value of an EHTS corresponding to the parameter set value is 9.1317 dB. PAPR minimization when puncturing is not performed and a multi-RU allocation manner is used is considered in design of an EHTS sequence of the sequence number 1.

In another example, if a channel is punctured, for example, in the foregoing channel puncturing pattern A and channel puncturing pattern B corresponding to 320 MHz and in another channel puncturing pattern that is not listed, a maximum PAPR value of an EHTS in puncturing patterns corresponding to parameter set values of a sequence number 2 is a minimum value in maximum PAPR values corresponding to the puncturing patterns in all possible parameter sets. It should be noted that, when the maximum PAPR value of the EHTS corresponding to the parameter set values of the sequence number 2 is obtained by using the RU allocation manner of RU242+RU484+RU996, a PAPR value of an EHTS corresponding to the parameter set value is 9.3340 dB. PAPR minimization when puncturing is performed and a multi-RU allocation manner is used is considered in design of an EHTS sequence of the sequence number 2.

In another example, parameter set values corresponding to a sequence number 3 may be used for both a punctured channel and a non-punctured channel, to obtain a minimum value in maximum PAPR values corresponding to puncturing and non-puncturing patterns in all possible parameter sets. A maximum PAPR value of EHTS sequences of the sequence number 3 is obtained by using the RU allocation manner of RU242+RU484+RU996, and the PAPR of the EHTS sequence is 9.3340 dB.

TABLE 21-1

| Sequence number | $c_1$ | $c_2$ | $c_3$ | $c_4$ | PAPR [dB] |
|---|---|---|---|---|---|
| 1 | 1 | 1 | −1 | −1 | 9.1317 |
| 2 | 1 | 1 | 1 | 1 | 9.3340 |
| 3 | 1 | 1 | 1 | 1 | 9.3340 |

With reference to Table 21-2, parameter set values of EHTS$_{-2040:8:2040}$ are obtained. In an example, a PAPR value of an EHTS corresponding to parameter set values of a sequence number 1 is a minimum value in corresponding maximum PAPR values in all possible parameter sets. In other words, when the sequence number 1 is used, an obtained PAPR value is less than a corresponding PAPR value in another parameter set. When puncturing is not performed and a multi-RU allocation manner is used, the PAPR value of the EHTS corresponding to the parameter set values of the sequence number 1 is 7.8086 dB.

In another example, if a channel is punctured, for example, in the foregoing channel puncturing pattern A and channel puncturing pattern B corresponding to 320 MHz and in another channel puncturing pattern that is not listed, a maximum PAPR value of an EHTS in puncturing patterns corresponding to parameter set values of a sequence number 2 is a minimum value in maximum PAPR values corresponding to the puncturing patterns in all possible parameter sets. It should be noted that, when the maximum PAPR value of the EHTS corresponding to the parameter set values of the sequence number 2 is obtained by using the channel puncturing pattern 15 in the channel puncturing pattern A and the channel puncturing pattern 10 in the channel puncturing pattern B, a PAPR value of an EHTS corresponding to the parameter set value is 9.1294 dB. PAPR minimization when puncturing is performed and a multi-RU allocation manner is used is considered in design of an EHTS sequence of the sequence number 2.

In another example, parameter set values corresponding to a sequence number 3 may be used for both a punctured (punctured in the channel puncturing patterns A and B for 320 MHz) channel and a non-punctured channel, to obtain a minimum value in maximum PAPR values corresponding to puncturing and non-puncturing patterns in all possible parameter sets. A maximum PAPR value of EHTS sequences of the sequence number 3 is obtained by using the channel puncturing pattern 15 in the channel puncturing pattern A or the channel puncturing pattern 10 in the channel puncturing pattern B, and the PAPR of the EHTS sequence is 9.1294 dB.

TABLE 21-2

| Sequence number | $c_1$ | $c_2$ | $c_3$ | $c_4$ | PAPR [dB] |
|---|---|---|---|---|---|
| 1 | 1 | 1 | 1 | 1 | 7.8086 |
| 2 | 1 | 1 | 1 | 1 | 9.1294 |
| 3 | 1 | 1 | 1 | 1 | 9.1294 |

It should be understood that, in Table 1 to Table 21-2, a PAPR that is the same as that of a sequence corresponding to original parameter set values can be obtained for a sequence corresponding to all inverted parameter set values. Details are not described in this embodiment of this application. The "inverted" herein may be specifically as follows: 1 is −1 after being inverted, 0 is still 0 after being inverted, and −1 is 1 after being inverted.

This embodiment of this application can meet a larger channel bandwidth during actual implementation, implement backward compatibility, verify, through exhaustive simulation on parameters, that the short training sequence provided in this embodiment of this application has a smaller peak-to-average power ratio PAPR and better performance, improve estimation effect of an automatic gain control circuit at the receive end, and achieve a lower receiving bit error rate.

The foregoing describes in detail the method for transmitting a physical layer protocol data unit provided in embodiments of this application with reference to FIG. 1 to FIG. 6.

An embodiment of this application provides an apparatus for transmitting a physical layer protocol data unit. In a possible implementation, the apparatus is configured to implement the steps or procedures corresponding to the receive end in the foregoing method embodiments. In another possible implementation, the apparatus is configured to implement the steps or procedures corresponding to the transmit end in the foregoing method embodiments.

Figure 7:
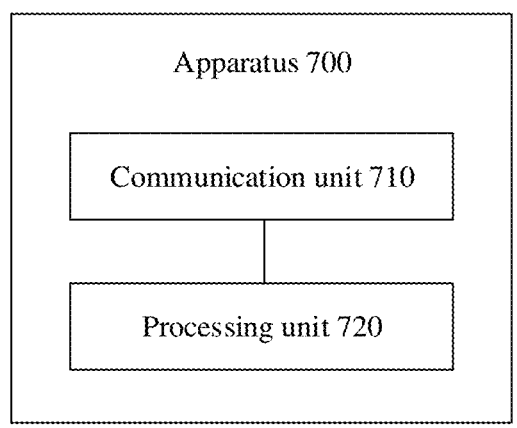
FIG. 7 is a schematic block diagram of an apparatus for transmitting a physical layer protocol data unit according to an embodiment of this application.
Figure 8:
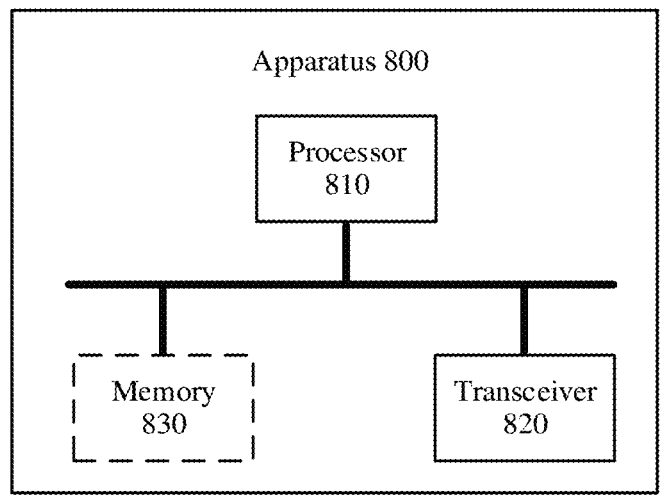
FIG. 8 is another schematic block diagram of an apparatus for transmitting a physical layer protocol data unit according to an embodiment of this application.
Figure 9:
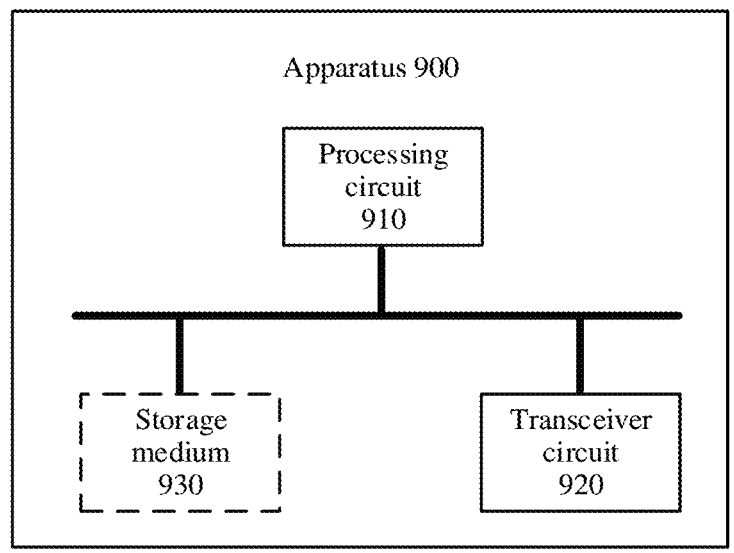
FIG. 9 is still another schematic block diagram of an apparatus for transmitting a physical layer protocol data unit according to an embodiment of this application.

The following describes in detail the apparatus for transmitting a physical layer protocol data unit provided in embodiments of this application with reference to FIG. 7 to FIG. 9.

FIG. 7 is a schematic block diagram of an apparatus for transmitting a physical layer protocol data unit according to an embodiment of this application. As shown in FIG. 7, the apparatus 700 may include a communication unit 710 and a processing unit 720. The communication unit 710 may communicate with the outside, and the processing unit 720 is configured to process data. The communication unit 710 may also be referred to as a communication interface or a transceiver unit.

In a possible design, the apparatus 700 may implement the steps or procedures performed by the transmit end in the foregoing method embodiments. The processing unit 720 is configured to perform processing-related operations of the transmit end in the foregoing method embodiments, and the communication unit 710 is configured to perform receiving- and sending-related operations of the transmit end in the foregoing method embodiments.

For example, the processing unit 720 is configured to generate a physical layer protocol data unit PPDU. The PPDU includes a short training field, a length of a frequency domain sequence of the short training field is greater than a first length, and the first length is a length of a frequency domain sequence in a short training field of a PPDU transmitted on a channel with a bandwidth of 160 MHz. The communication unit 710 is configured to send the PPDU on a target channel, where a bandwidth of the target channel is greater than 160 MHz.

In another possible design, the apparatus 700 may implement the steps or procedures performed by the receive end in the foregoing method embodiments. The communication unit 710 is configured to perform receiving- and sending-related operations of the receive end in the foregoing method embodiments, and the processing unit 720 is configured to perform processing-related operations of the receive end in the foregoing method embodiments.

For example, the communication unit 710 is configured to receive a physical layer protocol data unit PPDU on a target channel. The PPDU includes a short training field, a length of a frequency domain sequence of the short training field is greater than a first length, and the first length is a length of a frequency domain sequence in a short training field of a PPDU transmitted on a channel with a bandwidth of 160 MHz. A bandwidth of the target channel is greater than or equal to 160 MHz. The processing unit 720 is configured to parse the PPDU.

In the foregoing two possible designs, optionally, the bandwidth of the target channel is 240 MHz, and the frequency domain sequence of the short training field is any one of the following:

In a possible implementation, the bandwidth of the target channel is 240 MHz, and the frequency domain sequence of the short training field is any one of the following:

$\{HES_{-112:16:112}, -1, -HES_{-112:16:112}, 0,$
$\quad HES_{-112:16:112}, -1, -HES_{-112:16:112}, 0,$
$\quad -HES_{-112:16:112}, -1, HES_{-112:16:112}, 0,$
$\quad HES_{-112:16:112}, 1, -HES_{-112:16:112}, 0,$
$\quad -HES_{-112:16:112}, 1, -HES_{-112:16:112}, 0,$
$\quad -HES_{-112:16:112}, 1, -HES_{-112:16:112}\};$ $\{HES_{-112:16:112}, 1, -HES_{-112:16:112}, 0, HES_{-112:16:112}, -$
$\quad 1, HES_{-112:16:112}, 0, HES_{-112:16:112}, 1,$
$\quad HES_{-112:16:112}, 0, -HES_{-112:16:112}, 1,$
$\quad HES_{-112:16:112}, 0, -HES_{-112:16:112}, -1,$
$\quad -HES_{-112:16:112}, 0, -HES_{-112:16:112}, 1,$
$\quad HES_{-112:16:112}\};$ $\{HES_{-112:16:112}, -1, HES_{-112:16:112}, 0, HES_{-112:16:112}, -$
$\quad 1, HES_{-112:16:112}, 0, HES_{-112:16:112}, -1,$
$\quad -HES_{-112:16:112}, 0, -HES_{-112:16:112}, 1,$
$\quad HES_{-112:16:112}, 0, HES_{-112:16:112}, 1,$
$\quad -HES_{-112:16:112}, 0, HES_{-112:16:112}, 1,$
$\quad -HES_{-112:16:112}\};$ or $\{HES_{-112:16:112}, 1, -HES_{-112:16:112}, 0, HES_{-112:16:112}, -$
$\quad 1, HES_{-112:16:112}, 0, HES_{-112:16:112}, 1,$
$\quad HES_{-112:16:112}, 0, -HES_{-112:16:112}, 1,$
$\quad HES_{-112:16:112}, 0, -HES_{-112:16:112}, -1,$
$\quad -HES_{-112:16:112}, 0, -HES_{-112:16:112}, 1,$
$\quad HES_{-112:16:112}\},$ where $HES_{-112:16:112} = \{M\} \cdot (1+j)/\sqrt{2},$ and $M = \{-1, -1, -1, 1, 1, 1, -1, 1, 1, 1, -1, 1, 1, -1, 1\}.$ In a possible implementation, the bandwidth of the target channel is 240 MHz, and the frequency domain sequence of the short training field is any one of the following:

$\{HES_{-496:16:496}, 0, -HES_{-496:16:496}, 0,$
$\quad -HES_{-496:16:496}\};$ or $\{HES_{-496:16:496}, 0, HES_{-496:16:496}, 0, -HES_{-496:16:496}\},$ where $HES_{-496:16:496} = \{M, 1, -M, 0, -M, 1, -M\} \cdot (1+j)/\sqrt{2},$ and $M = \{-1, -1, -1, 1, 1, 1, -1, 1, 1, 1, -1, 1, 1, -1, 1\}.$ In a possible implementation, the bandwidth of the target channel is 240 MHz, and the frequency domain sequence of the short training field is any one of the following:

$\{HES_{-1008:16:1008}, 0, HES_{-496:16:496}\};$ or $\{HES_{-1008:16:1008}, 0, -HES_{-496:16:496}\},$ where $HES_{-1008:16:1008} = \{M, 1, -M, 0, -M, 1, -M, 0, -M, -1, M, 0, -M, 1, -M\}(1+j)/$
$\sqrt{2}, HES_{-496:16:496} = \{M, 1, -M, 0, -M, 1, -M\} \cdot (1+j)/$
$\sqrt{2},$ and $M = \{-1, -1, -1, 1, 1, 1, -, 1, 1, 1, -1, 1, 1, -1, 1\}.$ In a possible implementation, the bandwidth of the target channel is 240 MHz, and the frequency domain sequence of the short training field is any one of the following:

{HES$_{-1008:16:1008}$,0,-HES$_{-112:16:112}$,-1,
HES$_{-112:16:112}$,0,-HES$_{-112:16:112}$,1,
HES$_{-112:16:112}$};

{HES$_{-1008:16:1008}$,0,HES$_{-112:16:112}$,-1,HES$_{-112:16:112}$,
0,HES$_{-112:16:112}$,-1,-HES$_{-112:16:112}$}; or

{HES$_{-1008:16:1008}$,0,HES$_{-112:16:112}$,-1,
-HES$_{-112:16:112}$,0,-HES$_{-112:16:112}$,1,
-HES$_{-112:16:112}$}, where HES$_{-1008:16:1008}$={$M$,1,-$M$,0,-$M$,1,-$M$,0,-$M$,-1,$M$,
0,-$M$,1,-$M$}·(1+$j$)/√2,HES$_{-112:16:112}$={$M$}·(1+$j$)/
√2, and $M$={-1,-1,-1,1,1,1,-1,1,1,-1,1,1,-1,
1}.

In a possible implementation, the bandwidth of the target channel is 240 MHz, and the frequency domain sequence of the short training field is any one of the following:

{HES$_{-1008:16:1008}$,0,-HES$_{-240:16:240}$,0,
-HES$_{-240:16:240}$};

{HES$_{-1008:16:1008}$,0,-HES$_{-240:16:240}$,0,
HES$_{-240:16:240}$}; or

{HES$_{-1008:16:1008}$,0,HES$_{-240:16:240}$,0,
-HES$_{-240:16:240}$}, where

HES$_{-1008:16:1008}$={$M$,1,-$M$,0,-$M$,1,-$M$,0,-$M$,-1,$M$,
0,-$M$,1,-$M$}·(1+$j$)/
√2,HES$_{-240:16:240}$={$M$,0,-$M$}·(1+$j$)/√2, and
$M$={-1-1,-1,1,1,1,-1,1,1,1,-1,1,1,-1,1}.

In a possible implementation, the bandwidth of the target channel is 240 MHz, and the frequency domain sequence of the short training field is any one of the following:

{HES$_{-120:8:120}$,1,HES$_{-120:8:120}$,0,-HES$_{-120:8:120}$,1,-
HES$_{-120:8:120}$,0,HES$_{-120:8:120}$,1,-HES$_{-120:8:120}$,
0,HES$_{-120:8:120}$,1,-HES$_{-120:8:120}$,0,
HES$_{-120:8:120}$,1,-HES$_{-120:8:120}$,0,-HES$_{-120:8:120}$,
1,-HES$_{-120:8:120}$};

{HES$_{-120:8:120}$,1,HES$_{-120:8:120}$,0,HES$_{-120:8:120}$,1,-
HES$_{-120:8:120}$,0,HES$_{-120:8:120}$,1,-HES$_{-120:8:120}$,
0,-HES$_{-120:8:120}$,1,HES$_{-120:8:120}$,0,
-HES$_{-120:8:120}$,1,HES$_{-120:8:120}$,0,
HES$_{-120:8:120}$,-1,HES$_{-120:8:120}$};

{HES$_{-120:8:120}$,1,-HES$_{-120:8:120}$,0,HES$_{-120:8:120}$,1,-
HES$_{-120:8:120}$,0,HES$_{-120:8:120}$,1,-HES$_{-120:8:120}$,
0,-HES$_{-120:8:120}$,1,HES$_{-120:8:120}$,0,
HES$_{-120:8:120}$,1,-HES$_{-120:8:120}$,0,
-HES$_{-120:8:120}$,-1,HES$_{-120:8:120}$};

{HES$_{-120:8:120}$,1,HES$_{-120:8:120}$,0,-HES$_{-120:8:120}$,-
HES$_{-120:8:120}$,0,-HES$_{-120:8:120}$,-1,
HES$_{-120:8:120}$,0,-HES$_{-120:8:120}$,-1,
HES$_{-120:8:120}$,0,HES$_{-120:8:120}$,1,-HES$_{-120:8:120}$,
0,HES$_{-120:8:120}$,1,-HES$_{-120:8:120}$}; or

{HES$_{-120:8:120}$,1,-HES$_{-120:8:120}$,0,-HES$_{-120:8:120}$,1,
HES$_{-120:8:120}$,0,-HES$_{-120:8:120}$,-1,
HES$_{-120:8:120}$,0,-HES$_{-120:8:120}$,-1,
HES$_{-120:8:120}$,0,HES$_{-120:8:120}$,1,-HES$_{-120:8:120}$,
0,-HES$_{-120:8:120}$,-1,HES$_{-120:8:120}$}, where HES$_{-120:8:120}$={$M$,0,-$M$}·(1+$j$)/√2, and $M$={-1,-,-1,
1,1,1,-1,1,1,1,-1,1,1,-1,1}.

In a possible implementation, the bandwidth of the target channel is 240 MHz, and the frequency domain sequence of the short training field is any one of the following:

{HES$_{-504:8:504}$,0,HES$_{-504:8:504}$,0,-HES$_{-504:8:504}$}; or

{HES$_{-504:8:504}$,0,-HES$_{-504:8:504}$,0,-HES$_{-504:8:504}$},
where

HES$_{-504:8:504}$={$M$,-1,$M$,-1,-$M$,-1,$M$,0,-$M$,1,$M$,1,-
$M$,1,-$M$}·(1+$j$)/√2, and $M$={-1,-1,-1,1,1,1,-1,1,
1,1,-1,1,1,-1,1}.

In a possible implementation, the bandwidth of the target channel is 240 MHz, and the frequency domain sequence of the short training field is any one of the following:

{HES$_{-1016:8:1016}$,0,HES$_{-504:8:504}$}; or

{HES$_{-1016:8:1016}$,0,-HES$_{-504:8:504}$}, where

HES$_{-1016:8:1016}$={$M$,-1,$M$,-$M$,-1,$M$,0,-$M$,1,$M$,1,-$M$,
1,-$M$,0,-$M$,1,-$M$,1,$M$,1,-$M$,0,-$M$,1,$M$,1,-$M$,1,-
$M$}·(1+$j$)/√2,HES$_{-504:8:504}$={$M$,-1,$M$,-1,-$M$,-1,
$M$,0,-$M$,1,$M$,1,-$M$,1,-$M$}.

In a possible implementation, the bandwidth of the target channel is 240 MHz, and the frequency domain sequence of the short training field is any one of the following:

{HES$_{-1016:8:1016}$,0,HES$_{-120:8:120}$,-1,-HES$_{-120:8:120}$,
0,HES$_{-120:8:120}$,1,HES$_{-120:8:120}$};

{HES$_{-1016:8:1016}$,0,-HES$_{-120:8:120}$,1,-HES$_{-120:8:120}$,
0,-HES$_{-120:8:120}$,1,-HES$_{-120:8:120}$};

{HES$_{-1016:8:1016}$,0,HES$_{-120:8:120}$,1,-HES$_{-120:8:120}$,
0,-HES$_{-120:8:120}$,1,HES$_{-120:8:120}$};

{HES$_{-1016:8:1016}$,0,-HES$_{-120:8:120}$,-1,HES$_{-120:8:120}$,
0,HES$_{-120:8:120}$,1,-HES$_{-120:8:120}$};

{HES$_{-1016:8:1016}$,0,-HES$_{-120:8:120}$,-1,-HES$_{-120:8:120}$,
0,HES$_{-120:8:120}$,1,HES$_{-120:8:120}$};

{HES$_{-1016:8:1016}$,0,-HES$_{-120:8:120}$,1,HES$_{-120:8:120}$,0,
HES$_{-120:8:120}$,1,-HES$_{-120:8:120}$};

{HES$_{-1016:8:1016}$,0,HES$_{-120:8:120}$,1,-HES$_{-120:8:120}$,
0,-HES$_{-120:8:120}$,1,HES$_{-120:8:120}$}; or

{HES$_{-1016:8:1016}$,0,-HES$_{-120:8:120}$,-1,HES$_{-120:8:120}$,
0,HES$_{-120:8:120}$,1,-HES$_{-120:8:120}$}, where HES$_{-1016:8:1016}$={$M$,-1,$M$,-$M$,-1,$M$,0,-$M$,1,$M$,1,-$M$,
1,-$M$,0,-$M$,1,-$M$,1,$M$,1,-$M$,0,-$M$,1,$M$,1,-$M$,1,-
$M$}·(1+$j$)/√2,HES$_{-120:8:120}$={$M$,0,-$M$}·(1+$j$)/√2,
and $M$={-1,-1,-1,1,1,1,-1,1,1,1,1,-1,1,1,-1,1}.

In a possible implementation, the bandwidth of the target channel is 240 MHz, and the frequency domain sequence of the short training field is any one of the following:

{HES$_{-1016:8:1016}$,0,-HES$_{-248:8:248}$,0,HES$_{-248:8:248}$};

{HES$_{-1016:8:1016}$,0,-HES$_{-248:8:248}$,0,-HES$_{-248:8:248}$};
or

{HES$_{-1016:8:1016}$,0,HES$_{-248:8:248}$,0,HES$_{-248:8:248}$},
where

HES$_{-1016:8:101}$={$M$,-1,$M$,-$M$,-1,$M$,0,-$M$,1,$M$,1,-$M$,
1,-$M$,0,-$M$,1,-$M$,1,$M$,1,-$M$,0,-$M$,1,$M$,1,-$M$,1,-
$M$}·(1+$j$)/√2,HES$_{-248:8:248}$={$M$,-1,
-$M$,0,$M$,-1,$M$}·(1+$j$)/√2, and $M$={1,1,1,1,-1,1,1,
1,-1,1,1,-1,1}.

In a possible implementation, the bandwidth of the target channel is 320 MHz, and the frequency domain sequence of the short training field is any one of the following:

{HES$_{-496:16:496}$,0,HES$_{-496:16:496}$,0,HES$_{-496:16:496}$,0,-
HES$_{-496:16:496}$}; or

{HES$_{-496:16:496}$,0,HES$_{-496:16:496}$,0,-HES$_{-496:16:496}$,
0,-HES$_{-496:16:496}$}, where HES$_{-496:16:496}$={$M$,1,-$M$,0,-$M$,1,-$M$}·(1+$j$)/√2, and
$M$={-1,-1,-,1,1,1,-1,1,1,1,-1,1,1,-1,1}.

In a possible implementation, the bandwidth of the target channel is 320 MHz, and the frequency domain sequence of the short training field is any one of the following:

$\{HES_{-1008:16:1008}, 0, HES_{-1008:16:1008}\}$; or $\{HES_{-1008:16:1008}, 0, -HES_{-1008:16:1008}\}$, where $HES_{-1008:16:1008} = \{M,1,-M,0,-M,1,-M,0,-M,-1,M, 0,-M,1,-M\} \cdot (1+j)/\sqrt{2}$, and $M=\{-1-1,-1,1,1,1,-1,1,1,1,1,-1,1,1,-1,1\}$.

In a possible implementation, the bandwidth of the target channel is 320 MHz, and the frequency domain sequence of the short training field is any one of the following:

$\{HES_{-1008:16:1008}, 0, -HES_{-112:16:112}, 1,$
$-HES_{-112:16:112}, 0, HES_{-112:16:112}, -1,$
$-HES_{-112:16:112}, 0, HES_{-112:16:112}, -1,$
$HES_{-112:16:112}, 0, HES_{-112:16:112}, -1,$
$-HES_{-112:16:112}\}$;

$\{HES_{-1008:16:1008}, 0, -HES_{-112:16:112}, -1,$
$HES_{-112:16:112}, 0, HES_{-112:16:112}, -1,$
$-HES_{-112:16:112}, 0, HES_{-112:16:112}, -1,$
$-HES_{-112:16:112}, 0, -HES_{-112:16:112}, 1,$
$-HES_{-112:16:112}\}$; or $\{HES_{-1008:16:1008}, 0, -HES_{-112:16:112}, 1, HES_{-112:16:112},$
$0, -HES_{-112:16:112}, -1, HES_{-112:16:112}, 0,$
$HES_{-112:16:112}, -1, HES_{-112:16:112}, 0,$
$HES_{-112:16:112}, -1, -HES_{-112:16:112}\}$, where $HES_{-1008:16:1008} = \{M,1,-M,0,-M,1,-M,0,-M,-1,M, 0,-M,1,-M\} \cdot (1+j)/\sqrt{2}, HES_{-112:16:112} = \{M\} \cdot (1+j)/\sqrt{2}$, and $M=\{-1,-1,-1,1,1,1,-1,1,1,1,-1,1,1,-1,1,1\}$.

In a possible implementation, the bandwidth of the target channel is 320 MHz, and the frequency domain sequence of the short training field is any one of the following:

$\{HES_{-1008:16:1008}, 0, -HES_{-240:16:240}, 0, HES_{-240:16:240},$
$0, -HES_{-240:16:240}, 0, HES_{-240:16:240}\}$; or $\{HES_{-1008:16:1008}, 0, -HES_{-240:16:240}, 0, HES_{-240:16:240},$
$0, HES_{-240:16:240}, 0, -HES_{-240:16:240}\}$, where $HES_{-1008:16:1008} = \{M,1,-M,0,-M,1,-M,0,-M,-1,M, 0,-M,1,-M\} \cdot (1+j)/\sqrt{2}, HES_{-240:16:240} = \{M,0,-M\} \cdot (1+j)/\sqrt{2}$, and $M=\{-1,-1,-1,1,1,1,-1,1,1,1,-1,1,1,-1,1\}$.

In a possible implementation, the bandwidth of the target channel is 320 MHz, and the frequency domain sequence of the short training field is any one of the following:

$\{HES_{-504:8:504}, 0, HES_{-504:8:504}, 0, -HES_{-504:8:504}, 0, -HES_{-504:8:504}\}$; or $\{HES_{-504:8:504}, 0, HES_{-504:8:504}, 0, HES_{-504:8:504}, 0, -HES_{-504:8:504}\}$, where $HES_{-504:8:504} = \{M,-1,M,-1,-M,-1,M,0,-M,1,M,1,-M,1,-M\} \cdot (1+j)/\sqrt{2}$, and $M=\{-1,-1,-1,1,1,1,-1,1,1,-1,1,1,-1,1\}$.

In a possible implementation, the bandwidth of the target channel is 320 MHz, and the frequency domain sequence of the short training field is any one of the following:

$\{HES_{-1016:8:1016}, 0, HES_{-1016:8:1016}\}$; or $\{HES_{-1016:8:1016}, 0, -HES_{-1016:8:1016}\}$, where $HES_{-1016:8:1016} = \{M,-1,M,-M,-1,M,0,-M,1,M,1,-M, 1,-M,0,-M,1,-M,1,M,1,-M,0,-M,1,M,1,-M,1,-M\} \cdot (1+j)/\sqrt{2}$, and $M=\{-1,-1,-1,1,1,1,-1,1,1,1,-1,1,1,-1,1\}$.

In a possible implementation, the bandwidth of the target channel is 320 MHz, and the frequency domain sequence of the short training field is any one of the following:

$\{HES_{-1016:8:1016}, 0, HES_{-120:8:120}, 1, HES_{-120:8:120}, 0,$
$-HES_{-120:8:120}, 1, -HES_{-120:8:120}, 0, HES_{-120:8:120},$
$1, -HES_{-120:8:120}, 0, HES_{-120:8:120}, 1,$
$-HES_{-120:8:120}\}$;

$\{HES_{-1016:8:1016}, 0, -HES_{-120:8:120}, 1, HES_{-120:8:120}, 0,$
$HES_{-120:8:120}, 1, -HES_{-120:8:120}, 0,$
$-HES_{-120:8:120}, -1, -HES_{-120:8:120}, 0,$
$HES_{-120:8:120}, 1, -HES_{-120:8:120}\}$;

$\{HES_{-1016:8:1016}, 0, -HES_{-120:8:120}, 1, HES_{-120:8:120}, 0,$
$HES_{-120:8:120}, 1, -HES_{-120:8:120}, 0,$
$HES_{-120:8:120}, 1, -HES_{-120:8:120}, 0,$
$-HES_{-120:8:120}, 1, -HES_{-120:8:120}\}$;

$\{HES_{-1016:8:1016}, 0, HES_{-120:8:120}, 1, -HES_{-120:8:120},$
$0, -HES_{-120:8:120}, 1, HES_{-120:8:120}, 0,$
$HES_{-120:8:120}, 1, -HES_{-120:8:120}, 0, HES_{-120:8:120},$
$1, -HES_{-120:8:120}\}$;

$\{HES_{-1016:8:1016}, 0, -HES_{-120:8:120}, 1, HES_{-120:8:120}, 0,$
$HES_{-120:8:120}, -1, -HES_{-120:8:120}, 0,$
$-HES_{-120:8:120}, -1, -HES_{-120:8:120}, 0,$
$HES_{-120:8:120}, -1, -HES_{-120:8:120}\}$;

$\{HES_{-1016:8:1016}, 0, HES_{-120:8:120}, 1, -HES_{-120:8:120},$
$0, -HES_{-120:8:120}, 1, HES_{-120:8:120}, 0,$
$HES_{-120:8:120}, 1, -HES_{-120:8:120}, 0, HES_{-120:8:120},$
$1, -HES_{-120:8:120}\}$; or $\{HES_{-1016:8:1016}, 0, -HES_{-120:8:120}, -1, HES_{-120:8:120},$
$0, HES_{-120:8:120}, 1, -HES_{-120:8:120}, 0,$
$HES_{-120:8:120}, -1, HES_{-120:8:120}, 0,$
$-HES_{-120:8:120}, -1, -HES_{-120:8:120}\}$, where $HES_{-1016:8:1016} = \{M,-1,M,-M,-1,M,0,-M,1,M,1,-M, 1,-M,0,-M,1,-M,1,M,1,-M,0,-M,1,M,1,-M,1,-M\} \cdot (1+j)/\sqrt{2}, HES_{-120:8:120} = \{M,0,-M\} \cdot (1+j)/\sqrt{2}$, and $M=\{-1,-1,-1,1,1,1,-1,1,1,1,-1,1,1,-1,1\}$.

In a possible implementation, the bandwidth of the target channel is 320 MHz, and the frequency domain sequence of the short training field is any one of the following:

$\{HES_{-1016:8:1016}, 0, HES_{-504:8:504}, 0, HES_{-504:8:504}\}$;

$\{HES_{-1016:8:1016}, 0, -HES_{-504:8:504}, 0, HES_{-504:8:504}\}$; or $\{HES_{-1016:8:1016}, 0, -HES_{-504:8:504}, 0, -HES_{-504:8:504}\}$, where $HES_{-1016:8:1016} = \{M,-1,M,-M,-1,M,0,-M,1,M,1,-M, 1,-M,0,-M,1,-M,1,M,1,-M,0,-M,1,M,1,-M,1,-M\} \cdot (1+j)/\sqrt{2}, HES_{-504:8:504} = \{M,-1,M,-1, -M,-1,M,0,-M,1,M,1,-M,1,-M\} \cdot (1+j)/\sqrt{2}$, and $M=\{-1,-1,-1,1,1,1,-1,1,1,1,-1,1,1,-1,1,1\}$.

In a possible implementation, the bandwidth of the target channel is 320 MHz, and the frequency domain sequence of the short training field is any one of the following:

$\{HES_{-1016:8:1016}, 0, HES_{-248:8:248}, 0, HES_{-248:8:248}, 0, -HES_{-248:8:248}, 0, -HES_{-248:8:248}\}$; or $\{HES_{-1016:8:1016}, 0, HES_{-248:8:248}, 0, HES_{-248:8:248}, 0, HES_{-248:8:248}, 0, -HES_{-248:8:248}\}$, where $HES_{-1016:8:1016} = \{M,-1,M,-M,-1,M,0,-M,1,M,1,-M, 1,-M,0,-M,1,-M,1,M,1,-M,0,-M,1,M,1,-M,1,-M\} \cdot (1+j)/ \sqrt{2}, HES_{-248:8:248} = \{M,-1,-M,0,M,-1,M\} \cdot (1+j)/\sqrt{2}$, and $M=\{1,1,1,1,-1,1,1,1,-1,1,1,-1,1\}$.

It should be understood that the apparatus 700 is presented in a form of a functional unit. The term "unit" herein may refer to an application-specific integrated circuit (ASIC), an electronic circuit, a processor (for example, a shared processor, a dedicated processor, or a group processor) configured to execute one or more software or firmware programs, a memory, a merged logic circuit, and/or another appropriate component that supports the described function. In an optional example, a person skilled in the art may understand that the apparatus 700 may be specifically the transmit end in the foregoing embodiments, and may be configured to perform the procedures and/or steps corresponding to the transmit end in the foregoing method embodiments. Alternatively, the apparatus 700 may be specifically the receive end in the foregoing embodiments, and may be configured to perform the procedures and/or steps corresponding to the receive end in the foregoing method embodiments. To avoid repetition, details are not described herein again.

The apparatus 700 in each of the foregoing solutions has a function of implementing the corresponding steps performed by the transmit end in the foregoing method, or the apparatus 700 in each of the foregoing solutions has a function of implementing the corresponding steps performed by the receive end in the foregoing method. The function may be implemented by hardware, or may be implemented by hardware executing corresponding software. The hardware or software includes one or more modules corresponding to the foregoing function. For example, a communication unit may be replaced with a transceiver (where for example, a sending unit in the communication unit may be replaced with a transmitter, and a receiving unit in the communication unit may be replaced with a receiver), and another unit such as a processing unit may be replaced with a processor, to separately perform receiving and sending operations and a related processing operation in the method embodiments.

In addition, the communication unit may alternatively be a transceiver circuit (where for example, the transceiver circuit may include a receiver circuit and a transmitter circuit), and the processing unit may be a processing circuit. In this embodiment of this application, the apparatus in FIG. 7 may be the receive end or the transmit end in the foregoing embodiments, or may be a chip or a chip system, for example, a system on chip (SoC). The communication unit may be an input/output circuit or a communication interface. The processing unit is a processor, a microprocessor, or an integrated circuit integrated on the chip. This is not limited herein.

As shown in FIG. 8, an apparatus 800 for transmitting a physical layer protocol data unit according to an embodiment of this application is provided. The apparatus 800 includes a processor 810 and a transceiver 820. The processor 810 and the transceiver 820 communicate with each other through an internal connection path, and the processor 810 is configured to execute instructions, to control the transceiver 820 to send a signal and/or receive a signal.

Optionally, the apparatus 800 may further include a memory 830. The memory 830 communicates with the processor 810 and the transceiver 820 through an internal connection path. The memory 830 is configured to store instructions, and the processor 810 may execute the instructions stored in the memory 830. In a possible implementation, the apparatus 800 is configured to implement procedures and steps corresponding to the transmit end in the foregoing method embodiments. In another possible implementation, the apparatus 800 is configured to implement procedures and steps corresponding to the receive end in the foregoing method embodiments.

It should be understood that the apparatus 800 may be specifically the transmit end or the receive end in the foregoing embodiments, or may be a chip or a chip system. Correspondingly, the transceiver 820 may be a transceiver circuit of the chip. This is not limited herein. Specifically, the apparatus 800 may be configured to perform the steps and/or the procedures corresponding to the transmit end or the receive end in the foregoing method embodiments. Optionally, the memory 830 may include a read-only memory and a random access memory, and provide instructions and data to the processor. A part of the memory may further include a non-volatile random access memory. For example, the memory may further store information about a device type. The processor 810 may be configured to execute the instructions stored in the memory. When the processor 810 executes the instructions stored in the memory, the processor 810 is configured to perform the steps and/or procedures of the method embodiments corresponding to the transmit end or the receive end.

In an implementation process, the steps in the foregoing method may be completed by using a hardware integrated logical circuit in the processor, or by using instructions in a form of software. The steps of the method disclosed with reference to embodiments of this application may be directly performed and completed by a hardware processor, or may be performed and completed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor. To avoid repetition, details are not described herein again.

It should be noted that, the processor in embodiments of this application may be an integrated circuit chip, and has a signal processing capability. In an implementation process, steps in the foregoing method embodiments can be implemented by using a hardware integrated logical circuit in the processor, or by using instructions in a form of software. The processor may be a general purpose processor, a digital signal processor (DSP), an application specific integrated circuit (ASIC), a field programmable gate array (FPGA) or another programmable logic device, a discrete gate or a transistor logic device, or a discrete hardware component. The processor in embodiments of this application may implement or perform the methods, the steps, and the logical block diagrams that are disclosed in embodiments of this application. The general-purpose processor may be a microprocessor, or the processor may be any conventional processor or the like. The steps of the method disclosed with reference to embodiments of this application may be directly performed and completed by a hardware decoding processor, or may be performed and completed by using a combination of hardware in the decoding processor and a software module. The software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor.

It may be understood that the memory in embodiments of this application may be a volatile memory or a non-volatile memory, or may include both a volatile memory and a non-volatile memory. The non-volatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM) that is used as an external buffer. Through example but not limitative description, RAMs in many forms may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that the memory in the system and the method described in this specification is intended to include but is not limited to these memories and any memory of another proper type.

As shown in FIG. 9, an apparatus 900 for transmitting a physical layer protocol data unit according to an embodiment of this application is provided. The apparatus 900 includes a processing circuit 910 and a transceiver circuit 920. The processing circuit 910 and the transceiver circuit 920 communicate with each other through an internal connection path, and the processing circuit 910 is configured to execute instructions, to control the transceiver circuit 920 to send a signal and/or receive a signal.

Optionally, the apparatus 900 may further include a storage medium 930. The storage medium 930 communicates with the processing circuit 910 and the transceiver circuit 920 through an internal connection path. The storage medium 930 is configured to store instructions, and the processing circuit 910 may execute the instructions stored in the storage medium 930. In a possible implementation, the apparatus 900 is configured to implement procedures and steps corresponding to the transmit end in the foregoing method embodiments. In another possible implementation, the apparatus 900 is configured to implement procedures and steps corresponding to the receive end in the foregoing method embodiments.

According to the method provided in embodiments of this application, this application further provides a computer program product. The computer program product includes computer program code. When the computer program code is run on a computer, the computer is enabled to perform the method in the embodiment shown in FIG. 6.

According to the method provided in embodiments of this application, this application further provides a computer-readable medium. The computer-readable medium stores program code. When the program code is run on a computer, the computer is enabled to perform the method in the embodiment shown in FIG. 6.

According to the method provided in embodiments of this application, this application further provides a system. The system includes the foregoing one or more stations and the foregoing one or more access points.

A person of ordinary skill in the art may be aware that, the units and algorithm steps in the examples described with reference to embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical form or other forms.

The units described as separate parts may or may not be physically separate, and parts displayed as units may or may not be physical units, that is, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, technical solutions of this application essentially, or a part contributing to the conventional technology, or all or some of the technical solutions may be implemented in a form of a software product. The computer software product is stored in a storage medium and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing describes embodiments of this application with reference to the accompanying drawings. However, this application is not limited to the foregoing specific implementations. The foregoing specific implementations are merely examples, but are not limitative. Inspired by this application, a person of ordinary skill in the art may further make many modifications without departing from the purposes of this application and the protection scope of the claims, and all the modifications shall fall within the protection scope of this application.

What is claimed is:

1. A method comprising:
generating, by a transmit end, a physical layer protocol data unit (PPDU), wherein the PPDU comprises a short training field, and a quantity of subcarriers corresponding to a frequency domain sequence of the short training field is greater than 2048; and
sending, by the transmit end, the PPDU on a target channel, wherein a bandwidth of the target channel is 320 MHz; and
wherein the frequency domain sequence of the short training field is $\{HES_{-496:16:496}, 0, HES_{-496:16:496}, 0, -HES_{-496:16:496}, 0, -HES_{-496:16:496}\}$,
$HES_{-496:16:496} = \{M, 1, -M, 0, -M, 1, -M\} \cdot (1+j)/\sqrt{2}$, and $M = \{-1, -1, -1, 1, 1, 1, -1, 1, 1, 1, -1, 1, 1, -1, 1\}$, wherein j is an imaginary number; and
wherein the transmit end is applied to an access point (AP).

2. The method according to claim 1, wherein the PPDU is one of: a high efficiency single-user physical layer protocol data unit (HE SU PPDU), a high efficiency multi-user physical layer protocol data unit (HE MU PPDU), or a high efficiency extended range single-user physical layer protocol data unit (HE ER SU PPDU).

3. The method according to claim 1, wherein a time domain waveform of the short training field comprises five repetition periods, and a length of each period of the five repetition periods is 0.8 μs.

4. The method according to claim 1, wherein a peak to average power ratio (PAPR) value of the short training field is 8.2020 dB when a channel puncturing pattern is [1 1 1 1 0 0 1 1 1 1 1 1 1 1 1 1], "1" indicates a 20 MHz channel bandwidth that is not punctured, and "0" indicates a 20 MHz channel that is punctured.

5. A method comprising:
receiving, by a receive end, a physical layer protocol data unit (PPDU) on a target channel, wherein the PPDU comprises a short training field, a quantity of subcarriers corresponding to a frequency domain sequence of the short training field is greater than 2048, and a bandwidth of the target channel is 320 MHz; and
parsing, by the receive end, the PPDU; and
wherein the frequency domain sequence of the short training field is $\{HES_{-496:16:496}, 0, HES_{-496:16:496}, 0, -HES_{-496:16:496}, 0, -HES_{-496:16:496}\}$,
$HES_{-496:16:496} = \{M, 1, -M, 0, -M, 1, -M\} \cdot (1+j)/\sqrt{2}$, and $M = \{-1, -1, -1, 1, 1, 1, -1, 1, 1, 1, -1, 1, 1, -1, 1\}$, wherein j is an imaginary number; and
wherein the receive end is applied to a station.

6. The method according to claim 5, wherein the PPDU is one of: a high efficiency single-user physical layer protocol data unit (HE SU PPDU), a high efficiency multi-user physical layer protocol data unit (HE MU PPDU), or a high efficiency extended range single-user physical layer protocol data unit (HE ER SU PPDU).

7. The method according to claim 5, wherein a time domain waveform of the short training field comprises five repetition periods, and a length of each period of the five repetition periods is 0.8 μs.

8. The method according to claim 5, wherein a peak to average power ratio (PAPR) value of the short training field is 8.2020 dB when a channel puncturing pattern is [1 1 1 1 0 0 1 1 1 1 1 1 1 1 1 1], wherein "1" indicates a 20 MHz channel bandwidth that is not punctured, and "0" indicates a 20 MHz channel that is punctured.

9. An apparatus, comprising:
at least one processor; and
at least one non-transitory memory, configured to store computer instructions, which when executed by the at least one processor, cause the apparatus to:
generate a physical layer protocol data unit (PPDU), wherein the PPDU comprises a short training field, and a quantity of subcarriers corresponding to a frequency domain sequence of the short training field is greater than 2048; and
send the PPDU on a target channel, wherein a bandwidth of the target channel is 320 MHz; and
wherein the frequency domain sequence of the short training field is $\{HES_{-496:16:496}, 0, HES_{-496:16:496}, 0, -HES_{-496:16:496}, 0, -HES_{-496:16:496}\}$,
$HES_{-496:16:496} = \{M, 1, -M, 0, -M, 1, -M\} \cdot (1+j)/\sqrt{2}$, and $M = \{-1, -1, -1, 1, 1, 1, -1, 1, 1, 1, -1, 1, 1, -1, 1\}$, wherein j is an imaginary number; and
wherein the apparatus is applied to an access point (AP).

10. The apparatus according to claim 9, wherein the PPDU is one of: a high efficiency single-user physical layer protocol data unit (HE SU PPDU), a high efficiency multi-user physical layer protocol data unit (HE MU PPDU), or a high efficiency extended range single-user physical layer protocol data unit (HE ER SU PPDU).

11. The apparatus according to claim 9, wherein a time domain waveform of the short training field comprises five repetition periods, and a length of each period of the five repetition periods is 0.8 μs.

12. The apparatus according to claim 9, wherein a peak to average power ratio (PAPR) value of the short training field is 8.2020 dB when a channel puncturing pattern is [1 1 1 1 0 0 1 1 1 1 1 1 1 1 1 1], "1" indicates a 20 MHz channel bandwidth that is not punctured, and "0" indicates a 20 MHz channel that is punctured.

13. The apparatus according to claim 9, wherein the apparatus is the access point.

14. An apparatus, comprising:
at least one processor; and
at least one non-transitory memory, configured to store computer instructions, which when executed by the at least one processor, cause the apparatus to:
receive a physical layer protocol data unit (PPDU) on a target channel, wherein the PPDU comprises a short training field, a quantity of subcarriers corresponding to a frequency domain sequence of the short training field is greater than 2048, and a bandwidth of the target channel is 320 MHz; and
parse the PPDU; and
wherein the frequency domain sequence of the short training field is $\{HES_{-496:16:496}, 0, HES_{-496:16:496}, 0, -HES_{-496:16:496}, 0, -HES_{-496:16:496}\}$,
$HES_{-496:16:496} = \{M, 1, -M, 0, -M, 1, -M\} \cdot (1+j)/\sqrt{2}$, and $M = \{-1, -1, -1, 1, 1, 1, -1, 1, 1, 1, -1, 1, 1, -1, 1\}$, wherein j is an imaginary number; and
wherein the apparatus is applied to a station.

15. The apparatus according to claim 14, wherein the PPDU is one of: a high efficiency single-user physical layer protocol data unit (HE SU PPDU), a high efficiency multi-user physical layer protocol data unit (HE MU PPDU), or a high efficiency extended range single-user physical layer protocol data unit (HE ER SU PPDU).

16. The apparatus according to claim 14, wherein a time domain waveform of the short training field comprises five repetition periods, and a length of each period of the five repetition periods is 0.8 μs.

17. The apparatus according to claim 14, wherein a peak to average power ratio (PAPR) value of the short training field is 8.2020 dB when a channel puncturing pattern is [1 1 1 1 0 0 1 1 1 1 1 1 1 1 1 1], "1" indicates a 20 MHz channel bandwidth that is not punctured, and "0" indicates a 20 MHz channel that is punctured.

18. The apparatus according to claim 14, wherein the apparatus is the station.

\* \* \* \* \*